US012212916B2

(12) United States Patent
Xu et al.

(10) Patent No.: US 12,212,916 B2
(45) Date of Patent: Jan. 28, 2025

(54) HEADPHONES

(71) Applicant: SHENZHEN SHOKZ CO., LTD., Guangdong (CN)

(72) Inventors: Jiang Xu, Shenzhen (CN); Haofeng Zhang, Shenzhen (CN); Zeying Zheng, Shenzhen (CN); Lei Zhang, Shenzhen (CN); Shanyong Gu, Beijing (CN); Hongqiang Zhao, Beijing (CN); Peigeng Tong, Shenzhen (CN); Guolin Xie, Shenzhen (CN); Yongjian Li, Shenzhen (CN); Tao Zhao, Shenzhen (CN); Duoduo Wu, Shenzhen (CN); Ao Ji, Shenzhen (CN); Xin Qi, Shenzhen (CN); Liwei Wang, Shenzhen (CN); Zhen Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/625,183

(22) Filed: Apr. 2, 2024

(65) Prior Publication Data

US 2024/0284086 A1 Aug. 22, 2024

Related U.S. Application Data

(63) Continuation of application No. PCT/CN2023/126157, filed on Oct. 24, 2023.

(30) Foreign Application Priority Data

Oct. 28, 2022 (CN) ......................... 202211336918.4
Dec. 1, 2022 (CN) ......................... 202223239628.6

(Continued)

(51) Int. Cl.
*H04R 1/10* (2006.01)

(52) U.S. Cl.
CPC ........... *H04R 1/105* (2013.01); *H04R 1/1016* (2013.01)

(58) Field of Classification Search
CPC ......... A61F 11/12; H04R 1/10; H04R 1/1008; H04R 1/1016; H04R 1/1033;
(Continued)

(56) References Cited

U.S. PATENT DOCUMENTS 1,712,515 A * 5/1929 Norris ...................... G01H 7/00 367/13
11,082,766 B1 * 8/2021 Bar Lev ................. H04R 1/105
(Continued)

FOREIGN PATENT DOCUMENTS

CN 203968330 U 11/2014
CN 110291797 A 9/2019
(Continued)

OTHER PUBLICATIONS

International Search Report in PCT/CN2023/126157 mailed on Dec. 22, 2023, 7 pages.

(Continued)

*Primary Examiner* — Gerald Gauthier
(74) *Attorney, Agent, or Firm* — METIS IP LLC

(57) ABSTRACT

The present disclosure provides a headphone including a sound production component and an ear hook. The ear hook and the sound production component form a first projection on a user's sagittal plane. In a non-wearing state, an inner contour, a first end contour, a second end contour of the first projection, and a tangent segment connecting the first end contour and the second end contour jointly define a first closed curve. A first area of the first closed curve ranges 300 $mm^2$-500 $mm^2$. A portion of the inner contour corresponding to the ear hook includes a first curve. The first curve has an extremum point in a first direction perpendicular to a long (Continued)

axis direction of a projection of the sound production component, the extremum point is located behind a projection point of an upper vertex of the ear hook on the sagittal plane.

20 Claims, 15 Drawing Sheets

(30) Foreign Application Priority Data

| | | |
|---|---|---|
| Dec. 30, 2022 | (WO) | PCT/CN2022/144339 |
| Mar. 2, 2023 | (WO) | PCT/CN2023/079401 |
| Mar. 24, 2023 | (WO) | PCT/CN2023/083534 |

(58) Field of Classification Search

CPC .... H04R 1/1041; H04R 1/105; H04R 1/1058; H04R 1/1066; H04R 1/2811; H04R 5/0335; H04R 9/02; H04R 1/08; H04R 1/1075; H04R 1/2803; H04R 1/2873; H04R 1/323; H04R 1/347; G01H 7/00; G10K 9/13; G10K 11/002; G10K 11/178; G10K 11/26; H04S 7/304

See application file for complete search history.

(56) References Cited

U.S. PATENT DOCUMENTS

| | | | | |
|---|---|---|---|---|
| 11,303,986 | B2 * | 4/2022 | Kirkpatrick | H04R 1/1058 |
| 11,381,902 | B2 * | 7/2022 | Kirkpatrick | A61F 11/12 |
| 11,490,189 | B2 * | 11/2022 | Kirkpatrick | H04R 1/105 |
| 11,871,171 | B1 * | 1/2024 | Zhang | H04R 1/1066 |
| 11,877,111 | B1 * | 1/2024 | Zhang | H04R 1/08 |
| 11,895,454 | B1 * | 2/2024 | Zhang | H04R 1/1016 |
| 11,902,731 | B1 * | 2/2024 | Zhang | H04R 1/1008 |
| 11,902,733 | B1 * | 2/2024 | Xu | H04R 1/1016 |
| 11,902,734 | B1 * | 2/2024 | Xu | H04R 1/1008 |
| 11,956,584 | B1 * | 4/2024 | Zhang | H04R 1/1041 |
| 11,968,489 | B1 * | 4/2024 | Zhang | H04R 1/1008 |
| 11,974,084 | B1 * | 4/2024 | Xu | H04R 1/1016 |
| 2007/0009133 | A1 | 1/2007 | Gerkinsmeyer | |
| 2008/0187164 | A1 * | 8/2008 | Chou | H04R 1/1033 381/381 |
| 2008/0298626 | A1 * | 12/2008 | Dean | H04R 1/1058 381/381 |
| 2010/0254563 | A1 * | 10/2010 | Harper | H04R 1/1033 381/381 |
| 2011/0170731 | A1 * | 7/2011 | Beckhart | H04R 5/0335 381/381 |
| 2018/0192228 | A1 * | 7/2018 | Woelfl | H04S 7/304 |
| 2020/0196062 | A1 | 6/2020 | Zhang | |
| 2021/0258673 | A1 * | 8/2021 | Lu | H04R 1/1016 |
| 2021/0352394 | A1 * | 11/2021 | Wen | H04R 1/10 |
| 2022/0007098 | A1 | 1/2022 | Chen et al. | |
| 2022/0078536 | A1 * | 3/2022 | Tseng | H04R 1/105 |
| 2022/0394387 | A1 * | 12/2022 | Thune | H04R 5/0335 |
| 2023/0179907 | A1 * | 6/2023 | Zhang | H04R 1/1066 381/381 |
| 2024/0007804 | A1 * | 1/2024 | Qi | G10K 9/13 |
| 2024/0015452 | A1 * | 1/2024 | Qi | G10K 11/26 |
| 2024/0015453 | A1 * | 1/2024 | Qi | H04R 1/1075 |
| 2024/0015454 | A1 * | 1/2024 | Qi | G10K 11/002 |
| 2024/0015455 | A1 * | 1/2024 | Zhang | G10K 11/178 |
| 2024/0031724 | A1 * | 1/2024 | Zheng | H04R 1/105 |
| 2024/0031725 | A1 * | 1/2024 | Zheng | H04R 1/347 |
| 2024/0147108 | A1 * | 5/2024 | Zhang | H04R 1/2811 |
| 2024/0147109 | A1 * | 5/2024 | Zhang | H04R 1/2811 |
| 2024/0147110 | A1 * | 5/2024 | Zhang | H04R 1/2873 |
| 2024/0147113 | A1 * | 5/2024 | Zhang | H04R 1/1008 |
| 2024/0147117 | A1 * | 5/2024 | Xu | H04R 1/105 |
| 2024/0147133 | A1 * | 5/2024 | Zhang | H04R 1/1066 |
| 2024/0147162 | A1 * | 5/2024 | Zhang | H04R 9/02 |
| 2024/0187780 | A1 * | 6/2024 | Zhang | H04R 1/105 |
| 2024/0284086 | A1 * | 8/2024 | Xu | H04R 1/1016 |
| 2024/0323578 | A1 * | 9/2024 | Qi | H04R 1/323 |

FOREIGN PATENT DOCUMENTS

| | | | |
|---|---|---|---|
| CN | 210053540 | U | 2/2020 |
| CN | 212909891 | U | 4/2021 |
| CN | 113301463 | A | 8/2021 |
| CN | 113573215 | A | 10/2021 |
| CN | 114286228 | A | 4/2022 |
| CN | 114286240 | A | 4/2022 |
| CN | 114513717 | A | 5/2022 |
| CN | 114554339 | A | 5/2022 |
| CN | 115175069 | A | 10/2022 |
| JP | 2008124733 | A | 5/2008 |
| JP | 2010193344 | A | 9/2010 |
| JP | 2017147533 | A | 8/2017 |
| WO | 2022111485 | A1 | 6/2022 |

OTHER PUBLICATIONS

Written Opinion in PCT/CN2023/126157 mailed on Dec. 22, 2023, 9 pages.

International Search Report in PCT/CN2023/079401 mailed on Jun. 29, 2023, 6 pages.

Written Opinion in PCT/CN2023/079401 mailed on Jun. 29, 2023, 5 pages.

International Search Report in PCT/CN2023/083534 mailed on Jul. 7, 2023, 6 pages.

Written Opinion in PCT/CN2023/083534 mailed on Jul. 7, 2023, 5 pages.

* cited by examiner

HEADPHONES

CROSS-REFERENCE TO RELATED APPLICATIONS

This application is a continuation of International Application No. PCT/CN2023/126157 filed on Oct. 24, 2023, which claims priority to Chinese Patent Application No. 202211336918.4 filed on Oct. 28, 2022, Chinese Patent Application No. 202223239628.6 filed on Dec. 1, 2022, International Application No. PCT/CN2022/144339 filed on Dec. 30, 2022, International Application No. PCT/CN2023/079401 filed on Mar. 2, 2023, International Application No. PCT/CN2023/083534 filed on Mar. 24, 2023, the entire contents of each of which are hereby incorporated by reference.

TECHNICAL FIELD

The present disclosure relates to the field of acoustic technology, and in particular, to headphones.

BACKGROUND

With the development of acoustic output technology, acoustic devices (e.g., headphones) have been widely used in people's daily lives and can be used in conjunction with electronic devices such as cell phones and computers to provide users with an auditory feast. The headphone is a portable audio output device that realizes sound conduction within a specific range. Compared with traditional in-ear and over-ear headphones, an open headphone has characteristics of not blocking or covering the ear canal, which allows the user to listen to music while accessing to the sound information from the external environment, which improves safety and comfort. The output performance of the headphone has a great impact on the wearing comfort of the user.

Therefore, it is necessary to provide a headphone to improve the output performance.

SUMMARY

Some embodiments of the present disclosure provide a headphone, comprising a sound production component and an ear hook. The sound production component may include a transducer and a housing accommodating the transducer. The ear hook may include a first portion and a second portion. In a wearing state, the first portion may be hung between an auricle of a user and a head of the user, and the second portion may extend toward a side of the auricle away from the head and may be connected to the sound production component to place the sound production component in a position near an ear canal without blocking an opening of the ear canal. The ear hook and the sound production component may form a first projection on a sagittal plane of the user. The first projection may include an outer contour, a first end contour, an inner contour, and a second end contour. In a non-wearing state, the inner contour, the first end contour, the second end contour, and a tangent segment connecting the first end contour and the second end contour may jointly define a first closed curve, and a first area of the first closed curve may be within a range of 300 $mm^2$-500 $mm^2$. A portion of the inner contour corresponding to the ear hook may include a first curve. The first curve may have an extremum point in a first direction, the first direction may be perpendicular to a long axis direction of a projection of the sound production component, the extremum point may be located behind a projection point of an upper vertex of the ear hook on the sagittal plane of the user, and the upper vertex of the ear hook may be a highest point of an inner contour of the ear hook along a vertical axis of the user in the wearing state.

In some embodiments, in the wearing state, at least a portion of the housing may be inserted into an auricular concha cavity.

In some embodiments, a distance between the extremum point and the projection point of the upper vertex of the ear hook on the sagittal plane of the user in the long axis direction of the projection of the sound production component may be within a range of 6 mm-15 mm.

In some embodiments, in the long axis direction of the projection of the sound production component, the portion of the inner contour corresponding to the ear hook may include a left-most end and a right-most end. The left-most end and the right-most end may be respectively two endpoints of the first curve. In the non-wearing state, a distance between the left-most end and the right-most end in the long axis direction of the projection of the sound production component may be within a range of 25 mm-35 mm.

In some embodiments, in the long axis direction of the projection of the sound production component, the portion of the inner contour corresponding to the ear hook may include a left-most end, and in the non-wearing state, a distance between the extremum point and the left-most end in the first direction may be within a range of 20 mm-25 mm.

In some embodiments, in the long axis direction of the projection of the sound production component, the portion of the inner contour corresponding to the ear hook may include a left-most end, and in the non-wearing state, a distance between the projection point of the upper vertex on the sagittal plane and the left-most point in the first direction may be within a range of 17 mm-22 mm.

In some embodiments, in the non-wearing state, a distance between a projection point of a centroid of the headphone on the sagittal plane and the extremum point may be within a range of 20 mm-35 mm.

In some embodiments, in the non-wearing state, a distance between the extremum point and a projection point of a centroid of the sound production component on the sagittal plane may be within a range of 20 mm-30 mm.

In some embodiments, in the non-wearing state, a distance between the projection point of the upper vertex of the ear hook on the sagittal plane and a projection point of a centroid of the headphone on the sagittal plane may be within a range of 22 mm-35 mm.

In some embodiments, in the non-wearing state, a distance between the projection point of the upper vertex of the ear hook on the sagittal plane and a projection point of a centroid of the sound production component on the sagittal plane may be within a range of 18 mm-28 mm.

In some embodiments, the tangent segment may be tangent to the first end contour at a first tangent point, and the tangent segment may be tangent to the second end contour at a second tangent point. When the headphone is in the non-wearing state, an area of a triangle formed by the first tangent point, the second tangent point, and the extremum point may be within a range of 150 $mm^2$-190 $mm^2$.

In some embodiments, in the non-wearing state, a distance between a projection point of a centroid of the sound production component on the sagittal plane and a projection point of a centroid of the ear hook on the sagittal plane may be within a range of 20 mm-35 mm.

Some embodiments of the present disclosure also provide a headphone comprising a sound production component and an ear hook. The sound production component may include a transducer and a housing accommodating the transducer. The ear hook may include a first portion and a second portion. In a wearing state, the first portion may be hung between an auricle of a user and a head of the user, and the second portion may extend toward a side of the auricle away from the head and may be connected to the sound production component to place the sound production component in a position near an ear canal without blocking an opening of the ear canal. The ear hook and the sound production component may form a second projection on a sagittal plane of the user, wherein the second projection may include an outer contour, a first end contour, an inner contour, and a second end contour. In a non-wearing state, the inner contour, the first end contour, the second end contour, and a tangent segment connecting the first end contour and the second end contour may jointly define a second closed curve, and a second area of the second closed curve may be within a range of 50 $mm^2$-200 $mm^2$. A portion of the inner contour corresponding to the ear hook may include a first curve. The first curve may have an extremum point in a first direction, and the first direction may be perpendicular to a long axis direction of a projection of the sound production component. In the long axis direction of the projection of the sound production component, a distance between the extremum point and a projection point of an upper vertex of the ear hook on the sagittal plane of the user may be no greater than 5 mm, and the upper vertex of the ear hook may be a highest point of an inner contour of the ear hook along a vertical axis of the user in the wearing state.

In some embodiments, in the wearing state, at least a portion of the housing may cover an antihelix region.

In some embodiments, in the long axis direction of the projection of the sound production component, the portion of the inner contour corresponding to the ear hook may include a left-most end and a right-most end, and the left-most end and the right-most end may be respectively two endpoints of the first curve. A distance between the left-most end and the right-most end in the long axis direction of the projection of the sound production component may be within a range of 25 mm-35 mm.

In some embodiments, in the long axis direction of the projection of the sound production component, the portion of the inner contour corresponding to the ear hook may include a left-most end, and in the non-wearing state, a distance between the extremum point and the left-most end in the first direction may be within a range of 15 mm-20 mm.

In some embodiments, in the long axis direction of the projection of the sound production component, the portion of the inner contour corresponding to the ear hook may include a left-most end, and in the non-wearing state, the distance between the projection point of the upper vertex on the sagittal plane and the left-most end in the first direction may be within a range of 12 mm-17 mm.

In some embodiments, in the non-wearing state, a distance between a projection point of a centroid of the headphone on the sagittal plane and the extremum point may be within a range of 15 mm-30 mm.

In some embodiments, in the non-wearing state, a distance between the extremum point and a projection point of a centroid of the sound production component on the sagittal plane may be within a range of 15 mm-25 mm.

In some embodiments, in the non-wearing state, a distance between the projection point of the upper vertex of the ear hook on the sagittal plane and a projection point of a centroid of the headphone on the sagittal plane may be within a range of 17 mm-30 mm.

In some embodiments, in the non-wearing state, the distance between the projection point of the upper vertex of the ear hook on the sagittal plane and a projection point of a centroid of the sound production component on the sagittal plane may be within a range of 10 mm-20 mm.

In some embodiments, the tangent segment may be tangent to the first end contour at a first tangent point, and the tangent segment may be tangent to the second end contour at a second tangent point. When the headphone is in the non-wearing state, an area of a triangle formed by the first tangent point, the second tangent point, and the extremum point may be within a range of 150 $mm^2$-190 $mm^2$.

In some embodiments, in the non-wearing state, a distance between a projection point of a centroid of the sound production component on the sagittal plane and a projection point of a centroid of the ear hook on the sagittal plane may be within a range of 25 mm-40 mm.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numbers denote the same structures, wherein.

DETAILED DESCRIPTION

Figure 1:
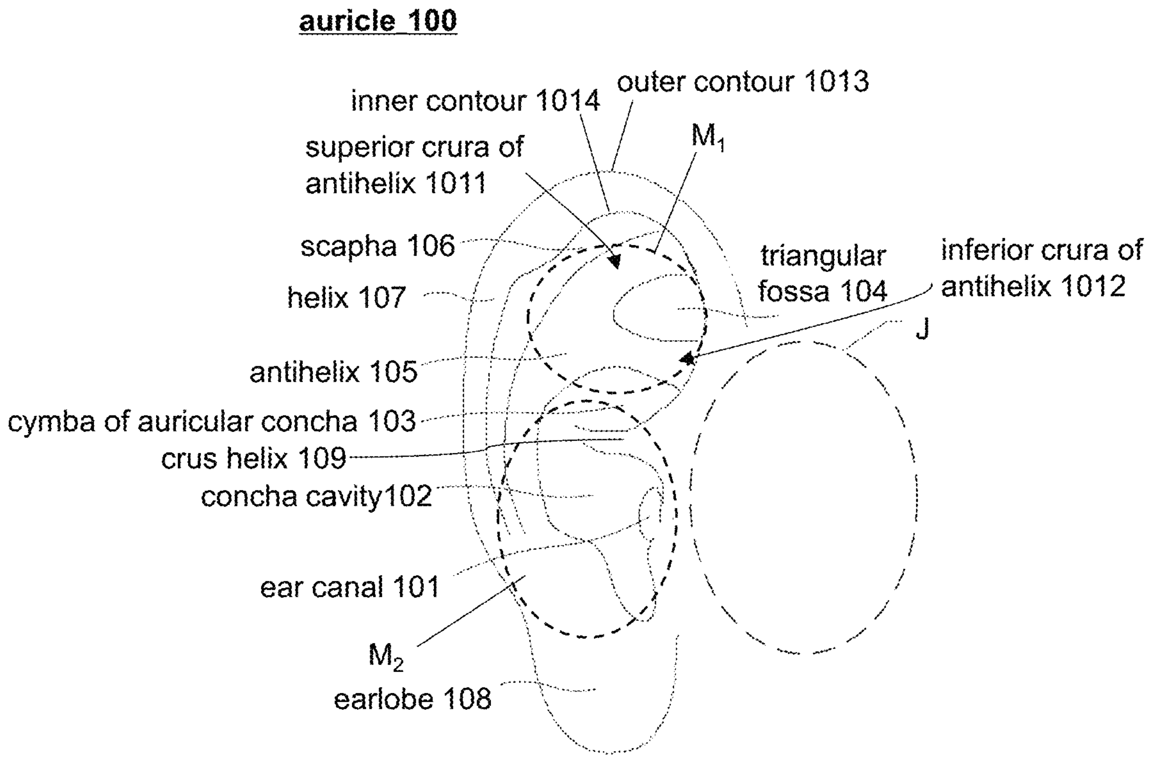
FIG. 1 is a schematic diagram illustrating an exemplary auricle according to some embodiments of the present disclosure.

In order to more clearly explain the technical scheme of the embodiment of this description, a brief description of the accompanying drawings required for the embodiment description is given below. Obviously, the accompanying drawings below are only some examples or embodiments of the present disclosure, and it is possible for ordinary technicians skilled in the art to apply the present disclosure to other similar scenarios according to these accompanying drawings without creative effort. Unless obviously obtained from the context or the context illustrates otherwise, the same numeral in the drawings refers to the same structure or operation.

It should be understood that "system," "device," "unit" and/or "module" as used herein is a manner used to distinguish different components, elements, parts, sections, or assemblies at different levels. However, if other words serve the same purpose, the words may be replaced by other expressions.

As used in the disclosure and the appended claims, the singular forms "a," "an," and "the" include plural referents unless the content clearly dictates otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

In the description of the present disclosure, it is to be understood that the terms "first," "second," "third," "fourth," etc. are used for descriptive purposes only, and are not to be understood as indicating or implying relative importance or implicitly specifying the number of technical features indicated. Thereby, the limitations "first," "second," "third," and "fourth" may expressly or implicitly include at least one such feature. In the description of the present disclosure, "plurality" means at least two, e.g., two, three, etc., unless explicitly and specifically limited otherwise.

In the present disclosure, unless otherwise clearly specified and limited, terms such as "connection" and "fixation" should be interpreted in a broad sense. For example, the term "connection" refers to a fixed attachment, a detachable attachment, or in one piece; the "connection" may be a mechanical or electrical connection; the "connection" may be a direct connection, an indirect connection through an intermediary, an internal communication between two elements, or an interaction relationship between two elements, unless otherwise clearly defined. For those skilled in the art, the specific meanings of the above terms in the present disclosure may be understood according to specific situations.

FIG. 1 is a schematic diagram illustrating an exemplary auricle according to some embodiments of the present disclosure. Referring to FIG. 1, an auricle 100 may include an ear canal 101, an auricular concha cavity 102, a cymba of auricular concha 103, a triangular fossa 104, an antihelix 105, a scapha 106, a helix 107, an earlobe 108, a crus helix 109, an outer contour 1013, and an inner contour 1014. It should be noted that for illustration purposes, a superior crura of antihelix 1011, an inferior crura of antihelix 1012, and the antihelix 105 illustrated in the embodiments of the present disclosure are collectively referred to as an antihelix region. In some embodiments, one or more parts of the auricle 100 may be used to achieve a stable wearing of an acoustic device. In some embodiments, the ear canal 101, the auricular concha cavity 102, the cymba of auricular concha 103, the triangular fossa 104, and other parts of the auricle 100 have a certain depth and volume in a three-dimensional space, which can be used to realize the need to wear the acoustic device. For example, the acoustic device (e.g., an in-ear headphone) may be worn in the ear canal 101. In some embodiments, the wearing of the acoustic device may be realized with the help of other parts of the auricle 100 other than the ear canal 101. For example, the wearing of the acoustic device may be achieved with the aid of the cymba of auricular concha 103, the triangular fossa 104, the antihelix 105, the scapha 106, the helix 107, or the like, or a combination thereof. In some embodiments, in order to improve the comfort and reliability of the acoustic device in wearing, parts such as the earlobe 108, etc., of the user may further be used. By utilizing parts of the auricle 100 other than the ear canal 101 for the wearing of the acoustic device and the transmission of sound, the ear canal 101 of the user can be "liberated," thereby reducing an impact of the acoustic device on the ear health of the user. When the user wears the acoustic device on the road, the acoustic device may not block the ear canal 101 of the user, so that the user can receive both sounds from the acoustic device and sounds from the environment (e.g., horn sounds, car bells, surrounding voices, traffic commands, etc.), thereby reducing the probability of traffic accidents. For example, when the user wears the acoustic device, the whole or part of a structure of the acoustic device may be located at a front side of the crus helix 109 (e.g., a region J enclosed by a dotted line in FIG. 1). As another example, when the user wears the acoustic device, the whole or part of the structure of the acoustic device may contact an upper portion of the ear canal 101 (e.g., positions where one or more parts such as the crus helix 109, the cymba of auricular concha 103, the triangular fossa 104, the antihelix 105, the scapha 106, the helix 107, etc., are located). As another example, when the user wears the acoustic device, the whole or part of the structure of the acoustic device may be located in one or more parts of the auricle (e.g., the auricular concha cavity 102, the cymba of auricular concha 103, the triangular fossa 104, etc.) (e.g., a region M1 enclosed by a dotted line in FIG. 1 containing at least the cymba of auricular concha 103 and the triangular fossa 104 and a region M2 containing at least the auricular concha cavity 102).

Different users may have individual differences, resulting in different shapes, dimensions, etc., of the auricle 100. For ease of description and understanding, if not otherwise specified, the present disclosure primarily uses an auricle model with a "standard" shape and dimension as a reference to further describe the wearing manners of the acoustic device in different embodiments on the auricle model. For example, a simulator (e.g., GRAS 45BC KEMAR) containing a head and (left and right) auricle 100 produced based on standards of ANSI: S3.36, S3.25, and IEC: 60318-7, may be used as a reference for wearing the acoustic device to present a scenario in which most users wear the acoustic device normally. Merely by way of example, the reference auricle may have the following relevant features: a projection of the auricle on a sagittal plane in a vertical axis direction may be within a range of 49.5 mm-74.3 mm, and a projection of the auricle on the sagittal plane in a sagittal axis direction may be within a range of 36.6 mm-55 mm. Thus, in the present disclosure, the descriptions such as "worn by the user," "in the wearing state," and "under the wearing state" may refer to the acoustic device described in the present disclosure being worn on the auricle 100 of the simulator. Certainly, considering the individual differences of different users, structures, shapes, sizes, thicknesses, etc., of one or more parts of the auricle 100 may take a differentiated design according to the auricles 100 of different shapes and dimensions, and the differentiated design may be manifested as values of feature parameters of one or more parts of the acoustic device (e.g., a sound production component, an ear hook, etc., hereinafter) may be within different ranges to fit different auricles 100. In addition, it should be noted that the "non-wearing state" is not limited to a state that the headphone is not worn on the auricle 100 of the user, but also includes a state that the headphone is not subjected to an external force to be deformed; the "wearing state" is not limited to a state in which the headphone is worn on the auricle 100 of the user, and a state that a suspension structure (e.g., an ear hook) and the sound production component are positioned at a corresponding distance may also be regarded as the wearing state.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane refers to a section perpendicular to the ground along a front and rear direction of the body, which divides the human body into left and right parts. The coronal plane refers to a section perpendicular to the ground along a left and right direction of the body, which divides the human body into front and rear parts. The horizontal plane refers to a section parallel to the ground along an up and down direction of the body, which divides the human body into upper and lower parts. Correspondingly, the sagittal axis refers to an axis along the front and rear direction of the body and perpendicular to the coronal plane. The coronal axis refers to an axis along the left and right direction of the body and perpendicular to the sagittal plane. The vertical axis refers to an axis along the up and down direction of the body and perpendicular to the horizontal plane. Further, the "front side of the auricle" as described in the present disclosure is a concept relative to the "rear side of the auricle," where the former refers to a side of the auricle away from the head and the latter refers to a side of the auricle facing the head, and both are in reference to the auricle of the user. In this case, observing the auricle of the above simulator in a direction along the coronal axis of the human body, a schematic diagram illustrating the front side of the auricle as shown in FIG. 1 is obtained.

The above description of the auricle 100 is for illustration purposes only and is not intended to limit the scope of the present disclosure. Those skilled in the art may make various changes and modifications based on the description of the present disclosure. For example, part of the structure of the acoustic device may cover part or the whole of the ear canal 101. These changes and modifications are still within the protection scope of the present disclosure.

Figure 2:
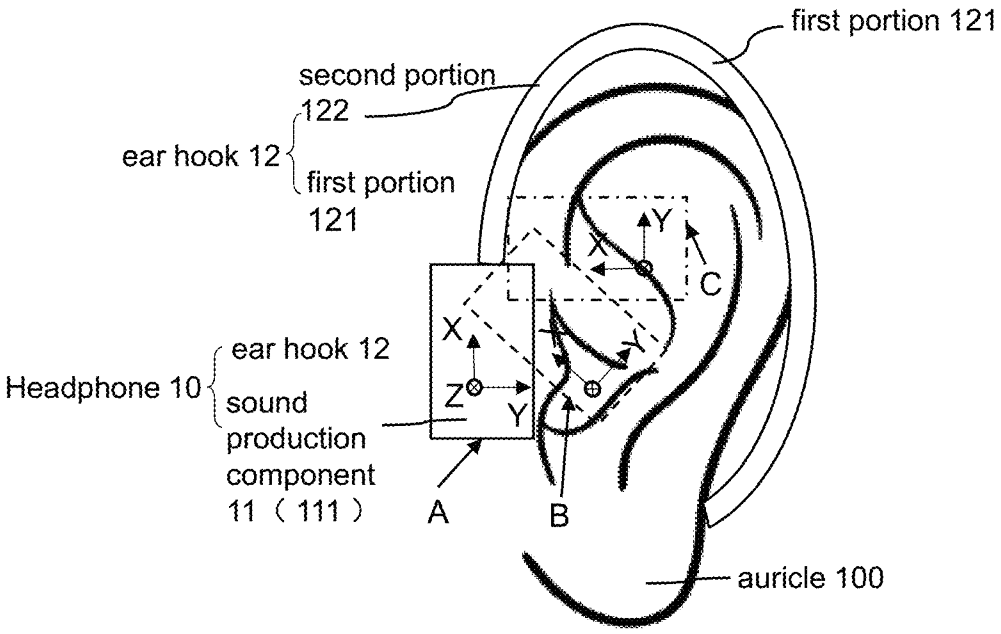
FIG. 2 is a schematic diagram illustrating an exemplary wearing of a headphone according to some embodiments of the present disclosure.

FIG. 2 is a schematic diagram illustrating an exemplary wearing of a headphone according to some embodiments of the present disclosure.

In some embodiments, the headphone 10 may include, but is not limited to, an air-conduction headphone, a bone air-conduction headphone, or the like. In some embodiments, the headphone 10 may be combined with products such as eyeglasses, a head-mounted headphone, a head-mounted display device, an AR/VR helmet, or the like.

As shown in FIG. 2, the headphone 10 may include a sound production component 11 and an ear hook 12. In some embodiments, the sound production component 11 of the headphone 10 may be worn on the body of the user (e.g., the head, neck, or upper torso of the human body) via the ear hook 12. In some embodiments, the sound production component 11 of the headphone 10 may be fixed on a position near the ear canal without blocking the ear canal via the ear hook 12, allowing the auricle 100 of the user to remain open, and allowing the user to both hear the sound output from the headphone 10 while accessing the sound from the external environment. For example, the headphone 10 may be arranged around or partially around the auricle 100 of the user and may propagate a sound through an air-conduction or bone-conduction manner.

In some embodiments, the ear hook 12 may include a first portion 121 and a second portion 122. The first portion 121 and the second portion 122 may be connected in sequence. In the wearing state, the first portion 121 of the ear hook 12 may be hung between the auricle of the user and the head, and the second portion 122 may extend toward a side of the auricle away from the head and connect to the sound production component 11. The sound production component 11 may be worn in a position near the ear canal without blocking the ear canal.

In some embodiments, in order to improve the stability of the headphone 10 in the wearing state, the headphone 10 may be used in any one of the following manners or a combination thereof. First, at least a portion of the ear hook 12 may be provided as a mimic structure that fits against at least one of the rear side of the auricle 100 and the head to increase a contact area of the ear hook 12 with the auricle 100 and/or the head, thereby increasing the resistance of the headphone 10 to fall off from the auricle 100. Second, at least a portion of the ear hook 12 may be provided as an elastic structure so that it has a certain degree of deformation in the wearing state to increase a positive pressure of the ear hook 12 on the auricle 100 and/or the head, thereby increasing the resistance of the headphone 10 to fall off from the auricle. Third, at least a portion of the ear hook 12 may be arranged to rest against the head in the wearing state to create a reaction force that presses against the auricle 100, to enable the sound production component 11 to be pressed on the front side of the auricle 100, thereby increasing the resistance of the headphone 10 to fall off from the auricle 100. Fourth, the sound production component 11 and the ear hook 12 may be provided to hold a region where the antihelix 105 is located, the region where the auricle is located, etc., from the front and rear sides of the auricle 100 in the wearing state, to increase the resistance of the headphone 10 to fall off from the auricle 100. Fifth, the sound production component 11 or an auxiliary structure connected thereto may be set to extend at least partially into cavities such as the auricular concha cavity 102, the cymba of auricular concha 103, the triangular fossa 104, and the scapha 106, to increase the resistance of the headphone 10 to fall off from the auricle.

In some embodiments, the ear hook 12 may have a curved structure adapted to fit at a junction of the user's head and auricle 100 to allow the ear hook 12 to be arranged between the user's auricle 100 and the head. Merely by way of example, the first portion 121 of the headphone 10 may connect the second portion 122 with the sound production component 11 to allow the headphone 10 to be curved in a three-dimensional space when the headphone 10 is in a non-wearing state (i.e., a natural state). In other words, the second portion 122, the first portion 121, and the sound production component 11 may not be coplanar in the three-dimensional space. When the headphone 10 is in the wearing state, the second portion 122 may be hung between the rear side of the auricle 100 and the head of the user, the sound production component 11 may contact with the front side of the auricle 100 of the user (e.g., region M3 in FIG. 1) or the auricle 100 (e.g., region M1, region M2 in FIG. 1), and the sound production component 11 and the second portion 122 may fit together to clamp the auricle 100. Specifically, the first portion 121 may extend from the head toward the outside of the head, which in turn cooperates with the second portion 122 to provide the sound production component 11 with a compression force against the auricle 100 or the front side of the auricle 100. The sound production component 11 may specifically press against the front side of the auricle 100 or a region where the auricular concha cavity 102, the cymba of auricular concha 103, the triangular fossa 104, the antihelix 105, etc., are located under the compression force so that the headphone 10 does not block the ear canal 101 of the auricle 100 when the headphone 10 is in the wearing state.

In some embodiments, the sound production component 11 may include a housing 111 and a transducer arranged in the housing 111.

The housing 111 may be connected to the ear hook 12 and may be configured to accommodate the transducer. In some embodiments, the housing 111 may be a closed housing structure that is internally hollow, and the transducer may be arranged in the housing 111. In some embodiments, the headphone 10 may be combined with products such as glasses, a headset, a head-mounted display device, an AR/VR headset, etc. In such cases, the housing 111 may be placed near the auricle 100 of the user in a hanging or clamping manner. In some alternative embodiments, a suspension structure (e.g., a hook) may be provided on the housing 111. For example, the shape of the hook matches the shape of the auricle, and the headphone 10 may be independently worn on the auricle 100 of the user through the hook.

In some embodiments, the housing 111 may be a housing structure having a shape suitable for the auricle 100 of the user, for example, regular or irregular shapes such as circular, elliptical, runway shape, polygonal (which is regular or irregular), U-shaped, V-shaped, semicircular, etc., so that the housing can be directly hung on the auricle 100 of the user. In some embodiments, the housing 111 may further include a fixed structure. The fixed structure may include an ear hook, an elastic band, etc., allowing the headphone 10 to be better worn by the user to prevent falling when using.

In some embodiments, when the user wears the headphone 10, the sound production component 11 may be located on an upper side, a lower side, or a front side (e.g., region J on a front side of a tragus shown in FIG. 1) of the auricle 100 of the user, or may be located inside the auricle (e.g., region M2 where the auricular concha cavity is located). Two or more acoustic holes (such as a sound outlet and a pressure relief hole) for propagating sound may also be set on the sound production component 11. In some embodiments, the transducer in the sound production component 11 may output sounds with a phase difference (e.g., phase opposite) through the two or more acoustic holes.

The transducer may be configured to convert an excitation signal (e.g., an electrical signal) into a corresponding mechanical vibration to produce sound. In some embodiments, the transducer may include a diaphragm. When the diaphragm vibrates, sounds may be emitted from a front side and a rear side of the diaphragm. In some embodiments, a front cavity (not shown) for transmitting sound may be provided at a position on the front side of the diaphragm within the housing 111. The front cavity may be acoustically coupled with an acoustic hole (e.g., the sound outlet) through which sound from the front side of the diaphragm can be emitted from the front cavity. A rear cavity (not shown) for transmitting sound may be provided at a position on a rear side of the diaphragm in the housing 111. The rear cavity may be acoustically coupled with another acoustic hole (e.g., a pressure relief hole), and sound from the rear side of the diaphragm can be emitted through the rear cavity from the pressure relief hole. In some embodiments, a core may include a core housing 111 (not shown), and the core housing 111 may be limited with the diaphragm of the transducer to form the front cavity and the rear cavity of the transducer. It needs to be understood that when the diaphragm is vibrating, the front side and the rear side of the diaphragm may simultaneously produce a set of sounds with a phase difference (e.g., phase opposite). When the sound passes through the front cavity and the rear cavity respectively, the sound may propagate outward from the sound outlet acoustically coupled with the front cavity and the pressure relief hole acoustically coupled with the rear cavity. In some embodiments, by setting structures of the front cavity and the rear cavity, the sound output by the transducer at the sound outlet and the pressure relief hole may satisfy a specific condition. For example, lengths of the front cavity and the rear cavity may be set so that a set of sounds with a specific phase relationship (e.g., phase opposite) may be output from the sound outlet and the pressure relief hole.

In some embodiments, the sound production component 11 may have a long axis direction X, a short axis direction Y, and a thickness direction Z orthogonal to each other. The long axis direction X may be defined as a direction having a relatively large extension dimension of a shape of a two-dimensional projection plane (e.g., a projection of the sound production component 11 on a plane where its inner side surface (a side surface close to the auricle 100) is located, or a projection on the sagittal plane) of the sound production component 11. For example, when the shape of the projection is rectangular or approximately rectangular, the long axis direction is the length direction of the rectangle or approximately rectangular. For ease of illustration, the present disclosure may be described in terms of a projection of the sound production component on the sagittal plane. The short axis direction Y may be defined as a direction perpendicular to the long axis direction X in the shape of the projection of the sound production component 11 on the sagittal plane. For example, when the shape of the projection is a rectangle or an approximate rectangle, the short axis direction is a width direction of the rectangle or approximate rectangle. The thickness direction Z may be defined as a direction perpendicular to the sagittal plane, e.g., in line with a direction of the coronal axis, both pointing to the left and right of the body.

In some embodiments, when the user wears the headphone 10, the sound production component 11 may be placed at a position near the ear canal 101 without blocking the ear canal 101. In some embodiments, in the wearing state, the projection of the headphone 10 on the sagittal plane may not cover the ear canal of the user. For example, the projection of the sound production component 11 on the sagittal plane may fall on the left and right sides of the head and may be on the sagittal axis of the human body at the front side of the tragus (e.g., a position shown by solid line box A in FIG. 2). In this case, the sound production component 11 may be arranged on the front side of the tragus, the long axis of the sound production component 11 may be in a vertical or substantially vertical state, the projection of the short axis direction Y on the sagittal plane may be in the same direction as the sagittal axis direction, the projection of the long axis direction X on the sagittal plane may be in the same direction as the vertical axis direction, and the thickness direction Z may be perpendicular to the sagittal plane. As another example, the projection of the sound production component 11 on the sagittal plane may fall on the antihelix 105 (e.g., the position shown in dashed box C in FIG. 2). At this time, the sound production component 11 may be at least partially arranged at the antihelix 105, the long axis of the sound production component 11 may be in a horizontal or substantially horizontal state. The projection of the long axis direction X of the sound production component 11 may be in the same direction as the sagittal axis direction, the projection of the short axis direction Y on the sagittal plane may be in the same direction as the vertical axis direction, and the thickness direction Z may be perpendicular to the sagittal plane. In this case, the sound production component 11 may be avoided from blocking the ear canal, thereby freeing the ears of the user. Further, the contact area between the sound production component 11 and the auricle 100 may be increased, thereby improving the wearing comfort of the headphone 10.

In some embodiments, in the wearing state, the projection of the headphone 10 on the sagittal plane may also cover or at least partially cover the ear canal of the user. For example, the projection of the sound production component 11 on the sagittal plane may fall within the auricular concha cavity 102. At this time, the sound production component 11 may be at least partially arranged in the auricular concha cavity 102, and the sound production component 11 may be in a tilted state (e.g., the position shown by the dotted box B in FIG. 2). At this time, the long axis direction X and the short axis direction Y may still be parallel or approximately parallel to the sagittal plane, the projection of the short axis direction Y of the sound production component 11 on the sagittal plane may have an included angle with the sagittal axis direction, i.e., the short axis direction Y may also be set to be tilted accordingly, the projection of the long axis direction X of the sound production component 11 on the sagittal plane may have an included angle with the sagittal axis direction, i.e., the long axis direction X may be set to be tilted, and the thickness direction Z may be perpendicular to the sagittal plane. At this time, as the auricular concha cavity 102 has a certain volume and depth, there may be a certain distance between the inner side surface of the headphone 10 and the auricular concha cavity, and the ear canal may be communicated with the outside through a leaking structure between the inner side surface and the auricular concha cavity, thereby freeing the ears of the user. At the same time, the sound production component 11 and the auricular concha cavity may cooperate to form an auxiliary cavity (i.e., the cavity structure mentioned hereinafter) that is communicated with the ear canal. In some embodiments, the sound outlet may be at least partially arranged in the auxiliary cavity, and the sound exported from the sound outlet may be limited by the auxiliary cavity, i.e., the auxiliary cavity may aggregate the sound, allowing the sound to propagate more into the ear canal, to increase the volume and quality of the sound heard by the user in a near field, thereby improving an acoustic effect of the headphone 10.

In addition, the wearing position of the sound production component 11 is not limited to positions A, B, C, etc., shown in FIG. 2, as long as it meets the requirements of region J, region M1, or region M2 as shown in FIG. 1. For example, the whole or a portion of the sound production component 11 may be located on the front side of the crus helix 109 (e.g., the region J surrounded by the dashed line in FIG. 1). As another example, the whole or a portion of the structure of the sound production component 11 may contact an upper portion of the ear canal 101 (e.g., where one or more of the crus helix 109, the cymba of auricular concha 103, the triangular fossa 104, the antihelix 105, the scapha 106, the helix 107, etc., are located). As another example, the whole or a portion of the structure of the sound production component 11 may be located within a cavity formed by one or more parts (e.g., the auricular concha cavity 102, the cymba of auricular concha 103, the triangular fossa 104, etc.) of the auricle 100 (e.g., region M1 enclosed by a dotted line in FIG. 1 containing at least the cymba of auricular concha 103 and the triangular fossa 104 and region M2 enclosed by a dotted line in FIG. 1 containing at least the auricular concha cavity 102).

The description of the headphone 10 is for exposition only and is not intended to limit the scope of the present disclosure. For those skilled in the art, a wide variety of variations and modifications can be made based on the description of the present disclosure. For example, the headphone 10 may also include a battery component, a Bluetooth component, etc., or a combination thereof. The battery component may be configured to power the headphone 10. The Bluetooth component may be configured to wirelessly connect the headphone 10 to other devices (e.g., cell phones, computers, etc.). These variations and modifications remain within the protection scope of the present disclosure.

Figure 3:
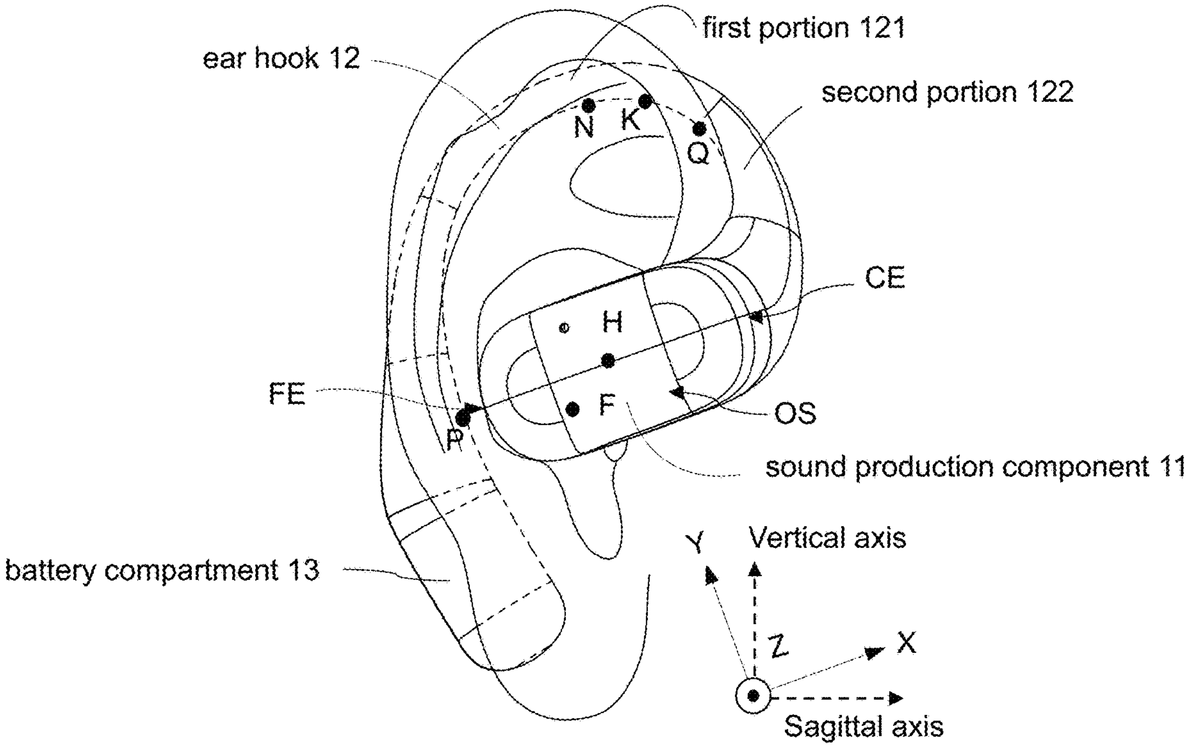
FIG. 3 is a schematic diagram illustrating an exemplary structure of a headphone according to some embodiments of the present disclosure.

FIG. 3 is a schematic diagram illustrating an exemplary structure of a headphone according to some embodiments of the present disclosure. Referring in conjunction with FIG. 2 and FIG. 3, a left side of the ear is shown in FIG. 2, and a right side of the ear is shown in FIG. 3.

As shown in FIG. 3, the ear hook 12 is an arc structure that fits into a junction of the head of the user and the auricle 100. The sound production component 11 (or the housing 111 of the sound production component 11) may have a connecting end CE that is connected to the ear hook 12 and a free end FE that is not connected to the ear hook 12. When the headphone 10 is in the wearing state, the first portion 121 of the ear hook 12 may be hung between the auricle 100 of the user and the head, and the second portion 122 of the ear hook 12 may extend toward a side of the auricle 100 away from the head and connects with the connecting end CE of the sound production component 11 to insert the sound production component 11 at least partially into the auricular concha cavity 102. For example, the free end FE of the sound production component 11 may extend into the auricular concha cavity 102. That is to say, the projection of the housing of the sound production component 11 on the sagittal plane may have an overlapping portion with the projection of the auricular concha cavity 102 on the sagittal plane. For example, the projection of the sound production component 11 on the sagittal plane may fall within the auricular concha cavity 102. In the wearing state, the projection of the headphone 10 on the sagittal plane may also cover, or at least partially cover, the ear canal of the user. At this time, the sound production component 11 may be located in the region M2 (illustrated in FIG. 1) above the auricular concha cavity 102 and the ear canal 101, and the sound production component 11 may set to be tilted in the long axis direction X (as shown in position B in FIG. 2). The long axis direction X of the sound production component 11 and the short axis direction Y may still be parallel or approximately parallel to the sagittal plane, the projection of the short axis direction Y of the sound production component 11 on the sagittal plane may have an included angle with the sagittal axis direction, i.e., the short axis direction Y may also be set to be tilted accordingly, the projection of the long axis direction X of the sound production component 11 on the sagittal plane may have an included angle with the sagittal axis direction, i.e., the long axis direction X may be set to be tilted, and the thickness direction Z may be perpendicular to the sagittal plane. The ear hook 12 and the sound production component 11 of such structures may be better adapted to the auricle 100 of the user, which may increase the resistance of the headphone 10 to fall off from the auricle 100, thus increasing the wearing stability of the headphone 10.

In some embodiments, in the wearing state, observing along the thickness direction Z, the connecting end CE of the sound production component 11 may be closer to the top of the head as compared to the free end FE to allow the free end FE to extend into the auricular concha cavity. In this case, an included angle between the short axis direction Y and a direction in which the sagittal axis of the human body is located may be within a range of 30°-40°. If the included angle is too small, the free end FE may not extend into the auricular concha cavity, and a sound outlet on the sound production component 11 may be too far from the ear canal. If the included angle is too large, the sound production component 11 may also not extend into the auricular concha cavity, and the ear canal may be blocked by the sound production component 11. In other words, the sound production component 11 is set up in such a way to allow the sound production component 11 to extend into the auricular concha cavity, and at the same time to make the sound outlet on the sound production component 11 have a suitable distance from the ear canal, so that the user can hear the sound produced by the sound production component 11 more when the ear canal is not blocked.

In some embodiments, the first portion 121 of the ear hook 12 may include a battery compartment 13. The battery compartment 13 may be provided with a battery electrically connected to the sound production component 11. In some embodiments, the battery compartment 13 may be arranged on the first portion 121 at an end away from the sound production component 11, and a projection contour of the ear hook 12 at the end away from the sound production component 11 may be a projection contour of the free end of the battery compartment 13 on the sagittal plane of the user. In some embodiments, when the user wears the headphone 10, the sound production component 11 and the battery compartment 13 may be located on the front side and the back side of the ear, respectively.

In some embodiments, continuing to refer to FIG. 3, the sound production component 11 may have an inner side surface facing the auricle along the thickness direction Z in the wearing state, an outer side surface OS that is away from the auricle, and a connecting surface connecting the inner side surface and the outer side surface OS. It should be noted that, in the wearing state, observing along the thickness direction Z, the sound production component 11 may be provided with a shape such as a circle, an oval, a rounded square, a rounded rectangle, etc. When the sound production component 11 is provided in the shape of a circle, an ellipse, etc., the connecting surface refers to a curved side surface of the sound production component 11, and when the sound production component 11 is provided in the shape of a rounded square, a rounded rectangle, etc., the connecting surface may include a lower side surface LS, an upper side surface US, and a rear side surface RS as mentioned later. Thus, for ease of description, the present embodiment is exemplary in that the sound production component 11 is set up as a rounded rectangle. A length of the sound production component 11 in the long axis direction X may be greater than a width of the sound production component 11 in the short axis direction Y. As shown in FIG. 3, the sound production component 11 may have the upper side surface US that is away from the ear canal 101 along the short axis direction Y in the wearing state, the lower side surface LS that faces the ear canal 101, and the rear side surface RS that connects the upper side surface US and the lower side surface LS. The rear side surface RS may be located at an end of the long axis direction X toward the back of the head in the wearing state and at least partially located within the auricular concha cavity 102. The free end FE of the sound production component 11 may be provided on the rear side surface RS.

In some embodiments, the sound production component 11 and the ear hook 12 may be arranged to clamp the auricle 100 region from the front and back sides of the auricle 100 region corresponding to the auricular concha cavity, which increases the resistance of the headphone 10 to fall off from the auricle 100, thereby improving the stability of the headphone 10 in the wearing state. For example, the free end FE of the sound production component 11 may be pressed within the auricular concha cavity in the thickness direction Z. In some embodiments, the free end FE may be abutted against the auricular concha cavity in the long axis direction X and the short axis direction Y (e.g., the free end FE is abutted against an inner wall of the auricular concha cavity). The free end FE refers to a specific region away from the connecting end CE obtained by cutting the sound production component 11 along the Y-Z plane (a plane formed by the short axis direction Y and the thickness direction Z), and a ratio of a long axis dimension of the specific region to the long axis dimension of the sound production component may be within a range of 0.05-0.2.

It should be noted that, in the wearing state, the free end FE of the sound production component 11, in addition to extending into the auricular concha cavity, may also be projected orthogonally onto the antihelix, and may be projected orthogonally onto the left and right sides of the head and be located in a position at front of the auricle along the sagittal axis of the human body. In other words, the ear hook 12 may support the sound production component 11 to be worn on wearing positions such as the auricular concha cavity, the antihelix, the front side of the auricle, etc. The following takes the headphone 10 shown in FIG. 3 as an example to describe the headphone 10 in detail. It should be known that, without violating a corresponding acoustic principle, the structure and the corresponding parameters of the headphone 10 in FIG. 3 may also be applicable to headphones of other structures mentioned above.

By at least partially inserting the sound production component 11 into the auricular concha cavity 102, a listening volume of a listening position (e.g., the ear canal), especially the listening volume with middle and low frequencies may be increased, while still maintaining a good effect of far-field leakage cancellation. Merely by way of example, when the whole or a portion of the structure of the sound production component 11 is inserted into the auricular concha cavity 102, the sound production component 11 and the auricular concha cavity 102 may form a structure similar to a cavity (which is referred to as a cavity-like entity hereinafter). In the embodiments of the present disclosure, the cavity-like entity may be understood as a semi-closed structure enclosed by a sidewall of the sound production component 11 and the auricular concha cavity 102. The semi-closed structure may ensure that an inner environment is not completely closed and isolated from an outer environment but has a leaking structure (e.g., an opening, a gap, a pipe, etc.) acoustically communicating with the outer environment. When the user wears the headphone 10, one or more sound outlets may be provided on the housing of the sound production component 11 close to or facing the ear canal of the user, and one or more pressure relief holes may be provided on one or more other sidewalls (e.g., a sidewall far away or deviated from the ear canal of the user) of the housing of the sound production component 11. The sound outlets may be acoustically coupled with a front cavity of the headphone 10, and the pressure relief holes are acoustically coupled with a rear cavity of the headphone 10. Taking the sound production component 11 including a sound outlet and a pressure relief hole as an example, a sound output from the sound outlet and a sound output from the pressure relief hole may be approximately regarded as two sound sources, and sound waves of the two sound sources are in opposite phases. The sound production component 11 and an inner wall corresponding to the auricular concha cavity 102 may form a cavity-like structure. A sound source corresponding to the sound outlet is located in the cavity-like structure, and a sound source corresponding to the pressure relief hole may be located outside the cavity-like structure to form an acoustic model shown in FIG. 4.

Figure 4:
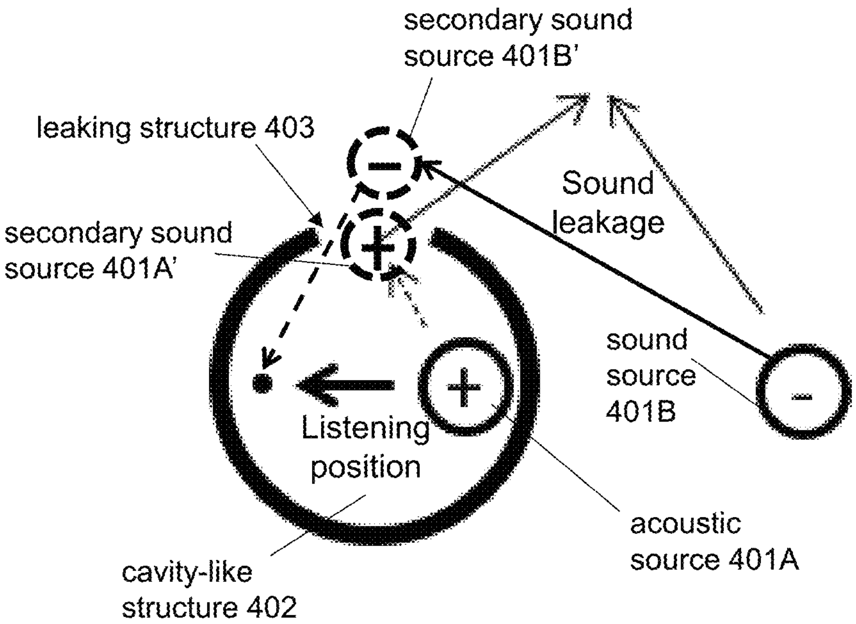
FIG. 4 is a schematic diagram illustrating an acoustic model formed by a headphone according to some embodiments of the present disclosure.

FIG. 4 is a schematic diagram illustrating an acoustic model formed by a headphone according to some embodiments of the present disclosure. As shown in FIG. 4, a cavity-like structure 402 may include a listening position and at least one acoustic source 401A. The word "include" herein may indicate that at least one of the listening position and the sound source 401A is located in the cavity-like structure 402, or at least one of the listening position and the sound source 401A is located at an inner edge of the cavity-like structure 402. The listening position may be equivalent to an entrance of the ear canal, or be an acoustic reference point of the ear, such as an ear reference point (ERP), an ear-drum reference point (DRP), etc., or may be an entrance structure conducted to a listener, etc. Since the sound source 401A is surrounded by the cavity-like structure 402, most of the sounds emitted from the sound source 401A may reach the listening position through a direct radiation or reflection manner. In contrast, without the cavity-like structure 402, most of the sounds emitted from the sound source 401A may not reach the listening position. Therefore, the arrangement of the cavity-like structure significantly increases the sound volume reaching the listening position. At the same time, only a minor part of sounds with an opposite phase emitted from the sound source 401B with an opposite phase located at the outside of the cavity-like structure 402 can enter the cavity-like structure 402 through a leaking structure 403 of the cavity-like structure 402, which is equivalent to a secondary sound source 401B' generated at the leaking structure 403. An intensity of the secondary sound source 401B' may be significantly smaller than an intensity of the sound source 401B, and significantly smaller than an intensity of the sound source 401A. The sound emitted from the secondary sound source 401B' has a weak reverse-phase cancellation effect on the sound source 401A in the cavity, so that the listening volume at the listening position can be significantly increased. For the sound leakage, the sound source 401A radiates a sound to the outside through the leaking structure 403 of the cavity is equivalent to generating a secondary sound source 401A' at the leaking structure 403. Since almost all sounds emitted from the sound source 401A are output through the leaking structure 403, and a size of the cavity-like structure 402 is much smaller than a space size for evaluating the sound leakage (a difference with at least one order of magnitude), an intensity of the secondary sound source 401A' can be considered as comparable to that of the sound source 401A. For the external space, the secondary sound source 401A' and the sound source 401B may form a double-point sound source.

In a specific application scenario, the outer wall surface of the housing of the sound production component 11 may usually be a plane surface or a curve surface, and a contour of the auricular concha cavity may be an uneven structure. By inserting the whole or a portion of the structure of the sound production component 11 into the auricular concha cavity, the cavity-like structure that is in communication with the outside may be formed between the sound production component 11 and the contour of the auricular concha cavity. Furthermore, the acoustic model shown in FIG. 4 may be formed by arranging the sound outlet at a position of the housing of the sound production component 11 facing the ear canal of the user and close to an edge of the auricular concha cavity 102 (e.g., the inner side surface IS) and arranging the pressure relief hole at a position of the sound production component 11 deviated from or far away from the ear canal, thereby increasing the listening volume at the ear canal of the user and reducing the far-field leakage sound when the user wears the headphone.

In some embodiments, by designing the shape and size of the ear hook 12, the compatibility of the ear hook 12 with an ear of the user may be improved, and the stability and adjustability of the headphone 10 may be improved. Additionally, the ear hook 12 may be adjusted to place the sound production component 11 at a specific position on the auricle of the user, thereby improving the listening effect of the headphone 10.

In order to understand and describe the shape of the headphone 10 in the non-wearing state or the wearing state, the headphone 10 may be projected onto a specific plane, and the headphone 10 may be described by parameters related to a projection shape on the plane. Merely by way of example, in the wearing state, the headphone 10 may be projected on the sagittal plane of the human body to form a corresponding projection shape. In the non-wearing state, with reference to a relative positional relationship between the sagittal plane of the human body and the headphone 10, a first plane similar to the sagittal plane of the human body may be constructed, so that a projection shape formed by the headphone 10 projected on the first plane may be similar to a projection shape of the headphone 10 on the sagittal plane of the human body. The first plane may be determined in the following manner: the ear hook 12 may be placed on a flat support plane (such as a horizontal desktop, a ground plane, etc.), and when the ear hook 12 is in contact with the support plane and placed stably, the support plane is the first plane corresponding to the headphone 10. Certainly, in order to maintain the uniformity of the specific plane corresponding to the wearing state and the non-wearing state, the first plane may also be the sagittal plane of the human body. In some embodiments, the first plane also refers to a plane formed by a bisector that bisects or approximately bisects the ear hook 12 along a direction in which the ear hook 12 extends its length.

Figure 5:
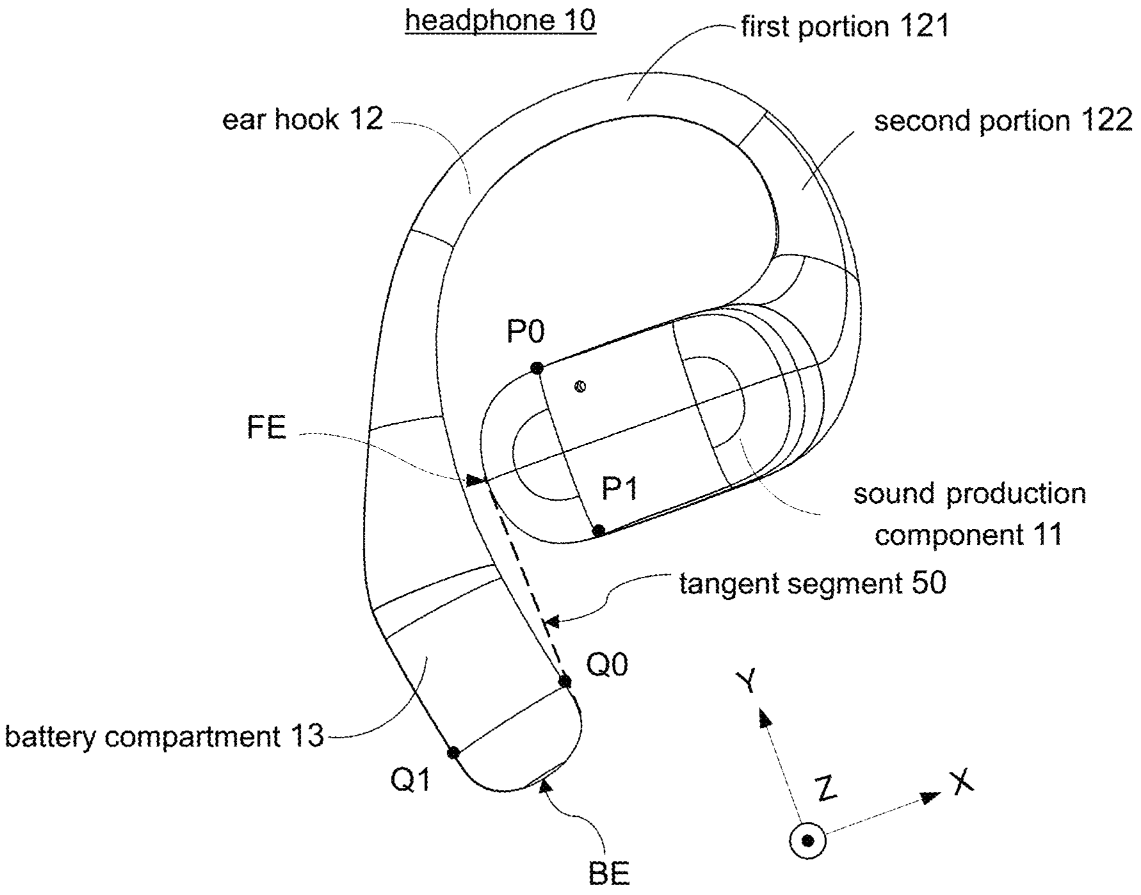
FIG. 5 is a schematic diagram illustrating a structure of a headphone in a non-wearing state according to some embodiments of the present disclosure.
Figure 6:
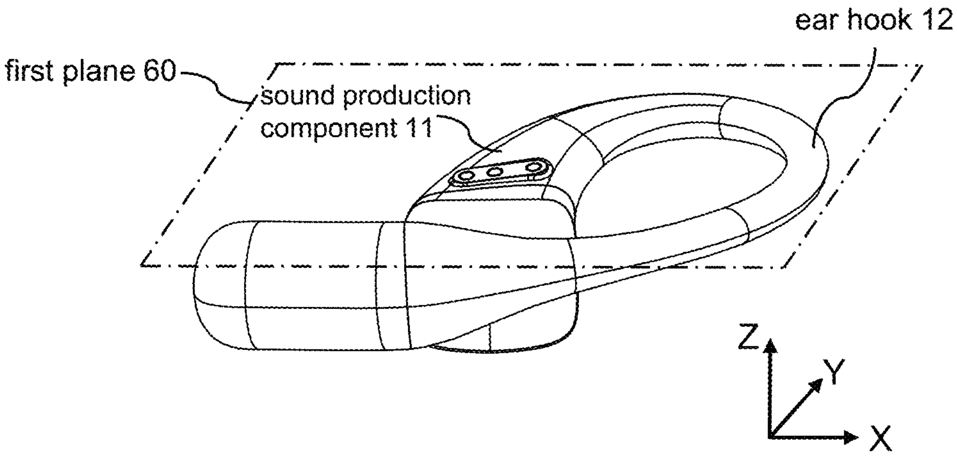
FIG. 6 is a schematic diagram illustrating a first projection formed by projecting a headphone in a first plane in a non-wearing state according to some embodiments of the present disclosure.

FIG. 5 is a schematic diagram illustrating a structure of a headphone in a non-wearing state according to some embodiments of the present disclosure. FIG. 6 is a schematic diagram illustrating a first projection formed by projecting a headphone in a first plane in a non-wearing state according to some embodiments of the present disclosure.

In conjunction with FIG. 5 and FIG. 6, in some embodiments, the first projection includes an outer contour, a first end contour, an inner contour, and a second end contour. The first end contour may be a projection contour of the free end FE of the sound production component 11 on the first plane, and two endpoints P0 and P1 of the first end contour are projection points of the free end FE at a junction with the rest of the sound production component 11 on the first plane. The division of the free end FE may be seen in the relevant description in FIG. 3 of the present disclosure. The second end contour may be a projection contour of the end BE of the ear hook 12 on the first plane, and two endpoints Q0 and Q1 of the second end contour are projection points of the end BE at a junction with the rest of the ear hook 12 on the first plane. The outer contour may be a contour of the first projection from the endpoint P1 to the endpoint Q1. The inner contour may be a contour of the first projection from the endpoint P0 to the endpoint Q0.

It should be noted that the end BE of the ear hook 12 may be at least part of a region at an end of the first portion of the ear hook 12 away from the second portion. The end of the first portion of the ear hook 12 away from the second portion may be a regularly or irregularly shaped structure, which is illustrated here exemplarily to further illustrate the end BE of the ear hook 12. For example, when the end of the first portion of the ear hook 12 away from the second portion is a cuboid, an end wall thereof is flat. In such a case, the end BE of the ear hook 12 is an end side wall of the end of the first portion of the ear hook 12 away from the second portion. As another example, when the end of the first portion of the ear hook 12 away from the second portion is a sphere, an ellipsoid, or an irregular structure, the end BE of the ear hook 12 may be a region obtained by extending a specific distance from the farthest position away from the second portion to the second portion along an extension direction of the first portion of the ear hook 12, a ratio of the specific distance to a total extension distance of the first portion of the ear hook 12 may be within a range of 0.05-0.2.

Taking the projection of the sound production component 11 on the first plane 60 being a rectangular-like shape (e.g., runway shape) as an example, there are parallel or approximately parallel projections of the upper side surface and lower side surface in the projection of the sound production component 11, and a first end contour connecting the projections of the upper side surface and lower side surface. The first end contour may be a straight-line segment or a circular arc. Points P0 and P1 indicate two ends of the first end contour respectively. Merely by way of example, the point P0 may be a junction point between an arc projected by the free end FE and the line segment projected by the upper side surface, and similarly to the point P0, the point P1 may be a junction point between an arc projected by the free end FE and the line segment projected by the lower side surface. Similarly, the ear hook has a free end at an end away from the sound production component 11. A projection of the free end of the ear hook on the first plane 60 may form the second end contour, which may be a straight-line segment or an arc, with points Q0 and Q1 indicating the two ends of the second end contour respectively. In some embodiments, the points Q0 and Q1 may be two endpoints of a line segment or arc projected by the free end of the first portion 121 of the ear hook on the first plane 60 in a direction away from the second portion 122 of the ear hook, and further, the endpoint close to the sound production component 11 in the long axis direction X of the sound production component 11 is the point Q0 and the endpoint away from the sound production component 11 is the point Q1.

The shape of the projection of the headphone 10 on the first plane 60 and the shape of the projection of the headphone 10 on the sagittal plane of the human body can reflect the manner in which the headphone 10 is worn on the ear. For example, an area of the first projection may reflect a region that covers the auricle when the headphone 10 is in the wearing state and the way the sound production component 11 and the ear hook contact the auricle. In some embodiments, as the sound production component 11 is not in direct contact with the first portion 121 of the ear hook, the inner contour, the outer contour, the first end contour, and the second end contour in the first projection may form a non-enclosed region. The region is closely related to the wearing effect of the headphone 10 (e.g., the wearing stability, the sound position, etc.). For ease of understanding, in some embodiments, a tangent segment 50 connecting the first end contour and the second end contour may be determined to define a first closed curve together by the tangent segment 50, the inner contour, and the first end contour. An area of the region enclosed by the first closed curve is the first area. The first closed curve may reflect a fitness between the sound production component 11 and the ear hook 12 with the auricle of the ear when the headphone 10 is worn.

It is considered that the relative positions of the sound production component 11 and the ear canal (e.g., the auricular concha cavity) of the user may affect the count and the opening size of leaking structures of the cavity-like structure formed by the sound production component 11 and the auricular concha cavity of the user, and the size of the opening of the leaking structure may directly affect the listening quality. Specifically, if the first area is too large, the sound production component 11 may not be able to touch the edge of the auricular concha cavity, thereby resulting in increased sound radiating directly outwards from the sound production component 11 and less sound reaching the listening position, which in turn leads to a reduction in the sound production efficiency of the sound production component 11. In some embodiments, considering the overall structure of the headphone 10 and the need for the shape of the ear hook to fit the space between the auricle of the ear and the head, etc., the first area of the first closed curve may be within a range of 300 $mm^2$-500 $mm^2$. In some embodiments, if the first area is too small, a distance between an extremum point of the ear hook and the sound production component 11 may be too small or the clamping force between the ear hook and the sound production component on the auricle of the user may be too much. Thus, in some embodiments, the first area may not be less than 200 $mm^2$. In summary, to reduce the sound radiated directly outwardly by the sound production component 11, to ensure the listening volume of the headphone 10 at the listening position (e.g., at the opening of the ear canal), and to improve the comfort of the user when wearing the headphone 10, in some embodiments, the first area of the first closed curve may be within a range of 250 $mm^2$-400 $mm^2$.

When setting the range of the first area of the first closed curve to be within the range of 300 $mm^2$-500 $mm^2$, it is necessary to further set the shape and size of the ear hook 12. Therefore, on the one hand, the ear hook 12 may be adapted to the ear of the user to improve the wearing stability and adjustability of the headphone 10, and on the other hand, the sound production component 11 connected to the ear hook 12 may be ensured to be sufficiently tilted so that the free end FE of the sound production component 11 can be located in the auricular concha cavity 102 to improve the listening effect of the headphone 10. The shape and size of the ear hook 12 may be described hereinafter in connection with the first curve involved in FIG. 7.

Figure 7:
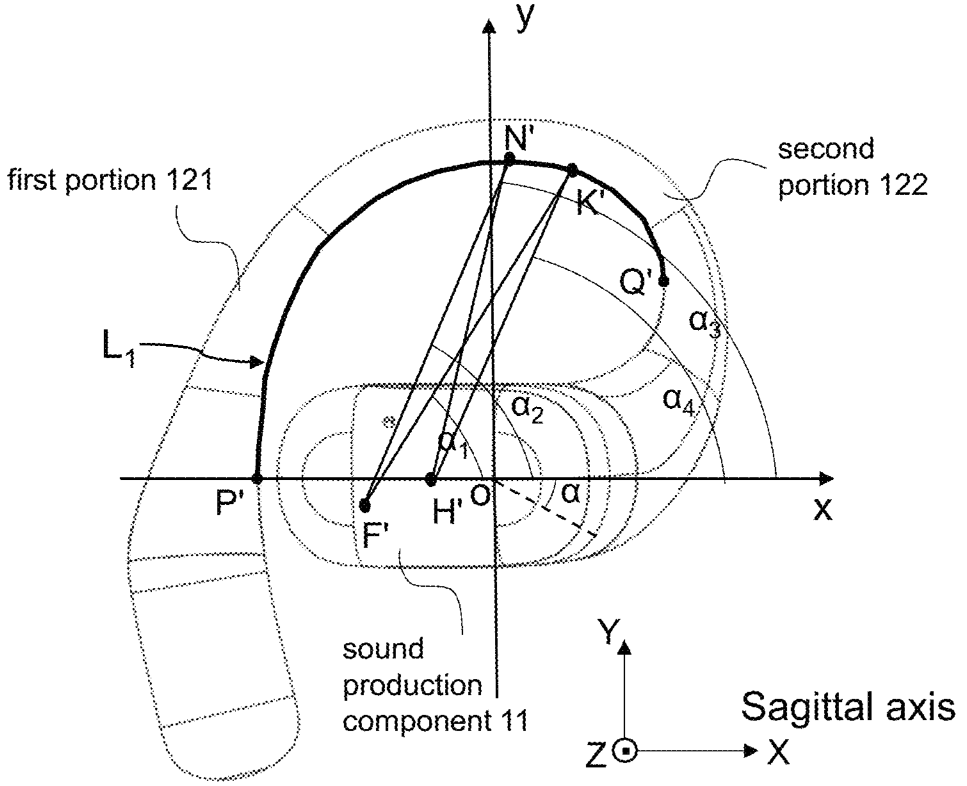
FIG. 7 is a schematic diagram illustrating a first curve of a projection of a headphone on a sagittal plane of a user according to some embodiments of the present disclosure.

FIG. 7 is a schematic diagram illustrating a first curve of a projection of a headphone on a sagittal plane of a user according to some embodiments of the present disclosure.

In some embodiments, as shown in FIG. 7, a first curve L1 in a projection of the ear hook 12 on the sagittal plane of the user may be designated as a reference curve of the ear hook 12. In some embodiments, since the headphone 10 is in the wearing state, a region where the ear hook 12 is in contact with the ear of the user is mainly an inner contour of the ear hook 12, so that the first curve L1 may be a reference curve corresponding to an inner contour of the projection of the ear hook 12 on the sagittal plane of the user. In some embodiments, in the long axis direction X of the projection of the sound production component 11, the curve corresponding to the inner contour of the projection of the ear hook 12 on the sagittal plane of the user may have a left-most end (point P') and a right-most end (point Q'). A part of the curve of the inner contour of the projection of the ear hook 12 on the sagittal plane of the user between point P' and point Q' is the first curve L1. As shown in FIG. 3, an actual position corresponding to point P' on the ear hook 12 is point P, and an actual position corresponding to point Q' on the ear hook 12 is point Q. By designing features (such as an extremum point, etc.) of the first curve L1, the shape and size of the ear hook 12 may be determined, thereby improving the compatibility between the ear hook 12 and the ear of the user, and improving the stability and adjustability of the headphone 10. On the other hand, the ear hook 12 may be adjusted to place the sound production component 11 at a specific position of the ear of the user to improve the listening effect of the headphone 10.

After setting the range of the first area of the first closed curve to be within a range of 300 $mm^2$-500 $mm^2$, it is necessary to limit the size of the first closed curve in the long axis direction of the projection of the sound production component 11. If the size of the first closed curve in the long axis direction of the projection of the sound production component 11 is too small, the connecting end between the ear hook 12 and the sound production component may clamp the ear of the user too tightly with the end BE. If the size of the first closed curve in the long axis direction of the projection of the sound production component 11 is too large, a distance between the sound production component 11 and an upper vertex of the ear hook may be too small, causing the free end FE of the sound production component 11 not being able to be arranged within the auricular concha cavity 102. In some embodiments, the size of the first closed curve in the long axis direction of the projection of the sound production component 11 may be characterized by a distance between the left-most end (point P') and the right-most end (point Q') of the first curve L1 in the long axis direction of the projection of the sound production component 11. In some embodiments, the distance between the left-most end (point P') and the right-most end (point Q') of the first curve L1 in the long axis direction of the projection of the sound production component 11 may be within a range of 25 mm-35 mm. In some embodiments, to ensure better wearing stability of the headphone 10, the distance between the left-most end (point P') and the right-most end (point Q') of the first curve L1 in the long axis direction of the projection of the sound production component 11 may be within a range of 28 mm-33 mm. In some embodiments, in order to enable the free end FE of the sound production component 11 to be closer to the edge of the auricular concha cavity 102 so that the cavity-like structure may have a larger volume to improve the sound production efficiency of the sound production component 11, the distance between the left-most end (point P') of the first curve L1 and the right-most end (point Q') of the first curve L1 in the long axis direction of the projection of the sound production component 11 may be within a range of 30 mm-32 mm.

As shown in FIG. 7, in some embodiments, to establish a first rectangular coordinate system xoy, the long axis direction X of the projection of the sound production component 11 on the sagittal plane may be designated as an x-axis, the short axis direction Y may be designated as a y-axis, and an intersection of the x-axis and the y-axis may be designated as an origin o. The first curve L1 may be regarded as a curve in the first rectangular coordinate system xoy.

In some embodiments, the y-axis direction may be referred to as a first direction, that is, the first direction is perpendicular to the long axis direction X of the projection of the sound production component 11 on the sagittal plane of the user and faces a direction of the top of the head of the user. In some embodiments, in the first rectangular coordinate system xoy, the first curve L1 may have an extremum point N' in the first direction. A positional relationship among the extremum point N', the ear hook 12, and other position points on the sound production component 11 may be set to adjust a wearing condition (e.g., a mechanical parameter when wearing and a position of the sound production component 11 relative to the ear when wearing) of the headphone 10. As shown in FIG. 3 and FIG. 7, in some embodiments, the extremum point N' is located at a rear side of an upper vertex K (which is represented by a projection point K' of the upper vertex K on the sagittal plane of the user) on the ear hook 12. That is, on the projection of the ear hook 12 on the sagittal plane of the user, compared with the projection point K' of the upper vertex K, a position of the extremum point N' is closer to the back of the head of the user.

In some embodiments, the extremum point N' corresponds to point N on the ear hook 12, as shown in FIG. 3. In some embodiments, an included angle between an ear hook plane of the ear hook 12 (e.g., plane S1 in FIG. 11) and the sagittal plane of the user may be considered comprehensively to determine the corresponding point N of the extremum point N' on the ear hook 12. In some embodiments, the ear hook plane may parallel the sagittal plane of the user in the wearing state.

In some embodiments, the upper vertex K of the ear hook 12 may be the highest point of the inner contour of the ear hook 12 along the vertical axis of the user in the wearing state, as shown in FIG. 3. In some embodiments, when the user is wearing the headphone 10, the ear may support the headphone 10 primarily by the upper vertex K of the ear hook 12. In some embodiments, the upper vertex K of the ear hook 12 may be a point where the inner contour of the ear hook 12 is curved to the greatest extent during the wearing state, as illustrated in FIG. 3 and FIG. 7. In some embodiments, the upper vertex K of the ear hook 12 may be a point on the inner contour of the ear hook 12 farthest from the end of the ear hook 12 (i.e., the free end of the first portion 121, the end of the ear hook 12 that is not connected to the sound production component 11) in the wearing state, as illustrated in FIG. 3 and FIG. 7. In some embodiments, the position of the upper vertex K of the ear hook 12 may simultaneously satisfy one or more of the three positions described above.

As shown in FIG. 3, in the wearing state, the sound production component 11 needs to be inserted into the auricular concha cavity. A distance between the extremum point N of the ear hook and the upper vertex K in the long axis direction X of the sound production component 11 may affect a degree to which the sound production component 11 inserts into the auricular concha cavity and a facing direction of the sound production component 11 in the auricular concha cavity, thereby affecting a cavity-like structure formed by inserting the sound production component 11 into the auricular concha cavity.

When the distance between the extremum point N of the ear hook 12 and the upper vertex K in the long axis direction X of the sound production component 11 is too large, the compatibility between the first portion 121 of the ear hook 12 and the auricle 100 may deteriorate and the stability of wearing the headphone 10 may be decreased, or the facing direction (i.e., the long axis direction X) of the sound production component 11 in the auricular concha cavity 102 may be too close to the vertical axis, and a gap between the upper side surface US of the sound production component 11 and the auricular concha cavity may be too large, that is, an opening of the formed cavity-like entity is too large. Thus, the contained sound source (i.e., a sound outlet on the inner side surface IS) may directly emit more sound components to the environment, and the sound reaching the listening position may be relatively low. At the same time, the sound from an external sound source entering the cavity-like entity may increase, causing the near-field sound cancellation, which leads to a poor listening effect.

When the distance between the extremum point N of the ear hook and the upper vertex K in the long axis direction X of the sound production component 11 is too small, an included angle between the facing direction (e.g., the long axis direction X) of the sound production component 11 in the auricular concha cavity and the vertical axis may be too large, and the gap between the upper side surface US of the sound production component 11 and the auricular concha cavity is too small or a count of gaps is too few, causing the opening of the formed cavity-like entity to be too small or too few, which may lead to a poor effect on sound leakage reduction. In addition, when the distance mentioned above is too small, the upper side surface US of the sound production component 11 may abut against an inner wall of the auricular concha cavity and may even excessively press the auricular concha cavity of the user, making the user feel uncomfortable and affecting the wearing comfort of the headphone 10.

Therefore, to make the sound production component 11 abut against the edge of the auricular concha cavity, to make the inner side surface of the sound production component 11 and the sound outlet thereon be arranged facing the ear canal to improve the sound production efficiency, to ensure an appropriate count of leaking structures of the cavity-like structure formed by the sound production component 11 and appropriate sizes of openings of the leaking structures to ensure the sound leakage reduction effect, and to ensure the wearing comfort of the headphone 10, a projected area formed by the inner contour of the ear hook 12 and the size of the ear hook 12 may be simultaneously limited. In some embodiments, when the first area of the first closed curve is set to be within a range of 200 $mm^2$-500 $mm^2$, in the projection of the ear hook 12 on the sagittal plane of the user, along the long axis direction X of the sound production component 11, a distance between the extremum point N' and the projection point K' of the upper vertex K may be within a range of 6 mm-15 mm. In some embodiments, since the x-axis is parallel to the long axis direction X of the sound production component 11, the distance between the extremum point N' and the projection point K' of the upper vertex K along the long axis direction X of the projection of the sound production component 11 may be a distance between the abscissa of the extremum point N' and the abscissa of the projection point K' of the upper vertex K. In some embodiments, in order to obtain a better listening effect, when the first area of the first closed curve is set to be within a range of 250 $mm^2$-450 $mm^2$, along the long axis direction X of the projection of the sound production component 11, the distance between the extremum point N' and the projection point K' of the upper vertex K of the ear hook 12 on the sagittal plane of the user may be within a range of 7 mm-12 mm. In some embodiments, in order to further improve a leakage sound reduction effect, when the first area of the first closed curve is set to be within a range of 300 $mm^2$-400 $mm^2$, along the long axis direction X of the projection of the sound production component 11, the distance between the extremum point N' and the projection point K' of the upper vertex K of the ear hook 12 on the sagittal plane of the user may be between 8 mm-11 mm.

It should be noted that the measurement of the relevant distances and angles of the projection of the headphone 10 on the sagittal plane of the user may be as follows. For the headphone 10, a photograph parallel to a projection plane (the sagittal plane of the user) is taken, and the relevant distances and angles are measured on the photograph, then converted according to a scale of the photograph, to obtain actual data of the relevant distances and angles on the projection plane.

In some embodiments, in addition to reflecting the distance between the extremum point N of the ear hook and the upper vertex K through the distances of the projection points described above, an actual measurement can also be carried out on the ear hook 12. In some embodiments, when the first area of the first closed curve is set to be within a range of 200 $mm^2$-500 $mm^2$, the distance between the extremum point N of the ear hook and the upper vertex K may be within a range of 6 mm-12 mm. In some embodiments, in order to further improve the leakage reduction effect, when the first area of the first closed curve is set to be within the range of 250 $mm^2$-450 $mm^2$, on the ear hook 12, the distance between the extremum point N of the ear hook and the upper vertex K may be within a range of 7 mm-11 mm. In some embodiments, in order to make the cavity-like structure formed by the sound production component 11 and the auricular concha cavity have a more suitable volume and more suitable size/count of the openings, when the first area of the first closed curve is set to be within a range of 300 $mm^2$-450 $mm^2$, on the ear hook 12, the distance between the extremum point N of the ear hook and the upper vertex K may be within a range of 8 mm-11 mm.

When the shape and size of the ear hook 12 are limited, to ensure that the sound production component 11 can be inserted into the auricular concha cavity, it is necessary to further limit a wearing angle of the sound production component 11 relative to the auricle and the auricular concha cavity. In some embodiments, in order to allow the whole or part of the region of the sound production component 11 to be inserted into the auricular concha cavity and to increase the area of the auricular concha cavity covered by the sound production component 11, when the headphone 10 is in the wearing state, an inclination angle α between the long axis direction X of the projection of the sound production component 11 and the horizontal direction (i.e., the direction of the sagittal axis shown in FIG. 7) may be within a range of 13°-21°, as shown in FIG. 7. In some embodiments, in order to reduce a size of a gap formed between the sound production component 11 and the edge of the auricular concha cavity to increase the listening volume of the ear canal, the inclination angle α between the long axis direction X of the projection of the sound production component 11 and the horizontal direction (i.e., the direction of the sagittal axis shown in FIG. 7) may be within a range of 15°-20°. In some embodiments, the inclination angle α between the long axis direction X of the projection of the sound production component 11 and the horizontal direction (i.e., the direction of the sagittal axis shown in FIG. 7) may be within a range of 15°-18°.

After setting the first area of the first closed curve to be within a range of 300 $mm^2$-500 $mm^2$, it is necessary to limit a distance of the first closed curve in the short axis direction (i.e., the first direction) of the projection of the sound production component 11. The distance of the first closed curve in the first direction of the projection of the sound production component 11 may affect the position of the sound production component 11 and the auricular concha cavity. If the distance is too small, the sound production component 11 can not be inserted into the auricular concha cavity, and if the distance is too large, the gap between the sound production component 11 and the auricular concha cavity may be too large, resulting in a poor listening effect. In some embodiments, the distance of the first closed curve in the first direction of the projection of the sound production component 11 may be characterized by a distance between the extremum point N' and the left-most end (point P') of the first curve L1 in the first direction. In some embodiments, to ensure that the sound production component 11 is inserted into the auricular concha cavity, the distance between the extremum point N' and the left-most end (point P') of the first curve L1 in the first direction may be within a range of 20 mm-25 mm. In some embodiments, in order to ensure a moderate size of the gap between the sound production component 11 and the auricular concha cavity, the distance between the extremum point N' and the left-most end (point P') of the first curve L1 may be within a range of 20 mm-23 mm. In some embodiments, to ensure the wearing comfort of the headphone, the distance between the extremum point N' and the left-most end (point P') of the first curve L1 may be within a range of 20 mm-22 mm.

Similarly, in some embodiments, the distance of the first closed curve in the first direction of the projection of the sound production component 11 may be characterized by a distance between the projection point K' of the upper vertex K and the left-most end (point P') of the first curve L1 in the first direction. In some embodiments, to ensure that the sound production component 11 is inserted into the auricular concha cavity, the distance between the projection point K' of the upper vertex K and the left-most end (point P') of the first curve L1 in the first direction may be within a range of 17 mm-22 mm. In some embodiments, in order to ensure a moderate size of the gap between the sound production component 11 and the auricular concha cavity, the distance between the projection point K' of the upper vertex K and the left-most end (point P') of the first curve L1 may be within a range of 17 mm-20 mm. In some embodiments, to ensure the wearing comfort of the headphone, the distance between the projection point K' of the upper vertex K and the left-most end (point P') of the first curve L1 may be within a range of 18 mm-20 mm.

Figure 8A:
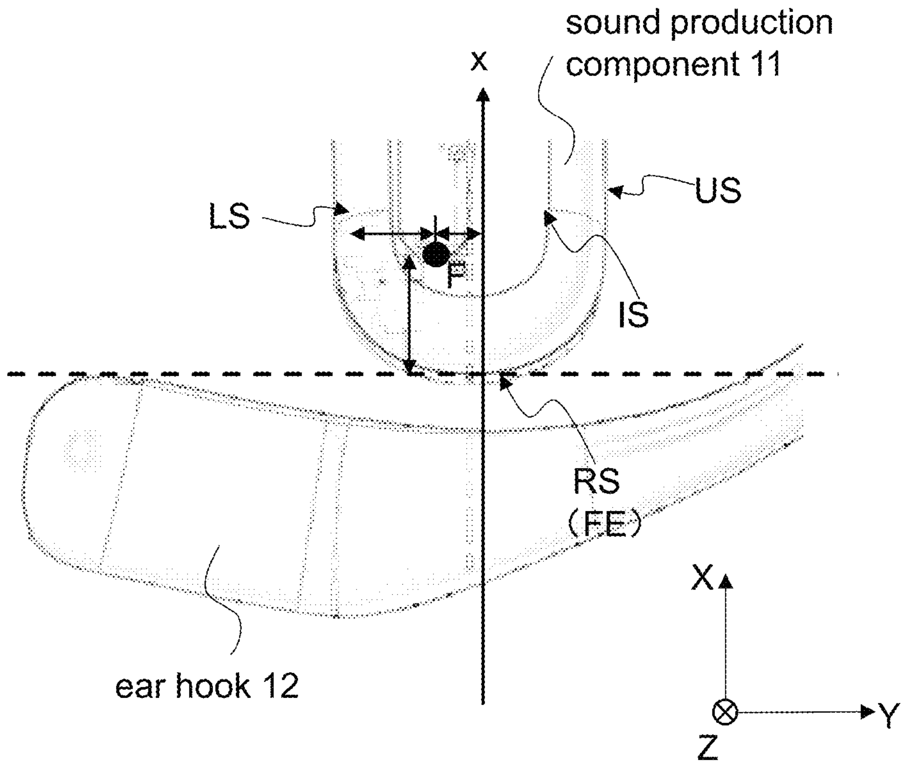
FIG. 8A and FIG. 8B are schematic diagrams illustrating an exemplary position structure of a centroid of a headphone according to some embodiments of the present disclosure.

FIG. 8A and FIG. 8 B are schematic diagrams illustrating an exemplary position structure of a centroid of a headphone according to some embodiments of the present disclosure.

Figure 8B:
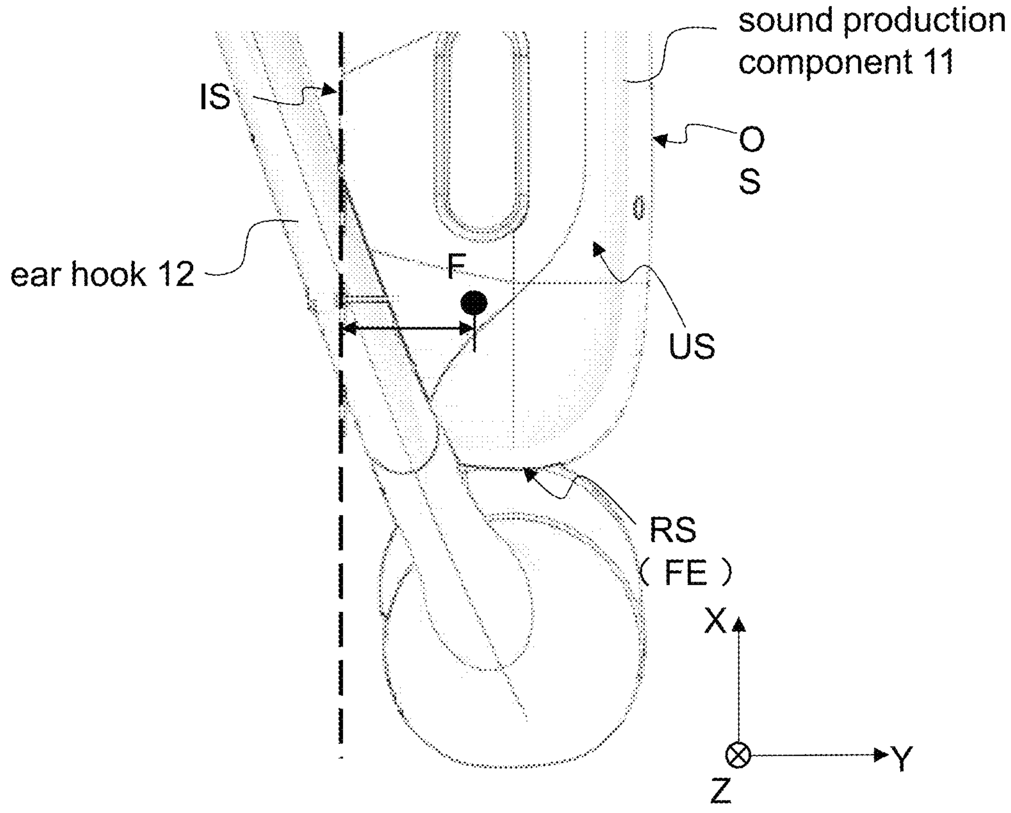

As shown in FIG. 8A and FIG. 8B, in some embodiments, a position of a centroid of the headphone 10 is point F. In some embodiments, affected by an internal structure of the sound production component 11 (e.g., a magnetic circuit, a circuit board, etc.), a mass of the sound production component 11 in the headphone 10 may be relatively large. Therefore, the position of the centroid F of the headphone 10 may be close to a position of a centroid H of the sound production component 11 or is greatly affected by a mass of the sound production component 11, that is, to a certain extent, the position of the centroid F of the headphone 10 may represent the position of the sound production component 11. For the convenience of explanation, a specific position of the centroid F of the headphone 10 may be described in detail below through relative positions of the centroid F of the headphone 10 and the sound production component 11.

As shown in FIG. 8A, in some embodiments, on the XY plane, a distance between the centroid F of the headphone 10 and the lower side surface LS of the sound production component 11 may be within a range of 2 mm-6 mm. In some embodiments, on the XY plane, the distance between the centroid F of the headphone 10 and the lower side surface LS of the sound production component 11 may be within a range of 3 mm-5 mm. In some embodiments, on the XY plane, the distance between the centroid F of the headphone 10 and the lower side surface LS of the sound production component 11 may be within a range of 4 mm-4.5 mm.

In some embodiments, on the XY plane, a distance between the centroid F of the headphone 10 and the long axis (i.e., the x-axis) of the sound production component 11 may be within a range of 1 mm-3 mm. In some embodiments, on the XY plane, the distance between the centroid F of the headphone 10 and the long axis (i.e., the x-axis) of the sound production component 11 may be within a range of 1.5 mm-2.8 mm. In some embodiments, on the XY plane, the distance between the centroid F of the headphone 10 and the long axis (i.e., the x-axis) of the sound production component 11 may be within a range of 2 mm-2.5 mm.

In some embodiments, on the XY plane, a distance between the centroid F of the headphone 10 and the free end FE (i.e., the rear side surface RS) of the sound production component 11 may be within a range of 4 mm-8 mm. In some embodiments, on the XY plane, the distance between the centroid F of the headphone 10 and the free end FE (i.e., the rear side surface RS) of the sound production component 11 may be within a range of 5 mm-7 mm. In some embodiments, on the XY plane, the distance between the centroid F of the headphone 10 and the free end FE (i.e., the rear side surface RS) of the sound production component 11 may be within a range of 6 mm-6.8 mm.

As shown in FIG. 8B, in some embodiments, on the XZ plane, a distance between the centroid F of the headphone 10 and the inner side surface IS of the sound production component 11 may be within a range of 2 mm-6 mm. In some embodiments, on the XZ plane, the distance between the centroid F of the headphone 10 and the inner side surface IS of the sound production component 11 may be within a range of 3 mm-5 mm. In some embodiments, on the XZ plane, the distance between the centroid F of the headphone 10 and the inner side surface IS of the sound production component 11 may be within a range of 4.5 mm-4.8 mm.

In some embodiments, by designing the positions of the centroid F of the headphone 10, the upper vertex K, and the extremum point N of the ear hook, the wearing stability and adjustability of the headphone 10 may be improved. In some embodiments, since the ear mainly supports the headphone 10 through the upper vertex K of the ear hook 12, when the user wears the headphone 10, it may be regarded as forming a "supporting lever" with the upper vertex K as a support point. In the wearing state, the centroid F of the headphone 10 is located behind the upper vertex K (i.e., a side close to the back of the head of the user), which may prevent the headphone 10 from flipping forward (i.e., a direction away from the back of the head of the user) in the wearing state, thereby improving the wearing stability of the headphone 10. In some embodiments, the extremum point N of the ear hook 12 may be a position on the ear hook 12 with the smallest cross-section, so that the ear hook 12 can be more likely to deform at the extremum point N of the ear hook. Therefore, when the user wears the headphone 10, the first portion 121 of the ear hook 12 and the sound production component 11 may form a structure similar to a "clamping force lever" with the extremum point N of the ear hook as a fulcrum point, and the structure is clamped on both sides of the ear of the user (e.g., a front side and a rear side of the auricular concha cavity). In order to improve the stability of the "supporting lever" and the "clamping force lever," the centroid F of the headphone 10 and the upper vertex K are respectively located on both sides of the extremum point N of the ear hook. The position of the centroid F, the upper vertex K, and the extremum point N of the ear hook may be further described in detail below.

Since the position of the centroid F of the headphone 10 is greatly affected by the position of the sound production component 11, when the overall volume of the ear hook 12 does not change much, to a certain extent, the positions of the upper vertex K and the centroid F of the headphone 10 may reflect a relative position of the sound production component 11 on the ear when the headphone 10 is worn. Specifically, when a distance between the position of the centroid F of the headphone 10 and the upper vertex K of the ear hook 12 is too large, the position of the sound production component 11 may be closer to the ear canal of the user when the user wears the headphone 10. Therefore, a position of the sound production component 11 is lower in the auricular concha cavity, and a gap between the upper side surface US of the sound production component 11 and the auricular concha cavity is too large, causing a weak listening effect. When the distance between the position of the centroid F of the headphone 10 and the upper vertex K of the ear hook 12 is too small, the upper side surface US of the sound production component 11 is attached to an upper edge of the auricular concha cavity, and the gap between the upper side surface US and the auricular concha cavity is too small or a count of gaps is too few, causing a poor sound leakage reduction effect. In addition, the sound outlet on the sound production component 11 is too far away from the external ear canal, which adversely affects the listening effect.

As shown in FIG. 6, in some embodiments, on the projection of the headphone 10 on the sagittal plane of the user, in order to obtain a better listening effect, a distance between the projection point K' of the upper vertex K and a projection point F' of the centroid F of the headphone 10 may be within a range of 22 mm-35 mm. In some embodiments, in order to further improve the effect of sound leakage reduction, on the projection of the headphone 10 on the sagittal plane of the user, the distance between the projection point K' of the upper vertex K and the projection point F' of the centroid F of the headphone 10 may be within a range of 25 mm-30 mm. In some embodiments, in order to make the cavity-like structure formed by the sound production component 11 and the auricular concha cavity have a more suitable volume and more suitable size/count of the openings, on the projection of the headphone 10 on the sagittal plane of the user, the distance between the projection point K' of the upper vertex K and the projection point F' of the centroid F of the headphone 10 may be within a range of 27 mm-29 mm.

In some embodiments, in order to obtain a better listening effect, on the headphone 10, a distance between the upper vertex K and the centroid F of the headphone 10 may be within a range of 20 mm-38 mm. In some embodiments, in order to further improve the effect on sound leakage reduction, on the headphone 10, the distance between the upper vertex K and the centroid F of the headphone 10 may be within a range of 25 mm-32.5 mm. In some embodiments, in order to make the cavity-like structure formed by the sound production component 11 and the auricular concha cavity have a more suitable volume and more suitable size/count of the openings, on the headphone 10, the distance between the upper vertex K and the centroid F of the headphone 10 may be within a range of 27 mm-30 mm.

In some embodiments, an included angle $\alpha 1$ between a connection line connecting the centroid F of the headphone 10 and the upper vertex K of the ear hook 12 and the long axis direction X of the sound production component 11 may affect the wearing stability of the headphone 10 in the wearing state. When the included angle $\alpha 1$ between the connection line connecting the centroid F of the headphone 10 and the upper vertex K of the ear hook 12 and the long axis direction X of the sound production component 11 is too large, the free end FE of the sound production component 11 may be far away from a side wall of the auricular concha cavity of the user, and the clamping of the sound production component 11 on the auricular concha cavity is relatively weak, making the headphone 10 unstable to wear. When the included angle $\alpha 1$ between the connection line connecting the centroid F of the headphone 10 and the upper vertex K of the ear hook 12 and the long axis direction X of the sound production component 11 is too small, the free end FE of the sound production component 11 and the auricular concha cavity of the user fits too tight, affecting the wearing comfort of the headphone 10, and reducing the adjustability of the headphone 10.

In some embodiments, in order to make the headphone 10 have higher wearing stability and adjustability, on the projection of the headphone 10 on the sagittal plane of the user, the included angle $\alpha 1$ between the connection line K'F' connecting the projection point K' of the upper vertex K and the projection points F' of the centroid F of the headphone 10 and the long axis direction X (i.e., the x-axis direction) of the projection of the sound production component 11 may be within a range of 35°-60°. As shown in FIG. 6, it should be noted that the included angle $\alpha 1$ between the connection line K'F' connecting the projection point K' of the upper vertex K and the projection points F' of the centroid F of the headphone 10 and the long axis direction X (i.e., the x-axis direction) of the projection of the sound production component 11 refers to an angle between the connection line K'F' and the x-axis in a counterclockwise direction on the basis of a positive direction of the x-axis. In some embodiments, in order to further improve the wearing stability of the headphone 10, the included angle $\alpha 1$ between the connection line K'F' connecting the projection point K' of the upper vertex K and the projection points F' of the centroid F of the headphone 10 and the long axis direction X (i.e., the x-axis direction) of the projection of the sound production component 11 may be within a range of 40°-55°. In some embodiments, in order to further improve the adjustability of the headphone 10, the included angle α1 between the connection line K'F' connecting the projection point K' of the upper vertex K and the projection points F' of the centroid F of the headphone 10 and the long axis direction X (i.e., the x-axis direction) of the projection of the sound production component 11 may be within a range of 45°-50°.

In some embodiments, in addition to reflecting the included angle α1 between the connection line connecting the centroid F of the headphone 10 and the upper vertex K and the long axis direction X of the sound production component 11 through positions of the projection points mentioned above, an actual measurement can also be carried out on the ear hook 12. In some embodiments, in order to make the headphone 10 have higher wearing stability and adjustability, the included angle α1 between the connection line connecting the centroid F of the headphone 10 and the upper vertex K of the ear hook 12 and the long axis direction X of the sound production component 11 may be within a range of 30°-55°. In some embodiments, in order to further improve the wearing stability of the headphone 10, the included angle α1 between the connection line connecting the centroid F of the headphone 10 and the upper vertex K of the ear hook 12 and the long axis direction X of the sound production component 11 may be within a range of 40°-50°. In some embodiments, in order to further improve the adjustability of the headphone 10, the included angle α1 between the connection line connecting the centroid F of the headphone 10 and the upper vertex K of the ear hook 12 and the long axis direction X of the sound production component 11 may be within a range of 45°-48°.

As shown in FIG. 3, FIG. 8A, and FIG. 8B, in some embodiments, a projection point of the centroid F of the headphone 10 on the sagittal plane of the user is point F'. Referring to FIG. 8A, and FIG. 8B, in some embodiments, when the headphone 10 is in the non-wearing state, a distance between the centroid F of the headphone 10 and the extremum point of the ear hook is also related to the wearing stability and discomfort at a position of the ear connected to the head of the user. In some embodiments, when the distance between the centroid F of the headphone 10 and the extremum point N of the ear hook is too large, a clamping position of the headphone 10 on the ear may be too low, and thus a fitting degree between the sound production component 11 and the auricular concha cavity may be poor, which can affect the cavity-like structure and lead to unstable wearing. As a result, a gap of the cavity-like structure formed by the sound production component 11 and the auricular concha cavity is too large, thereby leading to a poor listening effect. When the distance between the centroid F of the headphone 10 and the extremum point N of the ear hook is too small, it means that a force arm at both ends of the fulcrum point of the "clamping force lever" mentioned above may be too small, the stability of the lever structure may be poor when a clamping force remains unchanged, and the headphone 10 may be unstable to wear in the wearing state.

In some embodiments, in order to make the headphone 10 have higher wearing stability and better listening effect in the wearing state, on the projection of the headphone 10 on the sagittal plane of the user, a distance between the extremum point N' and the projection point F' of the centroid F of the headphone 10 may be within a range of 20 mm-35 mm. In some embodiments, in order to further improve the wearing stability of the headphone 10, on the projection of the headphone 10 on the sagittal plane of the user, the distance between the extremum point N' and the projection point F' of the centroid F of the headphone 10 may be within a range of 25 mm-30 mm. In some embodiments, in order to further improve the listening effect, on the projection of the headphone 10 on the sagittal plane of the user, the distance between the extremum point N' and the projection point F' of the centroid F of the headphone 10 may be within a range of 27 mm-28 mm.

In some embodiments, in order to make the headphone 10 have higher wearing stability and better listening effect in the wearing state, on the headphone 10, a distance between the centroid F of the headphone 10 and the extremum point N of the ear hook may be within a range of 18 mm-40 mm. In some embodiments, in order to further improve the wearing stability, on the headphone 10, the distance between the centroid F of the headphone 10 and the extremum point N of the ear hook may be within a range of 24 mm-31 mm. In some embodiments, in order to further improve the listening effect, the distance between the centroid F of the headphone 10 and the extremum point N of the ear hook may be within a range of 26 mm-29 mm.

In some embodiments, as shown in FIG. 7, on the projection of the headphone 10 on the sagittal plane of the user, a first included angle α2 between the connection line N'F' connecting the extremum point N' and the projection point F' of the centroid of the headphone 10 and the long axis direction X (i.e., the x-axis direction) of the projection of the sound production component 11 may be less than 90° so that the projection point F' of the centroid F of the headphone 10 is located behind the extremum point N' in the long axis direction X of the sound production component 11. Since the centroid F of the headphone 10 is mainly affected by the mass of the sound production component 11, to a certain extent, the position of the centroid F also reflects the clamping position of the sound production component 11 on the auricular concha cavity, that is, the clamping position of the sound production component 11 on the auricular concha cavity, compared with the extremum point N of the ear hook, is closer to the back of the head of the user, so as to further enhance the stability of the "clamping force lever" mentioned above. As shown in FIG. 7, it should be noted that the first included angle α2 between the connection line N'F' connecting the extremum point N' and the projection point F' of the centroid of the headphone 10 and the long axis direction X (i.e., the x-axis direction) of the projection of the sound production component 11 refers to an included angle between the connection line N'F' and the x-axis in the counterclockwise direction on the basis of the positive direction of the x-axis.

In some embodiments, the first included angle α2 between the connection line connecting the centroid F of the headphone 10 and the extremum point N of the ear hook and the long axis direction X of the sound production component 11 may determine, to a certain extent, the morphology of the inner contour of the headphone 10, which is related to the wearing feeling of the user. Specifically, in order to ensure that the ear hook fits the ear or head of the user when the user wears the headphone 10, the included angle being too large or too small may cause a change in the morphology when wearing the headphone 10, which may affect the fit, at the same time, the cavity-like structure may not be formed, affecting the sound production efficiency of the sound production component 11. Specifically, when the first included angle α2 between the connection line connecting the centroid F of the headphone 10 and the extremum point N of the ear hook and the long axis direction X of the sound production component 11 is too large, the clamping position of the sound production component 11 may be too far downwardly relative to the auricular concha cavity, the gap between the upper side surface US and the auricular concha cavity may be too large, resulting in a weak listening effect. When the first included angle α2 between the connection line connecting the centroid F of the headphone 10 and the extremum point N of the ear hook and the long axis direction X of the sound production component 11 is too small, the clamping position of the sound production component 11 is too high relative to the auricular concha cavity, the upper side surface US of the sound production component 11 may be attached to an upper edge of the auricular concha cavity, and the gap between the upper side surface US and the auricular concha cavity is too small or a count of gaps is too few, causing a poor effect on sound leakage reduction. Due to a limited space of the auricular concha cavity of the user, when the clamping position of the sound production component 11 is too low or too high relative to the auricular concha cavity, it makes difficult for the headphone 10 to be stably clamped on the ear of the user due to the shape restriction of the auricular concha cavity.

In some embodiments, in order to obtain a better listening effect, the first included angle α2 between the connection line N'F' connecting the extremum point N' and the projection point F' of the centroid F of the headphone 10 and the long axis direction X (i.e., the x-axis direction) of the projection of the sound production component 11 may be within a range of 60°-80°. In some embodiments, in order to further improve the effect on sound leakage reduction, the first included angle α2 between the connection line N'F' connecting the extremum point N' and the projection point F' of the centroid F of the headphone 10 and the long axis direction X (i.e., the x-axis direction) of the projection of the sound production component 11 may be within a range of 60°-75°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, the first included angle α2 between the connection line N'F' connecting the extremum point N' and the projection point F' of the centroid F of the headphone 10 and the long axis direction X (i.e., the x-axis direction) of the projection of the sound production component 11 may be within a range of 65°-70°.

In some embodiments, in addition to reflecting the first included angle α2 between the connection line connecting the centroid F of the headphone 10 and the extremum point N of the ear hook and the long axis direction X of the sound production component 11 through positions of the projection points mentioned above, an actual measurement can also be carried out on the ear hook 12. In some embodiments, in order to obtain a better listening effect, on the headphone 10, the first included angle α2 between the connection line connecting the centroid F of the headphone 10 and the extremum point N of the ear hook and the long axis direction X of the sound production component 11 may be within a range of 50°-90°. In some embodiments, in order to further improve the effect on sound leakage reduction, on the headphone 10, the first included angle α2 between the connection line connecting the centroid F of the headphone 10 and the extremum point N of the ear hook and the long axis direction X of the sound production component 11 may be within a range of 55°-85°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, on the headphone 10, the first included angle α2 between the connection line connecting the centroid F of the headphone 10 and the extremum point N of the ear hook and the long axis direction X of the sound production component 11 may be within a range of 60°-75°.

In some embodiments, in addition to setting the position of the centroid F of the headphone 10, a position of a centroid H of the sound production component 11 may also be directly set to improve the wearing stability and listening effect of the headphone 10. As shown in FIG. 3 and FIG. 4, in some embodiments, a projection point of the centroid H of the sound production component 11 on the sagittal plane of the user may coincide with a center of the projection of the sound production component 11 on the sagittal plane of the user. In some embodiments, on the headphone 10, by changing a distance between the centroid H of the sound production component 11 and the extremum point N of the ear hook, a covering position of the sound production component 11 in the auricular concha cavity in the wearing state and the clamping position of the sound production component 11 on the auricular concha cavity may be changed, which not only affect the wearing stability and the wearing comfort of the headphone 10 but also affect the listening effect of the headphone 10.

When the shape and size of the sound production component 11 are consistent, if the distance between the centroid H of the sound production component 11 and the extremum point N of the ear hook is too large, the position of the sound production component 11 in the auricular concha cavity may be lower, and the gap between the upper side surface US of the sound production component 11 and the auricular concha cavity is too large, which leads to a poor listening effect. Moreover, if the distance between the centroid H of the sound production component 11 and the extremum point N of the ear hook is too large, the sound production component 11 (or a connection region between the ear hook 12 and the sound production component 11) may be too squeezed on the tragus, which leads to excessive pressure on the tragus by the sound production component 11 and affects the wearing comfort.

When the shape and size of the sound production component 11 are consistent, if the distance between the centroid H of the sound production component 11 and the extremum point N of the ear hook is too small, the upper side surface US of the sound production component 11 may be attached to an upper edge of the auricular concha cavity, and the gap between the upper side surface US of the sound production component 11 and the auricular concha cavity is too small or a count of gaps is too few, so that an inside environment and an outside environment are completely sealed and isolated, and the cavity-like structure cannot be formed. Moreover, if the distance between the centroid H of the sound production component 11 and the extremum point N of the ear hook is too small, the sound production component 11 (or the connection region between the ear hook 12 and the sound production component) may be too squeezed on an outer contour of the ear, which also affects the wearing comfort.

In some embodiments, a projection point of the centroid H of the sound production component 11 on the sagittal plane of the user and the center of the projection of the sound production component 11 on the sagittal plane of the user are point H', and point H' is located on the long axis of the projection of the sound production component 11, that is, point H' lies on the x-axis. In some embodiments, in order to make the headphone 10 have a better listening effect in the wearing state, a distance between the extremum point N' and the projection point H' of the centroid H of the sound production component 11 on the sagittal plane of the user may be within a range of 20 mm-30 mm. In some embodiments, in order to further improve the effect on sound leakage reduction, the distance between the extremum point N' and the projection point H' of the centroid H of the sound production component 11 on the sagittal plane of the user may be within a range of 22 mm-26 mm. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, the distance between the extremum point N' and the projection point H' of the centroid H of the sound production component 11 on the sagittal plane of the user may be within a range of 23 mm-25 mm.

In some embodiments, in addition to reflecting the distance between the centroid H of the sound production component 11 and the extremum point N of the ear hook through the distance between the projection points mentioned above, an actual measurement can also be carried out on the ear hook 12. In some embodiments, on the headphone 10, in order to make the headphone 10 have a better listening effect in the wearing state, the distance between the centroid H of the sound production component 11 and the extremum point N of the ear hook may be within a range of 20 mm-30 mm. In some embodiments, in order to further improve the effect on sound leakage reduction, on the headphone 10, the distance between the centroid H of the sound production component 11 and the extremum point N of the ear hook may be within a range of 24 mm-26 mm. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, on the headphone 10, the distance between the centroid H of the sound production component 11 and the extremum point N of the ear hook may be within a range of 24 mm-26 mm.

In some embodiments, a second included angle $\alpha$3 between a connection line connecting the centroid H of the sound production component 11 and the extremum point N of the ear hook and the long axis direction X of the sound production component 11 may affect a position of the sound production component 11 inserted into the auricular concha cavity. When the second included angle $\alpha$3 between the connection line connecting the centroid H of the sound production component 11 and the extremum point N of the ear hook and the long axis direction X of the sound production component 11 is too large, the position of the sound production component 11 on the auricular concha cavity is lower, the gap between the upper side surface US of the sound production component 11 and the auricular concha cavity is too large, causing a weak listening effect. When the second included angle $\alpha$3 between the connection line connecting the centroid H of the sound production component 11 and the extremum point N of the ear hook and the long axis direction X of the sound production component 11 is too small, the upper side surface US of the sound production component 11 is attached to the upper edge of the auricular concha cavity, and the gap between the upper side surface US and the auricular concha cavity is too small or the count of gaps is too few, causing a poor effect on sound leakage reduction.

In some embodiments, the second included angle $\alpha$3 between the connection line N'H' connecting the extremum point N' and the projection point H' of the centroid H of the sound production component 11 and the long axis direction X (i.e., the x-axis direction) of the projection of the sound production component 11 may be less than 90°. Therefore, the projection point H' of the centroid H of the sound production component 11 is located on a rear side of the extremum point N' in the long axis direction X of the sound production component 11, i.e., compared with a corresponding point N of the extremum point N' on the ear hook 12, the centroid H of the sound production component 11 is closer to the back of the head of the user, so as to further enhance the stability of the "clamping force lever" mentioned above. As shown in FIG. 4, it should be noted that the second included angle $\alpha$3 between the connection line N'H' connecting the extremum point N' and the projection point H' of the centroid of the sound production component 11 and the long axis direction X (i.e., the x-axis direction) of the projection of the sound production component 11 refers to an included angle between the connection line N'H' and the x-axis in the counterclockwise direction on the basis of the positive direction of the x-axis.

In some embodiments, in order to obtain a better listening effect, the second included angle $\alpha$3 between the connection line N'H' connecting the extremum point N' and the projection point H' of the centroid H of the sound production component 11 and the long axis direction X (i.e., the x-axis direction) of the projection of the sound production component 11 may be within a range of 65°-85°. In some embodiments, in order to further improve the effect on sound leakage reduction, the second included angle $\alpha$3 between the connection line N'H' connecting the extremum point N' and the projection point H' of the centroid H of the sound production component 11 and the long axis direction X (i.e., the x-axis direction) of the projection of the sound production component 11 may be within a range of 70°-80°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, the second included angle $\alpha$3 between the connection line N'H' connecting the extremum point N' and the projection point H' of the centroid H of the sound production component 11 and the long axis direction X (i.e., the x-axis direction) of the projection of the sound production component 11 may be within a range of 75°-79°.

In some embodiments, in addition to reflecting the second included angle $\alpha$3 between the connection line connecting the centroid H of the sound production component 11 and the extremum point N of the ear hook and the long axis direction X of the sound production component 11 through the positions of the projection points mentioned above, an actual measurement can also be carried out on the ear hook 12. In some embodiments, in order to obtain a better listening effect, on the headphone 10, the second included angle $\alpha$3 between the connection line connecting the centroid H of the sound production component 11 and the extremum point N of the ear hook and the long axis direction X of the sound production component 11 may be within a range of 70°-85°. In some embodiments, in order to further improve the effect on sound leakage reduction, on the headphone 10, the second included angle α3 between the connection line connecting the centroid H of the sound production component 11 and the extremum point N of the ear hook and the long axis direction X of the sound production component 11 may be within a range of 75°-80°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, on the headphone 10, the second included angle α3 between the connection line connecting the centroid H of the sound production component 11 and the extremum point N of the ear hook and the long axis direction X of the sound production component 11 may be within a range of 77°-80°.

In some embodiments, on the sagittal plane of the user, the first included angle α2 between the connection line N'F' connecting the extremum point N' and the projection point F' of the centroid F of the headphone 10 and the long axis direction X (i.e., the x-axis direction) of the projection of the sound production component 11 is smaller than the second included angle α3 between the connection line connecting the extremum point N' and the projection point H' of the centroid H of the sound production component 11 and the long axis direction X (i.e., the x-axis direction) of the projection of the sound production component 11. That is, the first included angle α2 between the connection line N'F' and the x-axis is smaller than the second included angle α3 between the connection line N'H' and the x-axis, so that the centroid F of the headphone 10 is located at a rear side of the centroid H of the sound production component 11 in the long axis direction X of the sound production component 11, that is, compared with the centroid H of the sound production component 11, the centroid F of the headphone 10 is closer to the back of the head of the user. Through the above arrangements, the ear hook 12 may better clamp the ear of the user when the headphone 10 is in the wearing state, further enhancing the stability of the "clamping force lever" mentioned above.

In some embodiments, an included angle α4 between the connection line connecting the extremum point N of the ear hook and the centroid H of the sound production component 11 and a plane S1 of the ear hook 12 (which is also referred to as an ear hook plane S1) may affect a degree to which the sound production component 11 is inserted into the auricular concha cavity of the user when the headphone 10 is in the wearing state. If the included angle α4 between the connection line connecting the extremum point N of the ear hook and the centroid H of the sound production component 11 and the plane of the ear hook 12 is too small, the sound production component 11 may be inserted too deep into the auricular concha cavity, and the position of the sound production component 11 may be too close to the ear canal of the user. In this case, the ear canal is blocked to a certain extent, and the communication between the ear canal and the external environment cannot be realized, thus an original design purpose of the headphone 10 cannot be implemented. If the included angle α4 between the connection line connecting the extremum point N of the ear hook and the centroid H of the sound production component 11 and the plane of the ear hook 12 is too large, it may affect the sound production component 11 to be inserted into the auricular concha cavity (e.g., causing the gap between the sound production component 11 and the auricular concha cavity to be too large), which further affects the listening effect of the sound production component 11.

Figure 9:
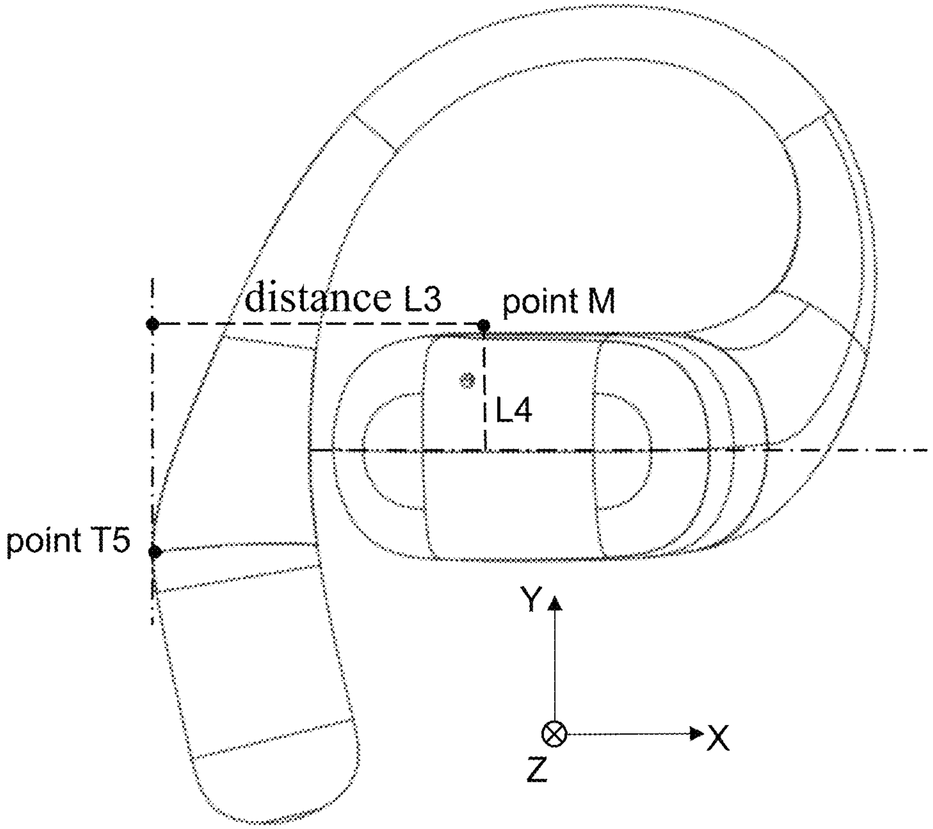
FIG. 9 is a schematic diagram illustrating a centroid of an ear hook of a headphone according to some other embodiments of the present disclosure.

FIG. 9 is a schematic diagram illustrating a centroid of an ear hook of a headphone according to some other embodiments of the present disclosure.

Referring to FIG. 9, in some embodiments, a weight distribution of the ear hook needs to be considered to ensure the wearing comfort of the headphone 10. In order to reduce the pressure on the ear by the support point of the ear hook (e.g., the extremum point or the upper vertex), the centroid of the ear hook (e.g., point M) may be set near the sound production component 11. In this way, after the sound production component 11 has been inserted into the auricular concha cavity, the auricular concha cavity may support part of the weight of both the sound production component 11 and the ear hook, reducing the pressure on the ear by the support point of the ear hook. The centroid of the ear hook described here refers to a centroid of the ear hook as a whole (including the battery compartment 13 but excluding the sound production component 11). As shown in FIG. 9, point T5 is a point that is at the extreme end of the outer contour of the first projection in the long axis direction of the sound production component 11. In some embodiments, considering a weight relationship between the ear hook and the sound production component 11, a distance L3 between the centroid of the ear hook and the point T5 in the long axis direction of the sound production component 11 may be within a range of 22 mm-49 mm. In some embodiments, in order to make the centroid of the ear hook close to the contact area with the edge of the auricular concha cavity on the sound production component 11 (for well support of the ear hook by the auricular concha cavity), the distance L3 between the centroid of the ear hook and the point T5 may be 25 mm-35 mm.

In some embodiments, as shown in FIG. 3, in addition to setting the position of the centroid F of the headphone 10, the position of the centroid H of the sound production component 11 may also be directly set to improve the wearing stability and the listening effect of the headphone 10. As shown in FIG. 3 and FIG. 4, in some embodiments, a projection point of the centroid H of the sound production component 11 on the sagittal plane of the user may coincide with the center of the projection of the sound production component 11 on the sagittal plane of the user. In some embodiments, on the headphone 10, by changing a distance between the centroid H of the sound production component 11 and the extremum point N of the ear hook, a covered position of the sound production component 11 in the auricular concha cavity in the wearing state may be changed simultaneously, and the clamping position of the sound production component 11 clamping the auricular concha cavity may not only affect the stability and comfort of the user wearing the headphone 10 but also affect the listening effect of the headphone 10.

When the shape and dimension of the sound production component 11 are consistent, if the distance between the centroid H of the sound production component 11 and the extremum point N of the ear hook is too large, the position of the sound production component 11 may be biased downwardly in the auricular concha cavity, and a gap between the upper side surface US of the sound production component 11 and the auricular concha cavity may be too large, resulting in a deterioration of the listening effect. Moreover, if the distance between the centroid H of the sound production component 11 and the extremum point N of the ear hook is too large, causing too much interference to be formed between the sound production component 11

(or a connection region between the ear hook 12 and the sound production component 11) and the tragus, the sound production component 11 may overly squeeze the tragus, which may affect the wearing comfort of the sound production component 11.

When the shape and dimension of the sound production component 11 are consistent, if the distance between the centroid H of the sound production component 11 and the extremum point N of the ear hook is too small, the upper side surface US of the sound production component 11 may be affixed to the upper edge of the auricular concha cavity, and a gap between the upper side surface US and the auricular concha cavity may be too small or a count of the gap may be too few, or even make the interior environment completely hermetically isolated from the external environment, preventing the formation of a cavity-like structure. Moreover, if the distance between the centroid H of the sound production component 11 and the extremum point N of the ear hook is too small, the sound production component 11 (or the connection region between the ear hook 12 and the sound production component) may overly squeeze the outer contour of the ear, which also affects the wearing comfort.

In some embodiments, as shown in FIG. 7, a projection point of the centroid H of the sound production component 11 on the sagittal plane of the user and the center of the projection of the sound production component 11 on the sagittal plane of the user are point H', and the point H' may be located on the long axis of the projection of the sound production component 11, i.e., the point H' may be located on the x-axis. In some embodiments, to make the headphone 10 have a better listening effect in the wearing state, a distance between the extremum point N' and the projection point H' of the centroid H of the sound production component 11 on the sagittal plane of the user may be within a range of 20 mm-30 mm. In some embodiments, to further improve the leakage reduction effect, the distance between the extremum point N' and the projection point H' of the centroid H of the sound production component 11 on the sagittal plane of the user may be within a range of 22 mm-26 mm. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, the distance between the extremum point N' and the projection point H' of the centroid H of the sound production component 11 on the sagittal plane of the user may be within a range of 23 mm-25 mm.

In some embodiments, in addition to reflecting the distance between the centroid H of the sound production component 11 and the extremum point N of the ear hook by the distance between the projection points as described above, an actual measurement may be carried out on the ear hook 12. In some embodiments, on the headphone 10, to make the headphone 10 have a better listening effect in the wearing state, the distance between the centroid H of the sound production component 11 and the extremum point N of the ear hook may be within a range of 20 mm-30 mm. In some embodiments, to further improve the sound leakage reduction effect, on the headphone 10, the distance between the centroid H of the sound production component 11 and the extremum point N of the ear hook may be within a range of 24 mm-26 mm. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, on the headphone 10, the distance between the centroid H of the sound production component 11 and the extremum point N of the ear hook may be within a range of 24 mm-26 mm.

In some embodiments, a second included angle between a connection line connecting the centroid H of the sound production component 11 and the extremum point N of the ear hook and the long axis direction X of the sound production component 11 may affect the position of the sound production component 11 inserted into the auricular concha cavity. When the second included angle between the connection line connecting the centroid H of the sound production component 11 and the extremum point N of the ear hook and the long axis direction X of the sound production component 11 is too large, the position of the sound production component 11 may be biased downwardly in the auricular concha cavity, and the gap between the upper side surface US of the sound production component 11 and the auricular concha cavity may be too large, resulting in a weak listening effect. When the second included angle between the connection line connecting the centroid H of the sound production component 11 and the extremum point N of the ear hook and the long axis direction X of the sound production component 11 is too small, the upper side surface US of the sound production component 11 may be affixed to the upper edge of the auricular concha cavity, the gap between the upper side surface US and the auricular concha cavity may be too small or the count of the gap may be too few, resulting in a poor sound leakage reduction effect.

In some embodiments, the second included angle $\alpha 3$ between the connection line N'H' connecting the extremum point N' and the projection point H' of the centroid H of the sound production component 11 and the long axis direction X (i.e., the x-axis direction) of the projection of the sound production component 11 may be no less than 90°. Therefore, the projection point H' of the centroid H of the sound production component 11 may be located at a rear side of the extremum point N' on the long axis direction X of the sound production component 11, i.e., the centroid H of the sound production component 11 may be closer to the back of the head of the user compared to the corresponding point N of the extremum point N' on the ear hook 12 to further enhance the stability of the aforementioned “clamping force lever.” It should be noted that the second included angle $\alpha 3$ between the connection line N'H' connecting the extremum point N' and the projection point H' of the centroid H of the sound production component 11 and the long axis direction X (i.e., the x-axis direction) of the projection of the sound production component 11 may be an included angle between the connection line N'H' and the x-axis in a counterclockwise direction based on the positive direction of the x-axis as shown in FIG. 7.

In some embodiments, to obtain a better listening effect, the second included angle $\alpha 3$ between the connection line N'H' connecting the extremum point N' and the projection point H' of the centroid H of the sound production component 11 and the long axis direction X (i.e., the x-axis direction) of the projection of the sound production component 11 may be within a range of 65°-85°. In some embodiments, to further improve the sound leakage reduction effect, the second included angle $\alpha 3$ between the connection line N'H' connecting the extremum point N' and the projection point H' of the centroid H of the sound production component 11 and the long axis direction X (i.e., the x-axis direction) of the projection of the sound production component 11 may be within a range of 70°-80°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, the second included angle α3 between the connection line N'H' connecting the extremum point N' and the projection point H' of the centroid H of the sound production component 11 and the long axis direction X (i.e., the x-axis direction) of the projection of the sound production component 11 may be within a range of 75°-79°.

In some embodiments, in addition to reflecting the second included angle α3 between the connection line connecting the centroid H of the sound production component 11 and the extremum point N of the ear hook and the long axis direction X of the sound production component 11 by a position of the projection point as described above, an actual measurement can be carried out on the ear hook 12. In some embodiments, in order to obtain a better listening effect, on the headphone 10, the second included angle α3 between the connection line connecting the centroid H of the sound production component 11 and the extremum point N of the ear hook and the long axis direction X of the sound production component 11 may be within a range of 70°-85°. In some embodiments, to further improve the sound leakage reduction effect, on the headphone 10, the second included angle α3 between the connection line connecting the centroid H of the sound production component 11 and the extremum point N of the ear hook and the long axis direction X of the sound production component 11 may be within a range of 75°-80°. In some embodiments, in order to make the cavity-like structure formed by the sound production component 11 and the auricular concha cavity have a more suitable volume and more suitable size/count of the openings, and to make the clamping position of the sound production component 11 be located at a better position within the auricular concha cavity, on the headphone 10, the second included angle α3 between the connection line connecting the centroid H of the sound production component 11 and the extremum point N of the ear hook and the long axis direction X of the sound production component 11 may be within a range of 77°-80°.

In some embodiments, on the sagittal plane of the user, the first included angle α2 between the connection line N'F' connecting the extremum point N' and the projection point F' of the centroid F of the headphone 10 and the long axis direction X (i.e., the x-axis direction) of the projection of the sound production component 11 is smaller than the second included angle α3 between the connection line connecting the extremum point N' and the projection point H' of the centroid H of the sound production component 11 and the long axis direction X (i.e., the x-axis direction) of the projection of the sound production component 11. That is, the first included angle α2 between the connection line N'F' and the x-axis is smaller than the second included angle α3 between the connection line N'H' and the x-axis, so that the centroid F of the headphone 10 is located at a rear side of the centroid H of the sound production component 11 in the long axis direction X of the sound production component 11, that is, compared with the centroid H of the sound production component 11, the centroid F of the headphone 10 is closer to the back of the head of the user. Through the above arrangements, the ear hook 12 may better clamp the ear of the user when the headphone 10 is in the wearing state, further enhancing the stability of the "clamping force lever" mentioned above.

A position between the upper vertex K and the centroid H of the sound production component 11 may reflect, to a certain extent, a relative position of the sound production component 11 in the ear when wearing the headphone 10. Specifically, when the distance between the centroid H of the sound production component 11 and the upper vertex K of the ear hook 12 is too large, the position of the sound production component 11 may be closer to the opening of the ear canal of the user when the user wears the headphone 10, causing the sound production component 11 to be positioned downwardly in the auricular concha cavity and the gap between the upper side surface US of the sound production component 11 and the auricular concha cavity to be too large, resulting in a weak listening effect. When the distance between the centroid H of the sound production component 11 and the upper vertex K of the ear hook 12 is too small, the upper side surface US of the sound production component 11 may be affixed to the upper edge of the auricular concha cavity, and the gap between the upper side surface US and the auricular concha cavity is too small or the count of the gap may be too few, resulting in a poor sound leakage reduction effect, and the sound outlet on the sound production component 11 may be too far away from the external ear canal, which adversely affects the listening effect.

As shown in FIG. 7, in some embodiments, on the projection of the headphone 10 on the sagittal plane of the user, in order to obtain a better listening effect, the distance between the projection point K' of the upper vertex K and the projection point H' of the centroid H of the sound production component 11 may be within a range of 18 mm-28 mm. In some embodiments, to further improve the sound leakage reduction effect, on the projection of the headphone 10 on the sagittal plane of the user, the distance between the projection point K' of the upper vertex K and the projection point H' of the centroid H of the sound production component 11 may be within a range of 20 mm-26 mm. In some embodiments, in order to make the cavity-like structure formed by the sound production component 11 and the auricular concha cavity have a more suitable volume and more suitable size/count of the openings, on the projection of the headphone 10 on the sagittal plane of the user, the distance between the projection point K' of the upper vertex K and the projection point H' of the centroid H of the sound production component 11 may be within a range of 22 mm-24 mm.

In some embodiments, the included angle between the connection line connecting the centroid H of the sound production component 11 and the upper vertex K of the ear hook 12 and the long axis direction X of the sound production component 11 may affect the stability of the headphone 10 in the wearing state. When the included angle between the connection line connecting the centroid H of the sound production component 11 and the upper vertex K of the ear hook 12 and the long axis direction X of the sound production component 11 is too large, the free end FE of the sound production component 11 may be far away from a side of the auricular concha cavity of the user, the clamping of the sound production component 11 on the auricular concha cavity may be weak, causing the wearing unstable. When the included angle between the connection line connecting the centroid H of the sound production component 11 and the upper vertex K of the ear hook 12 and the long axis direction X of the sound production component 11 is too small, the free end FE of the sound production component 11 may fit too tight with the auricular concha cavity of the user, which affects the wearing comfort of the headphone 10 and reduces the adjustability of the headphone 10.

In some embodiments, to make the headphone 10 have high wearing stability and adjustability, on the projection of the headphone 10 on the sagittal plane of the user, an included angle α4 between a connection line K'H' connecting the projection point K' of the upper vertex K and the projection point H' of the centroid H of the sound production component 11 and the long axis direction X (i.e., the x-axis direction) of the projection of the sound production component 11 may be within a range of 45°-70°. It should be noted that the included angle 4 between the connection line K'H' connecting the projection point K' of the upper vertex K and the projection point H' of the centroid H of the sound production component 11 and the long axis direction X (i.e., the x-axis direction) of the projection of the sound production component 11 may be an included angle between the connection line K'H' and the x-axis in a counterclockwise direction based on the positive direction of the x-axis, as shown in FIG. 7. In some embodiments, to further enhance the wearing stability of the headphone 10, the included angle α4 between the connection line K'H' connecting the projection point K' of the upper vertex K and the projection point H' of the centroid H of the sound production component 11 and the long axis direction X (i.e., the x-axis direction) of the projection of the sound production component 11 may be within a range of 50°-65°. In some embodiments, to further enhance the adjustability of the headphone 10, the included angle α4 between the connection line K'H' connecting the projection point K' of the upper vertex K and the projection point H' of the centroid H of the sound production component 11 and the long axis direction X (i.e., the x-axis direction) of the projection of the sound production component 11 may be within a range of 55°-60°.

In some embodiments, in addition to reflecting the included angle α1 between the connection line connecting the centroid H of the sound production component 11 and the upper vertex K and the long axis direction X of the sound production component 11 by the positions of the projection points as described above, an actual measurement may be carried out on the ear hook 12. In some embodiments, in order to make the headphone 10 have a high wearing stability and adjustability, the included angle α1 between the connection line connecting the centroid H of the sound production component 11 and the upper vertex K of the ear hook 12 and the long axis direction X of the sound production component 11 may be within a range of 30°-55°. In some embodiments, to further enhance the wearing stability of the headphone 10, the included angle α1 between the connection line connecting the centroid H of the sound production component 11 and the upper vertex K of the ear hook 12 and the long axis direction X of the sound production component 11 may be within a range of 40°-50°. In some embodiments, to further enhance the adjustability of the headphone 10, the included angle α1 between the connection line connecting the centroid H of the sound production component 11 and the upper vertex K of the ear hook 12 and the long axis direction X of the sound production component 11 may be within a range of 45°-48°.

Figure 10:
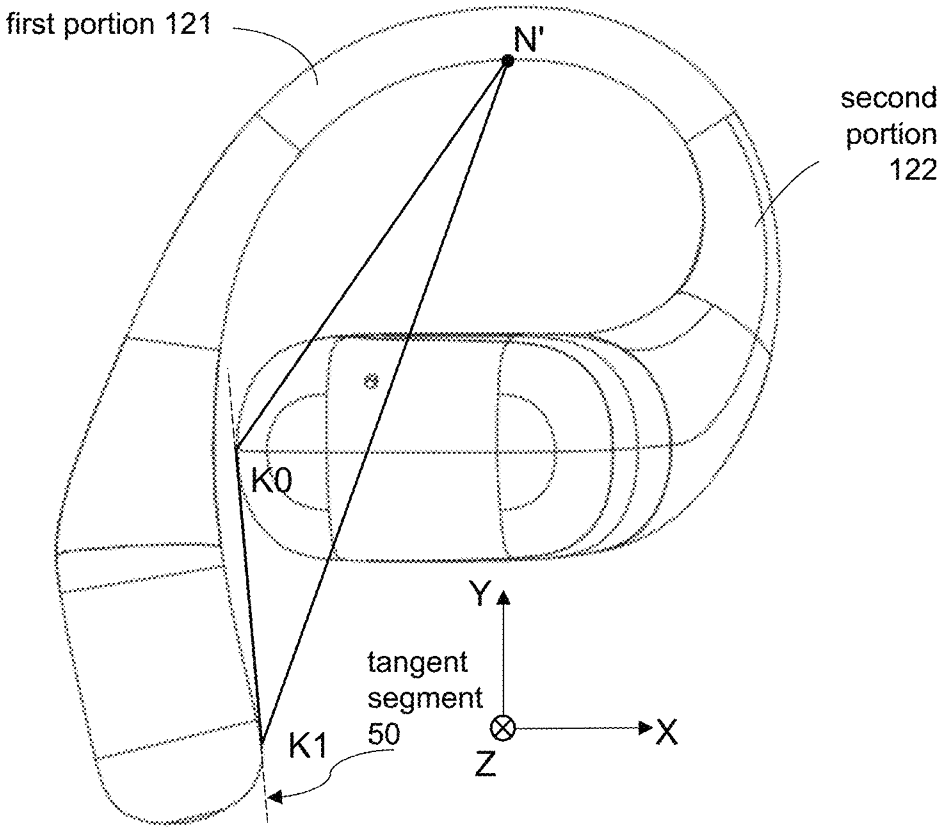
FIG. 10 is a schematic diagram illustrating a tangent segment of a first projection of a headphone according to some embodiments of the present disclosure.

FIG. 10 is a schematic diagram illustrating a tangent segment of a first projection of a headphone according to some embodiments of the present disclosure.

Referring to FIG. 10, a tangent segment 50 that defines the first closed curve jointly with a first projection tangent to a first end contour at a first tangent point K0 and tangent to the second end contour at a second tangent point K1, respectively. The lines among the first tangent point K0, the second tangent point K1, and the extremum point of the projection of the ear hook on the first plane (e.g., point N') may form a triangle. Since the positions of the first tangent point K0 and the second tangent point K1 are related to a first area of the first closed curve, the area of the triangle formed by the lines among the first tangent point K0, the second tangent point K1 and the extremum point of the projection of the ear hook on the first plane may change, leading to a change in the first area and a change in the shape and size of the ear hook 12. For example, if the area of the triangle increases, the corresponding the first area may decrease, the size of the ear hook 12 may decrease, and in turn affects the user's wearing experience.

In some embodiments, considering the wearing sensation of the user and the practical range of the first area of the first closed curve, when the headphone 10 is in the non-wearing state, the area of the triangle formed by the first tangent point K0, the second tangent point K1, and the extremum point of the projection of the ear hook on the first plane may be within a range of 110 $mm^2$-230 $mm^2$. In some embodiments, the area of the triangle formed by the first tangent point K0, the second tangent point K1, and the extremum point of the projection of the ear hook on the first plane is within a range of 150 $mm^2$-190 $mm^2$, so that the first area of the first closed curve is within a range of 300 $mm^2$-500 $mm^2$.

Referring to FIG. 10, in some embodiments, the first tangent point K0 and the second tangent point K1 are positioned close to the inner and outer sides of the auricular concha cavity where the sound production component 11 and the ear hook are clamped. When the user wears the headphone 10, a size of a connection line (i.e., the tangent segment 50) connecting the first tangent point K0 and the second tangent point K1 may be related to the size of the auricular concha cavity. Therefore, the upper vertex, jointly with the first tangent point K0 and the second tangent point K1, may determine the force on the auricular concha cavity of the ear when the user wears the headphone 10 and is related to the wearing experience of the user. In some embodiments, a length of the tangent segment 50 may be within a range of 11 mm-25 mm, a distance between the second tangent point K1 and the extremum point of the projection of the ear hook on the first plane may be within a range of 31 mm-58 mm, and the distance between the first tangent point K0 and the extremum point of the projection of the ear hook on the first plane may be within a range of 18 mm-41 mm. If a certain segment of the triangle is too long, it can result in the inability to clamp the auricular concha cavity well, and the wearing stability can be poor, making it easy to fall off. Whereas the sound production component 11 and the ear hook are driven by an elastic force to provide a force to bring them closer to each other. If a certain segment of the triangle is too short, it may cause discomfort in the auricular concha cavity or the side of the earlobe close to the head when wearing, thereby affecting the wearing experience of the headphone 10. In some embodiments, the length of the tangent segment 50 may be within a range of 14 mm-22 mm. In some embodiments, when the headphone 10 is in the non-wearing state, the distance between the second tangent point K1 and the extremum point of the projection of the ear hook on the first plane may be within a range of 35 mm-55 mm. In some embodiments, when the headphone 10 is in the non-wearing state, the distance between the first tangent point K0 and the extremum point of the projection of the ear hook on the first plane may be within a range of 22 mm-38 mm. Furthermore, the changes in the length of any line segment of the triangle formed by the upper vertex, the first tangent point K0, and the second tangent point K1 may lead to changes in the interior angles of the triangle. For the same reasons as in the previous section, in some embodiments, in the triangle formed by the first tangent point K0, the second tangent point K1, and the extremum point of the projection of the ear hook on the first plane, an included angle formed at the second tangent point K1 may be within a range of 17°-37°, the included angle formed at the first tangent point K0 may be within a range of 110°-155°, and the included angle formed at the extremum point of the projection of the ear hook on the first plane may be within a range of 9°-24°. In order to further improve the wearing experience of the user and the wearing stability, in some embodiments, the included angle formed at the second tangent point K1 may be within a range of 20°-35°, the included angle formed at the first tangent point K0 may be within a range of 120°-150°, and the included angle formed at the extremum point of the projection of the ear hook on the first plane may be within a range of 10°-22°.

Figure 11:
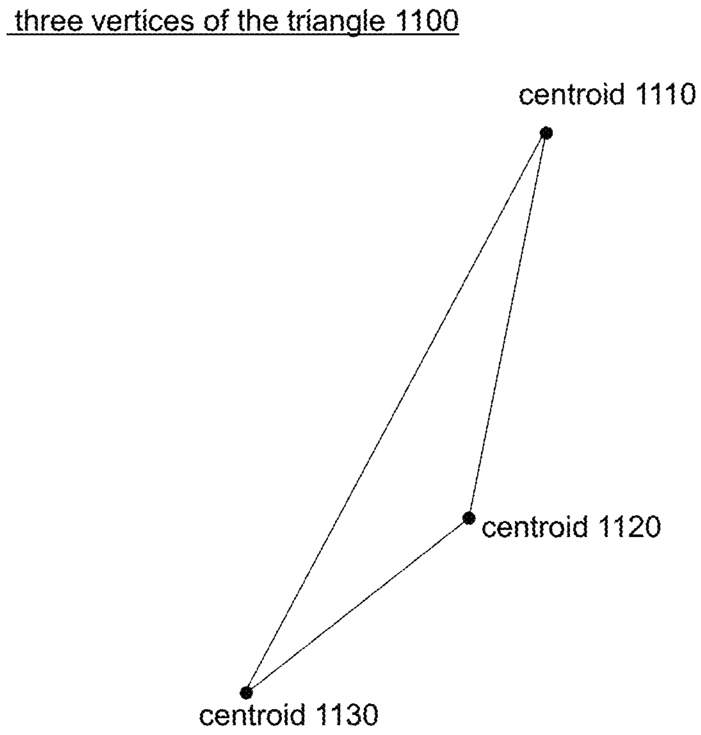
FIG. 11 is a schematic diagram illustrating a triangle formed by a centroid of an ear hook, a centroid of a battery compartment, and a centroid of a sound production component of a headphone according to some embodiments of the present disclosure.

FIG. 11 is a schematic diagram illustrating a triangle formed by a centroid of an ear hook, a centroid of a battery compartment, and a centroid of a sound production component of a headphone according to some embodiments of the present disclosure.

Referring to FIG. 11, the three vertices of the triangle 1100 in the figure correspond to a centroid 1110 of the ear hook of the headphone 10, a centroid 1120 of the sound production component, and a centroid 1130 of the battery compartment. The triangle 1100 formed by the three centroids may affect the wearing stability and comfort of the headphone 10. A position of the centroid of the ear hook may be related to a shape of the ear hook, and in addition, the distribution of the three centroids may also have an impact on the position of the centroid of the headphone 10. If a certain segment in the triangle 1100 is too long, the stability when wearing the headphone 10 may be poor. For example, if a distance between the centroid 1130 of the battery compartment and the centroid 1110 of the ear hook is too short, the headphone 10 may tend to tilt towards the position of the sound production component 11 when wearing the headphone 10. With the extension of wearing time or the movement of the user when wearing the headphone 10, the sound production component 11 may tilt to a certain extent or even fall off, affecting the wearing experience of the user. If the distance between the centroid 1130 of the battery compartment 13 and the centroid 1110 of the ear hook is too long, the headphone 10 may tend to tilt towards the position of the battery compartment 13 when wearing the headphone 10. With the extension of the wearing time or the movement of the user when wearing the headphone 10, the sound production component 11 may also produce a certain tilt or even fall off, affecting the wearing experience of the user. Considering the wearing stability, in some embodiments, in the non-wearing state of the headphone 10, a relative distance between the centroid 1120 of the sound production component and the centroid 1110 of the ear hook may be within a range of 15 mm-40 mm; in the non-wearing state of the headphone 10, the relative distance between the centroid 1130 of the battery compartment and the centroid 1110 of the ear hook may be within a range of 40 mm-62 mm; and the relative distance between the centroid 1120 of the sound production component and the centroid 1130 of the battery compartment may be within a range of 11 mm-35 mm. In some embodiments, in order to further improve the comfort of the user wearing the headphone 10, in the non-wearing state of the headphone 10, the relative distance between the centroid 1120 of the sound production component and the centroid 1110 of the ear hook may be within a range of 20 mm-35 mm; in the non-wearing state of the headphone 10, the relative distance between the centroid 1130 of the battery compartment and the centroid 1110 of the ear hook may be within a range of 35 mm-55 mm; and the relative distance between the centroid 1120 of the sound production component and the centroid 1130 of the battery compartment may be within a range of 15 mm-30 mm.

In some embodiments, variations in the length of any line segment (the distance between the two centroids) in the triangle 1100 formed by the centroid 1110 of the ear hook, the centroid 1120 of the sound production component, and the centroid 1130 of the battery compartment may result in angular variations in the inner corners of the triangle 1100, which in turn may have an impact on the actual wearing experience of the headphone 10. For example, an excessively large or excessively small included angle formed at the centroid 1120 of the sound production component in the triangle 1000 may result in variations in the lever structure formed by the sound production component 11 and the ear hook as previously mentioned, thereby affecting the wearing experience of the user. For reasons similar to those in the preceding paragraphs, in some embodiments, when the headphone 10 is in the non-wearing state, in the triangle 1000 formed by the lines connecting the centroid 1120 of the sound production component, the centroid 1110 of the ear hook, and the centroid 1130 of the battery compartment as vertices, the included angle formed at the centroid 1130 of the battery compartment may be within a range of 12°-22°, the included angle formed at the centroid of the sound production component may be within a range of 111°-164°, and the included angle formed at the centroid 1110 of the ear hook may be within a range of 11°-24°. In some embodiments, in the triangle 1100, the included angle formed at the centroid 1130 of the battery compartment may be within a range of 15°-25°, the included angle formed at the centroid of the sound production component may be within a range of 130°-160°, and the included angle formed at the centroid 1110 of the ear hook may be within a range of 12°-22°.

Figure 12:
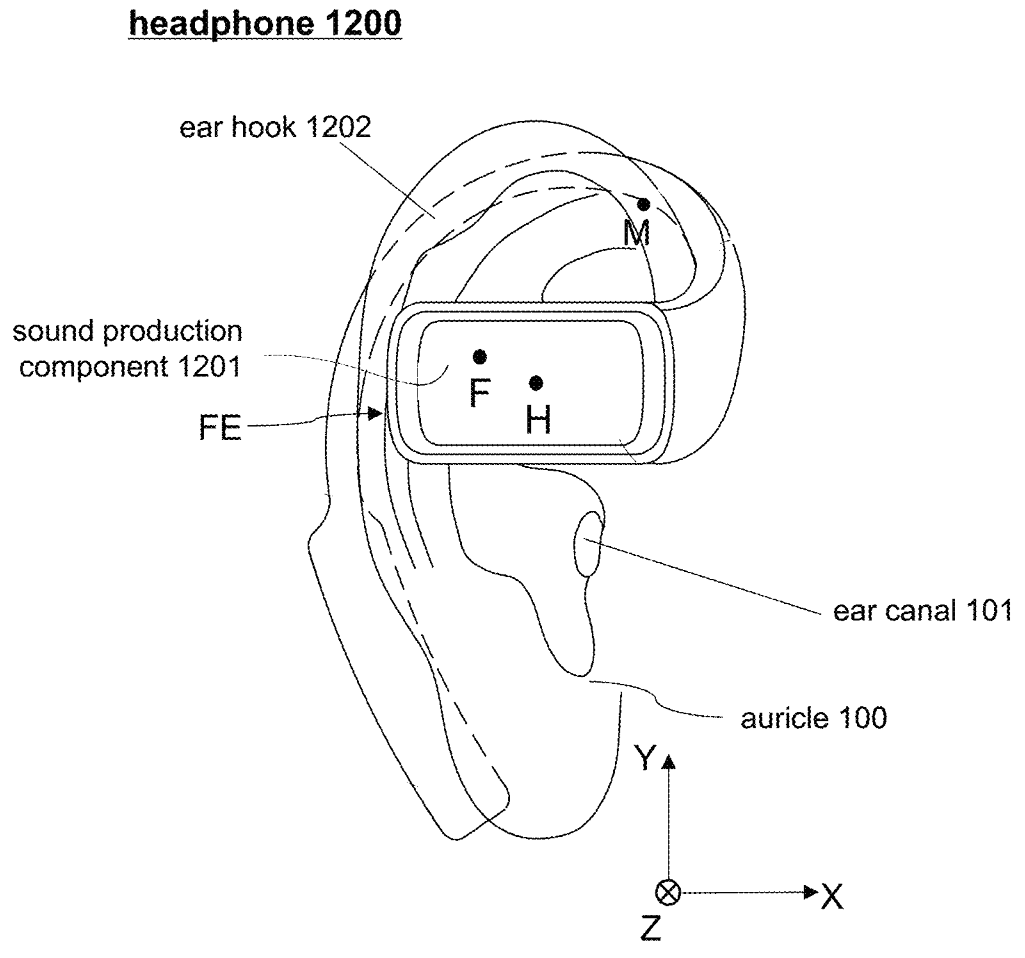
FIG. 12 is a schematic diagram illustrating an exemplary wearing of a headphone according to some other embodiments of the present disclosure.

In some embodiments, as above described, the sound production component may have alternative ways of being worn that differ from being inserted into the auricular concha cavity. The headphone 1200 shown in FIG. 12 is described in detail below as an example. It should be noted that without violating the corresponding acoustic principles, the structure of the headphone 1200 of FIG. 12 and its corresponding parameters may also be equally applicable to the headphone mentioned above in which the sound production component is extended into the auricular concha cavity.

FIG. 12 is a schematic diagram illustrating an exemplary wearing of a headphone according to some other embodiments of the present disclosure.

Figure 13:
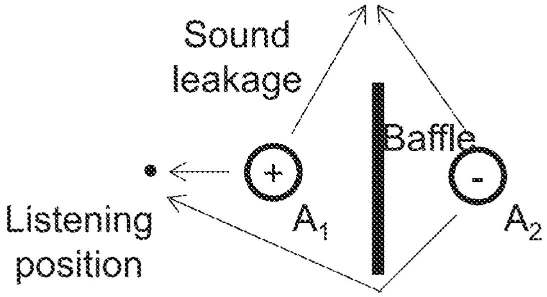
FIG. 13 is a schematic diagram illustrating an acoustic model formed by a headphone according to some other embodiments of the present disclosure.

As shown in FIG. 12, by placing the sound production component 1201 at least partially at the antihelix 105 of the user, the output of the headphone 1200 may be increased, i.e., the sound intensity in the near-field listening position is increased while the volume of the far-field leakage is reduced. When the user is wearing the headphone 1200, one or more sound outlets may be provided on a side of the housing of the sound production component 1201 near or towards the ear canal of the user, and one or more pressure relief holes are provided on other sidewalls of the housing of the sound production component 1201 (e.g., the side walls far away or deviated from the ear canal of the user). The sound outlets may be acoustically coupled with a front cavity of the headphone 1200, and the pressure relief holes are acoustically coupled with a rear cavity of the headphone 1200. Taking the example of the sound production component 1201 including a sound outlet and a pressure relief hole, a sound output from the sound outlet and a sound output from the pressure relief hole may be approximated as two sound sources, which are equal in size and opposite in phase. The sound emitted from the sound outlet may be transmitted unimpeded directly to the opening of the ear canal of the user, whereas the sound emitted from the pressure relief hole needs to bypass the housing of the sound production component 1201 or pass through the sound production component 1201 to form an acoustic model similar to that shown in FIG. 13. As shown in FIG. 13, when there is a baffle between point sound source A1 and point sound source A2, in the near field, a sound field of point sound source A2 needs to go around the baffle to interfere with a sound wave of point sound source A1 at the listening position, which equivalates to increase the sound path from point sound source A2 to the listening position. Therefore, assuming that the point sound source A1 and the point sound source A2 have the same amplitude, an amplitude difference between the sound waves of the point sound source A1 and that of the point sound source A2 at the listening position may be larger than that in a case without a baffle, thereby reducing a sound cancellation of the two sounds at the listening position, and increasing a sound volume at the listening position. In the far-field, the sound waves generated by the point sound source A1 and the point sound source A2 may not bypass the baffle in a relatively large space, and the sound waves may be interfered (as a case without the baffle). Compared to the case without the baffle, the sound leakage in the far-field may not increase significantly. Therefore, a baffle structure around one of point sound source A1 and point sound source A2 may significantly increase the volume at the near-field listening position without significantly increasing the volume of sound leakage in the far field.

FIG. 13 is a schematic diagram illustrating an acoustic model formed by a headphone according to some other embodiments of the present disclosure.

Taking the sound production component 1201 including a sound outlet and a pressure relief hole as an example, as shown in FIG. 13, the sound output from the sound outlet and the sound output from the pressure relief hole may be approximated to be considered as two sound sources, respectively, a point sound source A1 and a point sound source A2, and the two sound sources are equal in size and opposite in phase. The sound emitted from the sound outlet may be transmitted unimpeded directly to the opening of the ear canal of the user, whereas the sound emitted from the pressure relief hole needs to bypass the housing of the sound production component 1201 or pass through the sound production component 1201 to form an acoustic model similar to that shown in FIG. 13. When there is a baffle between the point sound source A1 and the point sound source A2, in the near field, a sound field of point sound source A2 needs to go around the baffle to interfere with a sound wave of point sound source A1 at the listening position, which equivalates to increase the sound path from point sound source A2 to the listening position. Therefore, assuming that the point sound source A1 and the point sound source A2 have the same amplitude, an amplitude difference between the sound waves of the point sound source A1 and that of the point sound source A2 at the listening position may be larger than that in a case without a baffle, thereby reducing a sound cancellation of the two sounds at the listening position, and increasing a sound volume at the listening position. In the far-field, the sound waves generated by the point sound source A1 and the point sound source A2 may not bypass the baffle in a relatively large space, and the sound waves may be interfered (as a case without the baffle). Compared to the case without the baffle, the sound leakage in the far-field may not increase significantly. Therefore, a baffle structure around one of point sound source A1 and point sound source A2 may significantly increase the volume at the near-field listening position without significantly increasing the volume of sound leakage in the far field.

Figure 14:
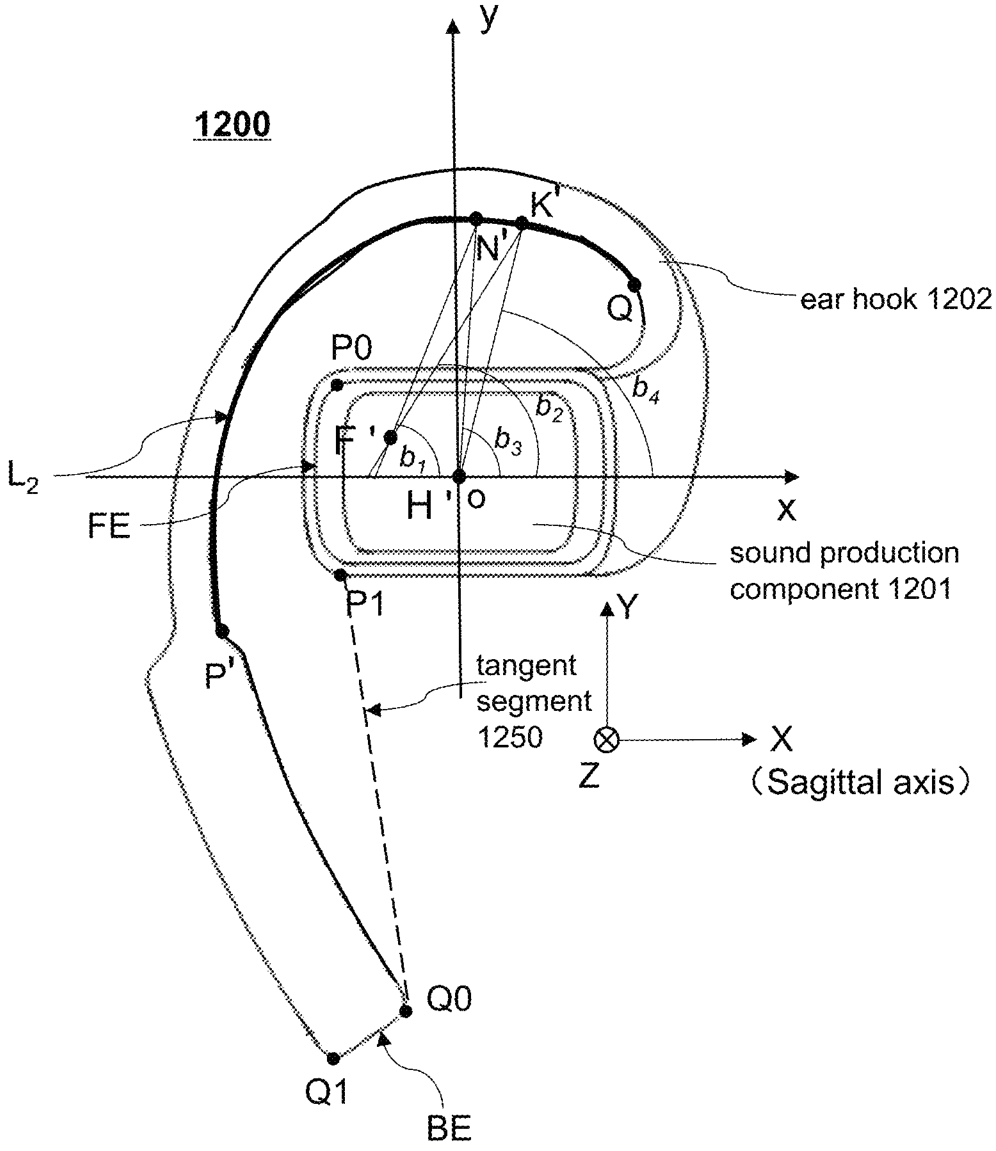
FIG. 14 is a schematic diagram illustrating a projection of a headphone on a first plane in a non-wearing state according to some embodiments of the present disclosure.

FIG. 14 is a schematic diagram illustrating a projection of a headphone on a first plane in a non-wearing state according to some embodiments of the present disclosure.

As shown in FIG. 14, the ear hook 1202 and the sound production component 1201 form a second projection on the first plane, the second projection including an outer contour, a first end contour, an inner contour, and a second end contour. Similar to the headphone 10 structure in FIG. 3, the first end contour in the second projection may be a projection contour of the free end FE of the sound production component 1201 on the first plane, and two endpoints P0 and P1 of the first end contour are projection points of the free end FE at a junction with the rest of the sound production component 1201 on the first plane. The second end contour may be a projection contour of the end BE of the ear hook 1202 on the first plane, and the two endpoints Q0 and Q1 of the second end contour are projection points of the end BE at a junction with the rest of the ear hook 1202 on the first plane. The outer contour may be a contour of the first projection located between the endpoint P1 and the endpoint Q1. The inner contour may be a contour of the second projection located between the endpoint P0 and the endpoint Q0. More information about the division of the free end FE and the end BE of the ear hook 1202 may be found in the related description of the headphone 10 (as described in the related descriptions of FIG. 3 and FIG. 5 in the present disclosure).

Taking the projection of the sound production component 1201 on the first plane being a rectangular-like shape (e.g., runway shape) as an example, there are parallel or approximately parallel projections of the upper side surface and lower side surface in the projection of the sound production component 1201, and a first end contour connecting the projections of the upper side surface and lower side surface. The first end contour may be a straight-line segment or a circular arc. Points P0 and P1 indicate two ends of the first end contour respectively. Merely by way of example, the point P0 may be a junction point between an arc projected by the free end of the sound production component 1201 and the line segment projected by the upper side surface, and similarly to the point P0, the point P1 may be a junction point between an arc projected by the free end of the sound production component 1201 and the line segment projected by the lower side surface. Similarly, the ear hook 1202 has a free end at an end away from the sound production component 1201. A projection of the free end of the ear hook 1202 on the first plane 60 may form the second end contour, which may be a straight-line segment or an arc, with points Q0 and Q1 indicating the two ends of the second end contour respectively. In some embodiments, the points Q0 and Q1 may be two endpoints of a line segment or arc projected by the free end of the first portion of the ear hook 1202 on the first plane 60 in a direction away from the second portion of the ear hook, and further, the endpoint close to the sound production component 1201 in the long axis direction X of the sound production component 1201 is the point Q0 and the endpoint away from the sound production component 1201 is the point Q1.

As shown in FIG. 14, a shape of the projection of the headphone 1200 on the first plane and a shape of the projection of the headphone 1200 on the sagittal plane of the human body may reflect the way the headphone 1200 is worn on the ear. For example, an area of the second projection may reflect a region of the auricle covered by the headphone 1200 in the non-wearing state or the wearing state, and the way the sound production component 1201 and the ear hook 1202 are in contact with the ear. In some embodiments, since the sound production component 1201 is not in contact with the first portion of the ear hook 1202, the inner contour, the outer contour, the first end contour, and the second end contour in the second projection may form a non-closed region. A size of the region is closely related to the wearing effect of the headphone 1200 (e.g., wearing stability, sound production position, etc.). For ease of understanding, in some embodiments, a tangent segment 1250 connecting the first end contour and the second end contour may be determined, and an area enclosed by a second closed curve jointly defined by the tangent segment 1250, the outer contour, the first end contour, and the second end contour is the area of the second projection (also referred to as the "second area").

In some embodiments, the headphone 1200 differs from the headphone 10 shown in FIG. 5 in that the sound production component 1201 of the headphone 1200 is located at the antihelix 105 of the user in the wearing state, so that the second area may be smaller than the first area. In some embodiments, the second area may be 0.2 times-0.6 times the first area in the non-wearing state. In some embodiments, the second area may be 0.3 times-0.5 times the first area. The second area of the second closed curve may be within a range of 50 $mm^2$-200 $mm^2$. In order to ensure the sound generation efficiency of the sound production component 1201 as well as a moderate clamping force, and to avoid the feeling of a foreign body generated by the headphone 1200 when worn, the second area of the second closed curve may be within a range of 80 $mm^2$-150 $mm^2$.

When the second area of the second closed curve is set to be within a range of 50 $mm^2$-200 $mm^2$, it is necessary further to set the shape and dimension of the ear hook 1202. Therefore, on the one hand, the ear hook 1202 may be adapted to the ear of the user to improve the stability and adjustability of wearing the headphone 10, and on the other hand, the sound production component 1201 connected with the ear hook 1202 may be set to be located at the antihelix to avoid the sound production component 1201 blocking the ear canal, thereby avoiding affecting the user to access the sound from the external environment to enable the user to have a better acoustic experience. The shape and the dimension of the ear hook 1202 may be illustrated hereinafter in connection with the first curve involved in FIG. 14.

In some embodiments, as shown in FIG. 14, a first curve L2 in the projection of the ear hook 1202 on the sagittal plane of the user may be designated as a reference curve of the ear hook 1202. In some embodiments, when the headphone 10 is in the wearing state, since the region of the ear hook 1202 in contact with the ear of the user is primarily the inner contour of the ear hook 1202, the first curve L2 may be a reference curve corresponding to the inner contour of the projection of the ear hook 1202 on the sagittal plane of the user. In some embodiments, in the long axis direction X of the projection of the sound production component 1201, a curve corresponding to the inner contour of the projection of the ear hook 1202 on the sagittal plane of the user may have a left-most end (point P') and a right-most end (point Q'), and a part of the curve of the inner contour of the projection of the ear hook 1202 on the sagittal plane of the user that is located between the point P' and the point Q' may be the first curve L2. By designing the features (e.g., the extremum point, etc.) of the first curve L2, the shape and size of the ear hook 1202 may be determined. Therefore, on the one hand, the ear hook 1202 may fit the ear of the user better and the wearing stability and adjustability of the headphone 10 may be improved, on the other hand, the ear hook 1202 may be regulated to place the sound production component 1201 at a specific position of the ear of the user, thereby improving the listening effect of the headphone 10.

After setting a range of the second area of the second closed curve to be between 50 $mm^2$-200 $mm^2$, it is necessary to limit the size of the second closed curve in the long axis direction of the projection of the sound production component 1201. If the size of the second closed curve in the long axis direction of the projection of the sound production component 11 is too small, the connecting end between the ear hook 1202 and the sound production component and the end BE of the ear hook 1202 may clamp the ear of the user too tightly. If the second closed curve in the long axis direction of the projection of the sound production component 11 is too large, a distance between the sound production component 1201 and the upper vertex of the ear hook may be too small, which may affect the fitting effect of the sound production component 1201 at the antihelix, and thus cause wearing discomfort. In some embodiments, the size of the second closed curve in the long axis direction of the projection of the sound production component 1201 may be characterized in terms of a distance between the left-most end (point P') and the right-most end (point Q') of the first curve L2 in the long axis direction of the projection of the sound production component 1201. In some embodiments, the distance between the left-most end (point P') and the right-most end (point Q') of the first curve L2 in the long axis direction of the projection of the sound production component 1201 may be within a range of 25 mm-35 mm. In some embodiments, in order to provide better wearing stability of the headphone 1200, the distance between the left-most end (point P') and the right-most end (point Q') of the first curve L2 in the long axis direction of the projection of the sound production component 1201 may be within a range of 28 mm-33 mm. In some embodiments, the distance between the left-most end (point P') and the right-most end (point Q') of the first curve L2 in the long axis direction of the projection of the sound production component 1201 may be within a range of 30 mm-32 mm.

Referring to FIG. 14, in some embodiments, a second rectangular coordinate system xoy may be established with the long axis direction X of the projection of the sound production component 1201 on the sagittal plane as an x-axis, the short axis direction Y as a y-axis, and the intersection point of the x-axis and the y-axis as the origin o.

In some embodiments, the y-axis direction may be referred to as a first direction, i.e., the first direction is perpendicular to the long axis direction X of the projection of the sound production component 1201 on the sagittal plane of the user, and is directed toward the top of the head of the user. In some embodiments, in the second rectangular coordinate system xoy, the first curve L2 may have an extremum point N' in the first direction, and the wearing condition (e.g., the mechanical parameter during wearing and the position of the sound production component 1201 relative to the ear during wearing) of the headphone 1200 may be adjusted by setting a positional relationship between the extremum point N' and the ear hook 1202 as well as positional relationships between the extremum point N' and other positional points on the sound production component 1201. Referring to FIG. 3 and FIG. 14, in some embodiments, the extremum point N' is located at the front side or rear side of the upper vertex K (represented by the projection point K' of the upper vertex on the sagittal plane of the user) of the ear hook 1202, or a position of the extremum point N' corresponds to a position of the projection point K' of the upper vertex K of the ear hook. That is to say, on the projection of the ear hook 1202 on the sagittal plane of the user, compared to the position of the projection point K' of the upper vertex, the position of the extremum point N' is farther away from the back of the head of the user or closer to the back of the head of the user, or both of the positions are the same.

In some embodiments, the upper vertex of the ear hook 1202 may be a highest point of the inner contour of the ear hook 1202 along the vertical axis of the user in the wearing state. In some embodiments, the ear may be supported by the headphone 1200 primarily through the upper vertex of the ear hook 1202 when the user is wearing the headphone 1200. In some embodiments, the upper vertex of the ear hook 1202 may be a location where the inner contour of the ear hook 1202 is curved to the most extent in the wearing state. In some embodiments, the upper vertex of the ear hook 1202 may be a point on the inner contour of the ear hook 1202 farthest from the end of the ear hook 1202 (i.e., the end of the first portion 121, which is the end of the ear hook 1202 not connected with the sound production component 1201) in the wearing state. In some embodiments, the position of the upper vertex of the ear hook 1202 may simultaneously satisfy one or more of the three positions described above.

As shown in FIG. 12, the headphone 1200 needs to be located at the antihelix when the headphone 1200 is worn, and a distance between the extremum point of the ear hook and the upper vertex in the long axis direction X of the sound production component 1201 may influence the position of the sound production component 1201 relative to the antihelix and a direction of the sound production component 1201.

When the distance between the extremum point of the ear hook and the upper vertex in the long axis direction X of the sound production component 1201 is too large, the compatibility between the first portion 121 of the ear hook 1202 and the ear may deteriorate, and the wearing stability of the headphone 1200 may be reduced, or the facing direction (e.g., the long axis direction X) of the sound production component 1201 at the antihelix 102 may be too close to the vertical axis. Thus, the contact friction between the sound production component 1201 and the antihelix may be too small, thereby making the sound production component 1201 unstable to wear and prone to sliding in the direction of the ear canal.

In order to enable the sound production component 1201 to be located at the antihelix, and to prevent the free end FE of the sound production component 1201 from protruding out of the auricle 100 of the user to affect the fitting effect of the sound production component 1201 to the auricle and thus causes discomfort in wearing, in some embodiments, on the projection of the ear hook 1202 on the sagittal plane of the user, along the long axis direction X of the sound production component 1201, the distance between the extremum point N' and the projection point K' of the upper vertex may be no greater than 5 mm, i.e., the distance between the extremum point N' and the projection point K' of the upper vertex may be within a range of 0 mm-5 mm. In some embodiments, on the projection of the ear hook 1202 on the sagittal plane of the user, in the long axis direction X of the projection of the sound production component 1201, the distance between the extremum point N' and the projection point K' of the upper vertex of the ear hook 1202 may be within a range of 0 mm-3 mm. In some embodiments, on the projection of the ear hook 1202 on the sagittal plane of the user, along the long axis direction X of the projection of the sound production component 1201, the distance between the extremum point N' and the projection point K' of the upper vertex of the ear hook 1202 may be within a range of 0 mm-2 mm. It should be noted that the above distance between the extremum point N' and the projection point K' of the upper vertex does not limit the facing direction between the two, and the extremum point N' may be located at the front side or the rear side of the projection point K' of the upper vertex. When the distance between the extremum point N' and the projection point K' of the upper vertex is 0 mm, it indicates that the extremum point N' coincides with the projection point K' of the upper vertex.

It should be noted that a manner for measuring a relevant distance and angle of the projection of the headphone 1200 on the sagittal plane of the user may include taking a picture of the headphone 1200 parallel to the projection plane (the sagittal plane of the user), measuring the relevant distance and angle on the picture, and then converting according to a scale of the picture to obtain actual data of the relevant distance and angle on the projection.

When the relevant shape and size of the ear hook 1202 are limited, in order to ensure that the sound production component 1201 is located at the antihelix to ensure the wearing stability of the sound production component 1201, a wearing angle of the sound production component 1201 relative to the auricle of the ear and the antihelix needs to be further limited. In some embodiments, in order to make the whole or a portion of the region of the sound production component 1201 located on the antihelix, as shown in FIG. 14, an inclination angle of the long axis direction X of the projection of the sound production component 1201 to the horizontal direction (i.e., the sagittal axis direction shown in FIG. 14) may be within a range of 0° to 15°. In some embodiments, the inclination angle of the long axis direction X of the projection of the sound production component 1201 to the horizontal direction may be within a range of 0°-10°. In some embodiments, the inclination angle of the long axis direction X of the projection of the sound production component 1201 to the horizontal direction may be within a range of 0°-5°.

After setting the second area of the second closed curve to be within a range of 50 $mm^2$-200 $mm^2$, it is necessary to limit a distance of the second closed curve in the short axis direction of the projection of the sound production component 1201 (i.e., the first direction). The distance of the second closed curve in the first direction of the projection of the sound production component 1201 may affect the position of the sound production component 1201 relative to the antihelix. If the distance is too small, the free end FE of the sound production component 1201 may protrude out of the auricle 100 of the user. If the distance is too large, the sound production component 1201 may block the ear canal, which makes the ear canal insufficiently open. In some embodiments, the distance of the second closed curve in the first direction of the projection of the sound production component 1201 in the non-wearing state may be characterized by a distance between the extremum point N' and the left-most end (point P') of the first curve L1 in the first direction. In some embodiments, to ensure that the sound production component 1201 can be located at the antihelix, the distance between the extremum point N' and the left-most end (point P') of the first curve L2 in the first direction may be within a range of 15 mm-20 mm. In some embodiments, the distance between the extremum point N' and the left-most end (point P') of the first curve L2 may be within a range of 5 mm-18 mm. In some embodiments, the distance between the extremum point N' and the left-most end (point P') of the first curve L2 may be within a range of 16 mm-28 mm.

Similarly, in some embodiments, the distance of the second closed curve in the first direction of the projection of the sound production component 1201 may be characterized by the distance between the projection point K' of the upper vertex and the left-most end (point P') of the first curve L2 in the first direction. In some embodiments, to ensure that the sound production component 1201 can be located at the antihelix, in the first direction, the distance between the projection point K' of the upper vertex and the left-most end (point P') of the first curve L2 may be within a range of 12 mm-17 mm. In some embodiments, in the first direction, the distance between the projection point K' of the upper vertex and the left-most end (point P') of the first curve L2 may be within a range of 13 mm-16 mm. In some embodiments, in the first direction, the distance between the projection point K' of the upper vertex and the left-most end (point P') of the first curve L2 may be within a range of 14 mm-15 mm.

In some embodiments, as shown in FIG. 12, a position of a centroid of the headphone 1210 is point F. In some embodiments, affected by an internal structure of the sound production component 1201 (e.g., a magnetic circuit, a circuit board, etc.), a mass of the sound production component 1201 in the headphone 1210 may be relatively large. Therefore, the position of the centroid F of the headphone 1210 may be close to a position of a centroid H of the sound production component 1201 or is greatly affected by the mass of the sound production component 1201, that is, to a certain extent, the position of the centroid F of the headphone 1210 may represent the position of the sound production component 1201. For the convenience of explanation, a position of the centroid F of the headphone 1210 may be described in detail below through relative positions of the centroid F of the headphone 1210 and the sound production component 1201.

Referring to FIG. 8A, in some embodiments, on the XY plane, the distance between the centroid F of the headphone 1210 and the upper side surface (the side surface close to the head) of the sound production component 1201 may be within a range of 2 mm-5 mm. In some embodiments, on the XY plane, the distance between the centroid F of the headphone 1210 and the upper side of the sound production component 1201 may be within a range of 2.5 mm-4.5 mm. In some embodiments, on the XY plane, the distance between the centroid F of the headphone 1210 and the upper side of the sound production component 1201 may be within a range of 3 mm-4 mm.

In some embodiments, on the XY plane, a distance between the centroid F of the headphone 1210 and a long axis (i.e., the x-axis) of the sound production component 1201 may be within a range of 1 mm-2 mm. In some embodiments, on the XY plane, the distance between the centroid F of the headphone 1210 and the long axis (i.e., the x-axis) of the sound production component 1201 may be within a range of 1.2 mm-1.8 mm. In some embodiments, on the XY plane, the distance between the centroid F of the headphone 1210 and the long axis (i.e., the x-axis) of the sound production component 1201 may be within a range of 1.3 mm-1.5 mm.

In some embodiments, on the XY plane, the distance between the centroid F of the headphone 1210 and the free end FE of the sound production component 1201 may be within a range of 4 mm-8 mm. In some embodiments, on the XY plane, the distance between the centroid F of the headphone 1210 and the free end FE (i.e., the rear side surface RS) of the sound production component 1201 may be within a range of 6 mm-8 mm. In some embodiments, on the XY plane, the distance between the centroid F of the headphone 1210 and the free end FE (i.e., the rear side surface RS) of the sound production component 1201 may be within a range of 6.5 mm-7 mm.

In some embodiments, on the XZ plane, a distance between the centroid F of the headphone 1210 and the inner side surface (the side surface close to the auricle) of the sound production component 1201 may be within a range of 3 mm-8 mm. In some embodiments, on the XZ plane, the distance between the centroid F of the headphone 1210 and the inner side surface of the sound production component 1201 may be within a range of 4 mm-6 mm. In some embodiments, on the XZ plane, the distance between the centroid F of the headphone 1210 and the inner side surface of the sound production component 1201 may be within a range of 4.5 mm-5 mm.

In some embodiments, by designing the positions of the centroid F of the headphone 1210, the upper vertex, and the extremum point of the ear hook, the wearing stability and adjustability of the headphone 1210 may be improved. In some embodiments, since the ear supports the headphone 1210 mainly through the upper vertex of the ear hook 1202, when the user wears the headphone 1210, it may be regarded as forming the upper vertex K as the support point for the "supporting lever." In the wearing state, the centroid F of the headphone 1210 may be located at the rear side of the upper vertex (i.e., the side close to the back of the head of the user), which may prevent the headphone 1210 from tending to flip forward (i.e., away from the direction of the back of the head of the user) in the wearing state, thereby enhancing the wearing stability of the headphone 1210. In some embodiments, the extremum point of the ear hook may be a position on the ear hook 1202 with the smallest cross-section, so that the ear hook 1202 can be more likely to deform at the extremum point N of the ear hook. Therefore, when the user wears the headphone 1210, the first portion 121 of the ear hook 1202 and the sound production component 1201 may form a structure similar to a "clamping force lever" with the extremum point N of the ear hook as a fulcrum point, and the structure is clamped on both sides of the ear of the user (e.g., a front side and a rear side of the antihelix). In order to improve the stability of the "supporting lever" and the "clamping force lever," the centroid F of the headphone 1210 and the upper vertex K are respectively located at both sides of the extremum point N of the ear hook. The position of the centroid F, the upper vertex K, and the extremum point N of the ear hook may be further described in detail below. The first portion of the ear hook 1202 and the sound production component 1201 may be clamped to both sides of the ear of the user (e.g., the front side and rear side of the auricular concha cavity) taking the extremum point of the ear hook as a pivot point to form a structure similar to the "clamping force lever." In order to improve the stability of the "supporting lever" and the "clamping force lever," the centroid F of the ear hook 1202 of the headphone and the upper vertex K are respectively located at both sides of the extremum point of the ear hook. The positions of the centroid F, the upper vertex, and the extremum point of the ear hook may be further described in detail below.

Referring to FIG. 14, in some embodiments, a projection point of the centroid F of the headphone 1210 on the sagittal plane of the user is point F'. In some embodiments, when the headphone 1210 is in the non-wearing state, a distance between the projection point F' of the centroid F of the headphone 1210 and the extremum point of the ear hook may also be related to the wearing stability and a sense of foreign body at a connection position between the ear and the head of the user. In some embodiments, when the distance between the projection point F' of the centroid F of the headphone 1210 and the extremum point of the ear hook is too large, the clamping position of the headphone 1210 on the ear may be too low, and it may occur that the sound production component 1201 may block the ear canal when worn, thereby making the ear canal poorly open. When the distance between the projection point F' of the centroid F of the headphone 1210 and the extremum point of the ear hook is too small, it indicates that a force arm at both ends of the fulcrum point of the "clamping force lever" mentioned above may be too small, the stability of the lever structure may be poor when a clamping force remains unchanged, and the headphone 1210 may be unstable to wear in the wearing state.

In some embodiments, in order to provide the headphone 1210 with a high wearing stability in the wearing state, on the projection of the headphone 1210 on the sagittal plane of the user, the distance between the extremum point N' and the projection point F' of the centroid F of the headphone 1210 may be within a range of 15 mm-30 mm. In some embodiments, in order to further enhance the wearing stability of the headphone 1210, on the projection of the headphone 1210 on the sagittal plane of the user, the distance between the extremum point N' and the projection point F' of the centroid F of the headphone 1210 may be within a range of 18 mm-28 mm. In some embodiments, on the projection of the headphone 1210 on the sagittal plane of the user, the distance between the extremum point N' and the projection point F' of the centroid F of the headphone 1210 may be within a range of 20 mm-24 mm.

In some embodiments, a third included angle $b_1$ between a connection line connecting the centroid F of the headphone 1210 with the extremum point of the ear hook and the long axis direction X of the sound production component 1201 may determine, to a certain extent, a form of the inner contour of the headphone 1210, and the form of the inner contour may be related to the wearing feeling of the user. Specifically, to ensure that the ear hook fit the ear or head of the user when the user wears the headphone 1210, an excessively large or small included angle may lead to a change in the form when worn. Specifically, when the third included angle $b_1$ between the connection line connecting the centroid F of the headphone 1210 with the extremum point of the ear hook and the long axis direction X of the sound production component 1201 is too large, the clamping position of the sound production component 1201 relative to the antihelix may be excessively low. When the third included angle $b_1$ between the connection line connecting the centroid F of the headphone 1210 with the extremum point of the ear hook and the long axis direction X of the sound production component 1201 is too small, the clamping position of the sound production component 1201 relative to the antihelix may be excessively high, and the free end FE of the sound production component 1201 may protrude out of the edge of the auricle.

In some embodiments, as shown in FIG. 14, on the projection of the sound production component 1210 on the sagittal plane of the user, the third included angle $b_1$ between the connection line N'F' connecting the extremum point N' with the projection point F' of the centroid of the headphone 1210 and the long axis direction X (i.e., the x-axis direction) of the projection of the sound production component 1201 may be less than 90°, such that the projection point F' of the centroid F of the headphone 1210 can be at the rear side of the extremum point N' in the long axis direction X of the sound production component 1201. Since the centroid F of the headphone 1210 is mainly affected by the mass of the sound production component 1201, the position of the centroid F may also reflect, to a certain extent, the clamping position of the sound production component 1201 on the auricular concha cavity, i.e., compared with the extremum point N of the ear hook, the clamping position of the sound production component 1201 on the auricular concha cavity may be closer to the back of the head of the user, so as to further enhance the stability of the "clamping force lever." It should be noted that the third included angle $b_1$ between the connection line N'F' connecting the extremum point N' with the projection point F of the centroid of the headphone 1210 and the long axis direction X (i.e., the x-axis direction) of the projection of the sound production component 1201 refers to an included angle between the connection line N'F' and the x-axis in the counterclockwise direction on the basis of a positive direction of the x-axis. In some embodiments, in order to avoid the clamping position of the sound production component 1201 being excessively low or excessively high relative to the antihelix, the third included angle $b_1$ between the connection line N'F' connecting the extremum point N' with the projection point F' of the centroid F of the headphone 1210 and the long axis direction X (i.e., the x-axis direction) of the projection of the sound production component 1201 may be within a range of 50°-87°. In some embodiments, the third included angle $b_1$ between the connection line N'F' connecting the extremum point N' with the projection point F' of the centroid F of the headphone 1210 and the long axis direction X (i.e., the x-axis direction) of the projection of the sound production component 1201 may be within a range of 55°-80° In some embodiments, to make the clamping position of the sound production component 1201 be located at a preferred position in the antihelix, the third included angle $b_1$ between the connection line N'F' connecting the extremum point N' with the projection point F' of the centroid F of the headphone 1210 and the long axis direction X (i.e., the x-axis direction) of the projection of the sound production component 1201 may be within a range of 60°-75°.

Since the position of the centroid F of the headphone 1210 is strongly influenced by the position of the sound production component 1201, when the overall volume of the ear hook 1202 does not change much, to a certain extent, the position between the upper vertex and the centroid F of the headphone 1210 may reflect a relative position of the sound production component 11 on the ear when the headphone 1210 is worn. Specifically, when a distance between the centroid F of the headphone 1210 and the upper vertex of the ear hook 12 is too large, the sound production component 1201 may be located closer to the opening of the ear canal of the user when the user is wearing the headphone 1210, which causes the position of the sound production component 1201 in the antihelix relatively low, resulting in the sound production component 1201 blocking the ear canal. When the distance between the centroid F of the headphone 1210 and the upper vertex of the ear hook 12 is too small, the free end FE of the sound production component 1201 may protrude out of the edge of the auricle.

As shown in FIG. 14, in some embodiments, on a projection of the headphone 1210 on the sagittal plane of the user, a distance between the projection point K' of the upper vertex and the projection point F' of the centroid F of the headphone 1210 may be within a range of 17 mm-30 mm. In some embodiments, the distance between the projection point K' of the upper vertex and the projection point F' of the centroid F of the headphone 1210 may be within a range of 20 mm-28 mm. In some embodiments, the distance between the projection point K' of the upper vertex and the projection point F' of the centroid F of the headphone 1210 may be within a range of 22 mm-25 mm.

In some embodiments, an included angle between the connection line connecting the centroid F of the headphone 1210 with the upper vertex of the ear hook 12 and the long axis direction X of the sound production component 1201 may affect the stability of the headphone 1210 in the wearing state. When the included angle between the connection line connecting the centroid F of the headphone 1210 with the upper vertex of the ear hook 12 and the long axis direction X of the sound production component 1201 is too large, the free end FE of the sound production component 1201 may be relatively far away from the edge of the antihelix 107, the clamping of the sound production component 1201 on the antihelix may be relatively weak, which leads to unstable wearing. When the included angle between the connection line connecting the centroid F of the headphone 1210 with the upper vertex of the ear hook 12 and the long axis direction X of the sound production component 1201 is too small, the sound production component 1201 may be too tightly clamped on the antihelix of the user, affecting the wearing comfort of the headphone 1210 and reducing the adjustability of the headphone 1210.

In some embodiments, in order to make the headphone 1210 have higher wearing stability and adjustability, on the projection of the headphone 1210 on the sagittal plane of the user, an included angle $b_2$ between a connection line K'F' connecting the projection point K' of the upper vertex with the projection point F' of the centroid F of the headphone 1210 and the long axis direction X (i.e., the x-axis direction) of the projection of the sound production component 1201 may be within a range of 30°-55°. It should be noted that the included angle $b_2$ between the connection line K'F' connecting the projection point K' of the upper vertex with the projection point F' of the centroid F of the headphone 1210 and the long axis direction X (i.e., the x-axis direction) of the projection of the sound production component 1201 refers to an included angle between the connection line K'F' and the x-axis in a counterclockwise direction on the basis of a positive direction of the x-axis, as shown in FIG. 14. In some embodiments, to further enhance the wearing stability of the headphone 1210, the included angle $b_2$ between the connection line K'F' connecting the projection point K' of the upper vertex with the projection point F' of the centroid F of the headphone 1210 and the long axis direction X (i.e., the x-axis direction) of the projection of the sound production component 1201 may be within a range of 35°-50°. In some embodiments, to further enhance the adjustability of the headphone 1210, the included angle $b_2$ between the connection line K'F' connecting the projection point K' of the upper vertex with the projection point F' of the centroid F of the headphone 1210 and the long axis direction X (i.e., the x-axis direction) of the projection of the sound production component 1201 may be within a range of 38°-45°.

In some embodiments, as shown in FIG. 12, in addition to setting the position of the centroid F of the headphone 1210, the position of the centroid H of the sound production component 1201 may be directly set to improve the wearing stability of the headphone 1210. As shown in FIG. 12 and FIG. 14, in some embodiments, the projection point of the centroid H of the sound production component 1201 on the sagittal plane of the user may coincide with the center of the projection of the sound production component 1201 on the sagittal plane of the user. In some embodiments, on the headphone 1210, by changing a distance between the centroid H of the sound production component 1201 and the extremum point of the ear hook, in the wearing state, the covered position of the sound production component 1201 on the antihelix may be changed simultaneously, and the clamping position of the sound production component 1201 on the antihelix may also be changed, which affects the stability and wearing comfort of the headphone 1210 when worn by the user.

When the shape and size of the sound production component 1201 are consistent, if the distance between the centroid H of the sound production component 1201 and the extremum point of the ear hook is too large, the sound production component 1201 may be lower on the antihelix, which may cause the sound production component 1201 to block the ear canal. When the shape and size of the sound production component 1201 are consistent, if the distance between the centroid H of the sound production component 1201 and the extremum point of the ear hook is too small, the free end FE of the sound production component 1201 may protrude out of the edge of the auricle, which may also affect the wearing comfort.

In some embodiments, as shown in FIG. 14, the projection point of the centroid H of the sound production component 1201 on the sagittal plane of the user, and the center of the projection of the sound production component 1201 on the sagittal plane of the user are point H', and point H' is located on the long axis of the projection of the sound production component 1201, i.e., the point H' lies on the x-axis. In some embodiments, in order to make the headphone 1210 have a better listening effect in the wearing state, a distance between the extremum point N' and the projection point H' of the centroid H of the sound production component 1201 on the sagittal plane of the user may be within a range of 20 mm-30 mm. In some embodiments, in order to keep the ear canal open, the distance between the extremum point N' and the projection point H' of the centroid H of the sound production component 1201 on the sagittal plane of the user may be within a range of 15 mm-25 mm. In some embodiments, the distance between the extremum point N' and the projection point H' of the centroid H of the sound production component 1201 on the sagittal plane of the user may be within a range of 18 mm-22 mm. In some embodiments, a fourth included angle between a connection line connecting the centroid H of the sound production component 1201 with the extremum point of the ear hook and the long axis direction X of the sound production component 1201 may affect the position of the sound production component 1201 on the antihelix. When the fourth included angle between the connection line connecting the centroid H of the sound production component 1201 with the extremum point of the ear hook and the long axis direction X of the sound production component 1201 is too large, the sound production component 1201 may block the ear canal. When the fourth included angle between the connection line connecting the centroid H of the sound production component 1201 with the extremum point of the ear hook and the long axis direction X of the sound production component 1201 is too small, the free end FE of the sound production component 1201 may protrude out of the edge of the ear canal, and the wearing comfort may also be affected.

In some embodiments, the fourth included angle $b_3$ between the connection line N'H' connecting the extremum point N' with the projection point H' of the centroid H of the sound production component 1201 and the long axis direction X (i.e., the x-axis direction) of the projection of the sound production component 1201 may take a value within a range of 60°-87°, to cause the projection point H' of the centroid H of the sound production component 1201 to be located at the rear side of the extremum point N' in the long direction X of the sound production component 1201, i.e., compared with the corresponding point N of the extremum point N' on the ear hook 12, the centroid H of the sound production component 1201 may be closer to the back of the head of the user, thus further enhancing the stability of the "clamping force lever." It should be noted that the fourth included angle $b_3$ between the connection line N'H' connecting the extremum point N' with the projection point H' of the centroid of the sound production component 1201 and the long axis direction X (i.e., the x-axis direction) of the projection of the sound production component 1201 refers to an angle between the connection line N'H' and the x-axis in the counterclockwise direction on the basis of the positive direction of the x-axis, as shown in FIG. 14. In some embodiments, the fourth included angle $b_3$ between the connection line N'H' connecting the extremum point N' with the projection point H' of the centroid H of the sound production component 1201 and the long axis direction X (i.e., the x-axis direction) of the projection of the sound production component 1201 may be within a range of 65°-82°. In some embodiments, the fourth included angle $b_3$ between the connection line N'H' connecting the extremum point N' with the projection point H' of the centroid H of the sound production component 1201 and the long axis direction X (i.e., the x-axis direction) of the projection of the sound production component 1201 may be within a range of 70°-78°. In some embodiments, in order to make the clamping position of the sound production component 1201 located at a preferred position on the antihelix, the fourth included angle $b_3$ between the connection line N'H' connecting the extremum point N' with the projection point H' of the centroid H of the sound production component 1201 and the long axis direction X (i.e., the x-axis direction) of the projection of the sound production component 1201 may be within a range of 72°-76°.

In some embodiments, on the sagittal plane of the user, the third included angle $b_1$ between the connection line N'F' connecting the extremum point N' with the projection point F' of the centroid F of the headphone 1210 and the long axis direction X (i.e., the x-axis direction) of the projection of the sound production component 1201 may be less than the fourth included angle $b_3$ between the connection line N'H' connecting the extremum point N' with the projection point H' of the centroid H of the sound production component 1201 and the long axis direction X (i.e., the x-axis direction) of the projection of the sound production component 1201. That is, the third included angle $b_1$ between the connection line N'F' and the x-axis may be smaller than the fourth included angle $b_3$ between the connection line N'H' and the x-axis. Therefore, the centroid F of the headphone 1210 may be located at the rear side of the centroid H of the sound production component 1201 in the long axis direction X of the sound production component 1201, i.e., compared with the centroid H of the sound production component 1201, the centroid F of the headphone 1210 may be closer to the back of the head of the user. Through the above setting, the headphone 1210 may be made to be better clamped on the ear of the user by the ear hook 12 in the wearing state, further enhancing the stability of the "clamping force lever."

The positions of the upper vertex and the centroid H of the sound production component 1201 may reflect, to a certain extent, the relative position of the sound production component 1201 on the ear when the headphone 1210 is worn. Specifically, when a distance between the centroid H of the sound production component 1201 and the upper vertex of the ear hook 1202 is too large, the position of the sound production component 1201 may be closer to the opening of the ear canal of the user when the user is wearing the headphone 1210, causing the position of the sound production component 1201 to be relatively low, which causes the sound production component 1201 to block the ear canal. When the distance between the centroid H of the sound production component 1201 and the upper vertex of the ear hook 1202 is too small, the free end FE of the sound production component 1201 may protrude out of the edge of the auricle, resulting in a poor wearing experience.

As shown in FIG. 14, in some embodiments, in order to obtain better wearing comfort, on the projection of the headphone 1210 on the sagittal plane of the user, the distance between the projection point K' of the upper vertex and the projection point H' of the centroid H of the sound production component 1201 may be within a range of 10 mm-20 mm. In some embodiments, on the projection of the headphone 1210 on the sagittal plane of the user, the distance between the projection point K' of the upper vertex and the projection point H' of the centroid H of the sound production component 1201 may be within a range of 12 mm-18 mm. In some embodiments, on the projection of the headphone 1210 on the sagittal plane of the user, the distance between the projection point K' of the upper vertex and the projection point H' of the centroid H of the sound production component 1201 may be within a range of 14 mm-16 mm.

In some embodiments, the included angle between the connection line connecting the centroid H of the sound production component 1201 with the upper vertex of the ear hook 1202 and the long axis direction X of the sound production component 1201 may affect the stability of the headphone 1210 in the wearing state. When the included angle between the connection line connecting the centroid H of the sound production component 1201 with the upper vertex of the ear hook 1202 and the long axis direction X of the sound production component 1201 is too large, the free end FE of the sound production component 1201 may be farther away from the side surface of the antihelix of the user, the clamping of the sound production component 1201 to the antihelix may be weaker, leading to an unstable wearing. When the included angle between the connection line connecting the centroid H of the sound production component 1201 with the upper vertex of the ear hook 1202 and the long axis direction X of the sound production component 1201 is too small, the free end FE of the sound production component 1201 may be too tightly fitted to the edge of the antihelix of the user, affecting the wearing comfort of the headphone 1210 and reducing the adjustability of the headphone 1210.

In some embodiments, in order to make the headphone 1210 has a high wearing stability and adjustability, on the projection of the headphone 1210 on the sagittal plane of the user, the included angle $b_4$ between the connection line K'H' connecting the projection point K' of the upper vertex with the projection point H' of the centroid H of the sound production component 1201 and the long axis direction X (i.e., the x-axis direction) of the projection of the sound production component 1201 may be within a range of 35°-65°. It should be noted that the included angle $b_4$ between the connection line K'H' connecting the projection point K' of the upper vertex with the projection point H' of the centroid H of the sound production component 1201 and the long axis direction X (i.e., the x-axis direction) of the projection of the sound production component 1201 refers to the angle between the connection line K'H' and the x-axis in the counterclockwise direction on the basis of the positive direction of the x-axis as shown in FIG. 14. In some embodiments, to further enhance the wearing stability of the headphone 1210, the included angle $b_4$ between the connection line K'H' connecting the projection point K' of the upper vertex with the projection point H' of the centroid H of the sound production component 1201 and the long axis direction X (i.e., the x-axis direction) of the projection of the sound production component 1201 may be within a range of 40°-60°. In some embodiments, to further enhance the adjustability of the headphone 1210, the included angle $b_4$ between the connection line K'H' connecting the projection point K' of the upper vertex with the projection point H' of the centroid H of the sound production component 1201 and the long axis direction X (i.e., the x-axis direction) of the projection of the sound production component 1201 may be within a range of 45°-55°.

Figure 15:
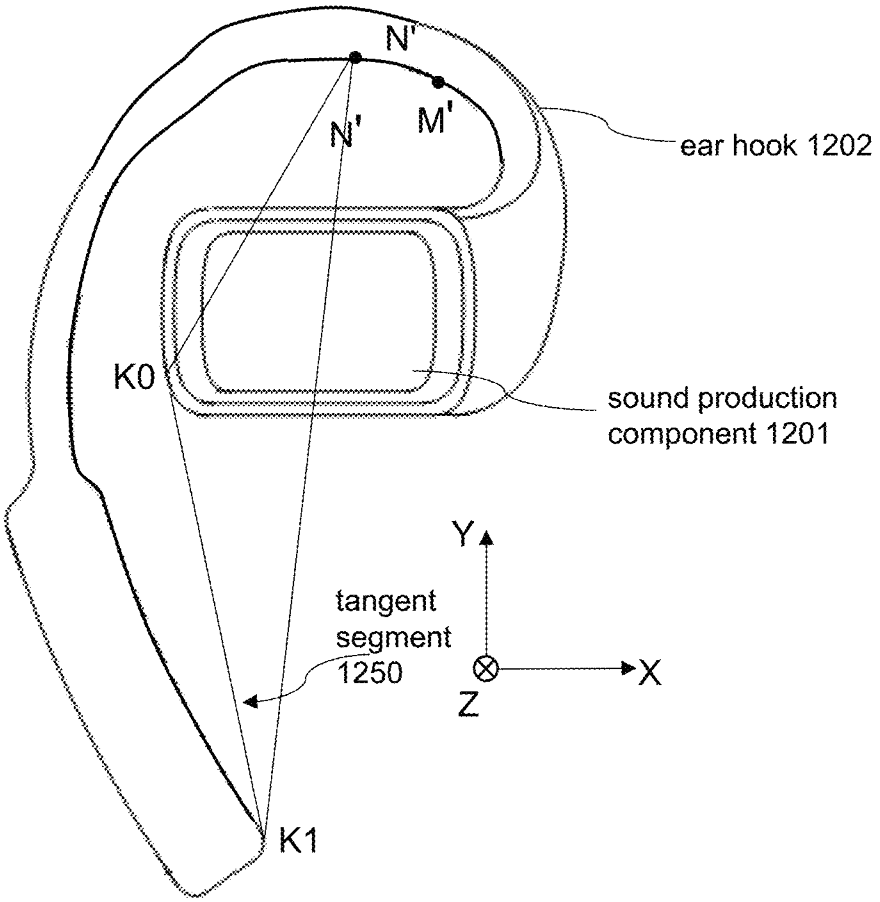
FIG. 15 is a schematic diagram illustrating a tangent segment of a second projection of a headphone according to some embodiments of the present disclosure.

FIG. 15 is a schematic diagram illustrating a tangent segment of a second projection of a headphone according to some embodiments of the present disclosure.

Referring to FIG. 15, a tangent segment 1250 that defines the second closed curve jointly with a second projection tangent to a first end contour at a first tangent point K0 and tangent to a second end contour at a second tangent point K1, respectively. The connection lines connecting the first tangent point K0, the second tangent point K1, and the extremum point of a projection of the ear hook on the first plane may form a triangle. Since the positions of the first tangent point K0 and the second tangent point K1 are related to a second area of the second closed curve, the area of the triangle formed by the lines among the first tangent point K0, the second tangent point K1 and the extremum point of the projection of the ear hook on the first plane may change, leading to a change in the second area and a change in the shape and size of the ear hook 1202. For example, if the area of the triangle increases, the corresponding the second area may decrease, the size of the ear hook 1202 may decrease, and in turn affects the user's wearing experience.

In some embodiments, taking into account the wearing sense of the user and an actual range of the second area of the second closed curve, when the headphone 1210 is in a non-wearing state, the area of the triangle formed by the first tangent point K0, the second tangent point K1, and the extremum point of the projection of the ear hook on the first plane may be within a range of 110 $mm^2$-230 $mm^2$. In some embodiments, the area of the triangle formed by the first tangent point K0, the second tangent point K1, and the extremum point of the projection of the ear hook on the first plane may be within a range of 150 $mm^2$-190 $mm^2$ to ensure the second area of the second closed curve to be within a range of 1150 $mm^2$-1350 $mm^2$.

Referring to FIG. 15, in some embodiments, the first tangent point K0 and the second tangent point K1 are positioned close to the inner and outer sides of the antihelix where the sound production component 1201 and the ear hook are clamped. When the user wears the headphone 1210, a size of a connection line (i.e., the tangent segment 1250) connecting the first tangent point K0 and the second tangent point K1 may be related to the size of the antihelix. Therefore, the upper vertex, jointly with the first tangent point K0 and the second tangent point K1, may determine the force on the antihelix of the ear when the user wears the headphone 1210 and is related to the wearing experience of the user. In some embodiments, a length of the tangent segment 1250 may be within a range of 11 mm-25 mm, a distance between the second tangent point K1 and the extremum point of the projection of the ear hook on the first plane may be within a range of 31 mm-58 mm, and the distance between the first tangent point K0 and the extremum point of the projection of the ear hook on the first plane may be within a range of 18 mm-41 mm. If a certain segment of the triangle is too long, it can result in the inability to clamp the antihelix well, and the wearing stability can be poor, making it easy to fall off. Whereas the sound production component 1201 and the ear hook are driven by an elastic force to provide a force to bring them closer to each other. If a certain segment of the triangle is too short, it may cause discomfort on the antihelix or the side of the earlobe close to the head when wearing, thereby affecting the wearing experience of the headphone 1210. In some embodiments, the length of the tangent segment 1250 may be within a range of 14 mm-22 mm. In some embodiments, when the headphone 1210 is in the non-wearing state, the distance between the second tangent point K1 and the extremum point of the projection of the ear hook on the first plane may be within a range of 35 mm-55 mm. In some embodiments, when the headphone 1210 is in the non-wearing state, the distance between the first tangent point K0 and the extremum point of the projection of the ear hook on the first plane may be within a range of 22 mm-38 mm. Furthermore, the changes in the length of any line segment of the triangle formed by the upper vertex, the first tangent point K0, and the second tangent point K1 may lead to changes in the interior angles of the triangle. For the same reasons as in the previous section, in some embodiments, in the triangle formed by the first tangent point K0, the second tangent point K1, and the extremum point of the projection of the ear hook on the first plane, an included angle formed at the second tangent point K1 may be within a range of 17°-37°, the included angle formed at the first tangent point K0 may be within a range of 110°-155°, and the included angle formed at the extremum point of the projection of the ear hook on the first plane may be within a range of 9°-24°. In order to further improve the wearing experience of the user and the wearing stability, in some embodiments, the included angle formed at the second tangent point K1 may be within a range of 20°-35°, the included angle formed at the first tangent point K0 may be within a range of 120°-150°, and the included angle formed at the extremum point of the projection of the ear hook on the first plane may be within a range of 10°-22°.

Referring to FIG. 12, FIG. 14, and FIG. 15, a distance between the centroid H of the sound production component 1201 and the centroid M of the ear hook 1202 may affect a shape of the first curve formed by the ear hook 1202, which affects the stability and comfort when the ear hook 1202 is worn. When the distance between the centroid H of the sound production component 1201 and the centroid M of the ear hook 1202 is too short, and the distance between the first curve formed by the ear hook 1202 in the long axis direction X is too small, the free end FE of the sound production component 1201 may fit too tightly with the edge of the antihelix of the user, affecting the wearing comfort of the ear hook 1202. When the distance between the centroid H of the sound production component 1201 and the centroid M of the ear hook 1202 is too large, and the distance of the first curve formed by the ear hook 1202 in the long axis direction X is too large, the free end FE of the sound production component 1201 may protrude out of the edge of the antihelix, thereby leading to a poor wearing experience. Considering the wearing stability, in some embodiments, in the non-wearing state, on the projection of the ear hook 1202 on the sagittal plane of the user, a distance between the projection point H' of the centroid H of the sound production component 1201 and the projection point M' of the centroid M of the ear hook 1202 may be within a range of 25 mm-40 mm. In some embodiments, in order to further improve the wearing comfort of the ear hook 1202 when worn by the user, in the non-wearing state, on the projection of the ear hook 1202 on the sagittal plane of the user, the distance between the projection point H' of the centroid H of the sound production component 1201 and the projection point M' of the centroid M of the ear hook 1202 may be within a range of 28 mm-36 mm. In some embodiments, in the non-wearing state, on the projection of the ear hook 1202 on the sagittal plane of the user, the distance between the projection point H' of the centroid H of the sound production component 1201 and the projection point M' of the centroid M of the ear hook 1202 may be within a range of 30 mm-34 mm.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A headphone, comprising:

a sound production component including a transducer and a housing accommodating the transducer; and an ear hook, wherein the ear hook includes a first portion and a second portion, in a wearing state, the first portion is hung between an auricle of a user and a head of the user, and the second portion extends toward a side of the auricle away from the head and is connected to the sound production component to place the sound production component in a position near an ear canal without blocking an opening of the ear canal, wherein the ear hook and the sound production component form a first projection on a sagittal plane of the user, wherein the first projection includes an outer contour, a first end contour, an inner contour, and a second end contour, in a non-wearing state, the inner contour, the first end contour, the second end contour, and a tangent segment connecting the first end contour and the second end contour jointly define a first closed curve, and a first area of the first closed curve is within a range of 300 $mm^2$-500 $mm^2$; and a portion of the inner contour corresponding to the ear hook includes a first curve, wherein the first curve has an extremum point in a first direction, the first direction is perpendicular to a long axis direction of a projection of the sound production component, the extremum point is located behind a projection point of an upper vertex of the ear hook on the sagittal plane of the user, and the upper vertex of the ear hook is a highest point of an inner contour of the ear hook along a vertical axis of the user in the wearing state.

2. The headphone of claim 1, wherein in the wearing state, at least a portion of the housing is inserted into an auricular concha cavity.

3. The headphone of claim 1, wherein a distance between the extremum point and the projection point of the upper vertex of the ear hook on the sagittal plane of the user in the long axis direction of the projection of the sound production component is within a range of 6 mm-15 mm.

4. The headphone of claim 1, wherein in the long axis direction of the projection of the sound production component, the portion of the inner contour corresponding to the ear hook includes a left-most end and a right-most end, wherein the left-most end and the right-most end are respectively two endpoints of the first curve, in the non-wearing state, a distance between the left-most end and the right-most end in the long axis direction of the projection of the sound production component is within a range of 25 mm-35 mm.

5. The headphone of claim 1, wherein in the long axis direction of the projection of the sound production component, the portion of the inner contour corresponding to the ear hook includes a left-most end, and in the non-wearing state, a distance between the extremum point and the left-most end in the first direction is within a range of 20 mm-25 mm.

6. The headphone of claim 1, wherein in the long axis direction of the projection of the sound production component, the portion of the inner contour corresponding to the ear hook includes a left-most end, and in the non-wearing state, a distance between the projection point of the upper vertex on the sagittal plane and the left-most point in the first direction is within a range of 17 mm-22 mm.

7. The headphone of claim 1, wherein in the non-wearing state, a distance between a projection point of a centroid of the headphone on the sagittal plane and the extremum point is within a range of 20 mm-35 mm.

8. The headphone of claim 1, wherein in the non-wearing state, a distance between the extremum point and a projection point of a centroid of the sound production component on the sagittal plane is within a range of 20 mm-30 mm.

9. The headphone of claim 1, wherein in the non-wearing state, a distance between the projection point of the upper vertex of the ear hook on the sagittal plane and a projection point of a centroid of the headphone on the sagittal plane is within a range of 22 mm-35 mm.

10. The headphone of claim 1, wherein in the non-wearing state, a distance between the projection point of the upper vertex of the ear hook on the sagittal plane and a projection point of a centroid of the sound production component on the sagittal plane is within a range of 18 mm-28 mm.

11. The headphone of claim 1, wherein the tangent segment is tangent to the first end contour at a first tangent point, the tangent segment is tangent to the second end contour at a second tangent point, and when the headphone is in the non-wearing state, an area of a triangle formed by the first tangent point, the second tangent point, and the extremum point is within a range of 150 $mm^2$-190 $mm^2$.

12. The headphone of claim 1, wherein in the non-wearing state, a distance between a projection point of a centroid of the sound production component on the sagittal plane and a projection point of a centroid of the ear hook on the sagittal plane is within a range of 20 mm-35 mm.

13. A headphone, comprising:

a sound production component including a transducer and a housing accommodating the transducer; and an ear hook, wherein the ear hook includes a first portion and a second portion, in a wearing state, the first portion is hung between an auricle of a user and a head of the user, and the second portion extends toward a side of the auricle away from the head and is connected to the sound production component to place the sound production component in a position near an ear canal without blocking an opening of the ear canal, wherein the ear hook and the sound production component form a second projection on a sagittal plane of the user, wherein the second projection includes an outer contour, a first end contour, an inner contour, and a second end contour, in a non-wearing state, the inner contour, the first end contour, the second end contour, and a tangent segment connecting the first end contour and the second end contour jointly define a second closed curve, and a second area of the second closed curve is within a range of 50 $mm^2$-200 $mm^2$; and a portion of the inner contour corresponding to the ear hook includes a first curve, wherein the first curve has an extremum point in a first direction, the first direction is perpendicular to a long axis direction of a projection of the sound production component, in the long axis direction of the projection of the sound production component, a distance between the extremum point and a projection point of an upper vertex of the ear hook on the sagittal plane of the user is no greater than 5 mm, and the upper vertex of the ear hook is a highest point of an inner contour of the ear hook along a vertical axis of the user in the wearing state.

14. The headphone of claim 13, wherein in the wearing state, at least a portion of the housing covers an antihelix region.

15. The headphone of claim 13, wherein in the long axis direction of the projection of the sound production component, the portion of the inner contour corresponding to the ear hook includes a left-most end and a right-most end, the left-most end and the right-most end are respectively two endpoints of the first curve, wherein a distance between the left-most end and the right-most end in the long axis direction of the projection of the sound production component is within a range of 25 mm-35 mm.

16. The headphone of claim 13, wherein in the long axis direction of the projection of the sound production component, the portion of the inner contour corresponding to the ear hook includes a left-most end, and in the non-wearing state, a distance between the extremum point and the left-most end in the first direction is within a range of 15 mm-20 mm.

17. The headphone of claim 13, wherein in the long axis direction of the projection of the sound production component, the portion of the inner contour corresponding to the ear hook includes a left-most end, and in the non-wearing state, the distance between the projection point of the upper vertex on the sagittal plane and the left-most end in the first direction is within a range of 12 mm-17 mm.

18. The headphone of claim 13, wherein in the non-wearing state, a distance between a projection point of a centroid of the headphone on the sagittal plane and the extremum point is within a range of 15 mm-30 mm.

19. The headphone of claim 13, wherein in the non-wearing state, a distance between the extremum point and a projection point of a centroid of the sound production component on the sagittal plane is within a range of 15 mm-25 mm.

20. The headphone of claim 13, wherein in the non-wearing state, a distance between the projection point of the upper vertex of the ear hook on the sagittal plane and a projection point of a centroid of the headphone on the sagittal plane is within a range of 17 mm-30 mm.

* * * * *